US012786400B2

(12) United States Patent
Chen et al.

(10) Patent No.: US 12,786,400 B2
(45) Date of Patent: Nov. 3, 2026

(54) IMAGE CODING METHOD AND APPARATUS, IMAGE DECODING METHOD AND APPARATUS, AND ELECTRONIC DEVICE AND STORAGE MEDIUM

(71) Applicant: Hangzhou Hikvision Digital Technology Co., Ltd., Hangzhou (CN)

(72) Inventors: Fangdong Chen, Hangzhou (CN); Liang Wei, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 89 days.

(21) Appl. No.: 18/851,477

(22) PCT Filed: Mar. 28, 2023

(86) PCT No.: PCT/CN2023/084295

§ 371 (c)(1),
(2) Date: Sep. 26, 2024

(87) PCT Pub. No.: WO2023/185806

PCT Pub. Date: Oct. 5, 2023

(65) Prior Publication Data

US 2025/0211742 A1 Jun. 26, 2025

(30) Foreign Application Priority Data

Mar. 29, 2022 (CN) ......................... 202210320915.5

(51) Int. Cl.
*H04N 19/124* (2014.01)
*H04N 19/159* (2014.01)
(Continued)

(52) U.S. Cl.
CPC ......... *H04N 19/124* (2014.11); *H04N 19/159* (2014.11); *H04N 19/176* (2014.11); *H04N 19/91* (2014.11)

(58) Field of Classification Search
CPC .. H04N 19/124; H04N 19/159; H04N 19/176; H04N 19/91; H04N 19/147;
(Continued)

(56) References Cited

U.S. PATENT DOCUMENTS 10,419,759 B2 * 9/2019 Lee ........................ H04N 19/86
10,834,408 B2 * 11/2020 Jeong .................... H04N 19/11
(Continued)

FOREIGN PATENT DOCUMENTS

CN 102186086 A * 9/2011
CN 102907100 A 1/2013
(Continued)

OTHER PUBLICATIONS

Johannes Olsson Sandgren; "Pixel-based video coding", Uppsala Universitet, Mar. 2014 (Year: 2014).*
(Continued)

*Primary Examiner* — Dramos Kalapodas
(74) *Attorney, Agent, or Firm* — Bret E. Field; Bozicevic, Field & Francis LLP

(57) ABSTRACT

An image coding method and apparatus, an image decoding method and apparatus, and an electronic device and a storage medium, which relate to the technical field of image coding and decoding. The image coding method comprises: determining a target prediction mode of a block to be coded, and determining a target prediction sequence corresponding to the target prediction mode (S101); according to the target prediction mode, predicting, according to the target prediction sequence, each pixel in the block to be coded (S102); on the basis of a predicted value of each pixel, determining a residual block of the block to be coded (S103); and coding the residual block according to the target prediction
(Continued)

sequence, so as to obtain a code stream of the block to be coded. By means of the method, the efficiency of image coding can be improved.

18 Claims, 9 Drawing Sheets

(51) Int. Cl.
*H04N 19/176* (2014.01)
*H04N 19/91* (2014.01)

(58) Field of Classification Search
CPC .... H04N 19/436; H04N 19/11; H04N 19/129; H04N 19/182; H04N 19/593; H04N 19/103; H04N 19/88
See application file for complete search history.

(56) References Cited

U.S. PATENT DOCUMENTS

| | | | | |
|---|---|---|---|---|
| 11,825,099 | B2 * | 11/2023 | Jeong | H04N 19/176 |
| 11,930,210 | B2 * | 3/2024 | Kim | H04N 19/105 |
| 2002/0041716 | A1 | 4/2002 | Bruna et al. | |
| 2018/0376147 | A1 * | 12/2018 | Iwamura | H04N 19/13 |
| 2020/0236367 | A1 | 7/2020 | Zhou | |
| 2021/0058640 | A1 | 2/2021 | Coban et al. | |
| 2021/0227212 | A1 * | 7/2021 | Lee | H04N 19/105 |
| 2025/0193414 | A1 * | 6/2025 | Jeong | H04N 19/169 |

FOREIGN PATENT DOCUMENTS

| | | | | |
|---|---|---|---|---|
| CN | 103024383 | A | 4/2013 | |
| CN | 103402095 | A | 11/2013 | |
| CN | 104094597 | A | 10/2014 | |
| CN | 104094597 | B | 4/2018 | |
| CN | 109076237 | A | 12/2018 | |
| CN | 109660794 | A | 4/2019 | |
| CN | 110383837 | A * | 10/2019 | H04N 19/124 |
| CN | 110650343 | A | 1/2020 | |
| CN | 112070851 | B * | 7/2023 | G06T 9/002 |
| JP | H08130745 | A | 5/1996 | |
| JP | H09200777 | A | 7/1997 | |
| JP | 2007300389 | A | 11/2007 | |
| JP | 2009522968 | A | 6/2009 | |
| JP | 2015515226 | A | 5/2015 | |
| JP | 2019515570 | A | 6/2019 | |
| KR | 20150070849 | A | 6/2015 | |
| WO | WO2019050299 | A1 | 3/2019 | |

OTHER PUBLICATIONS

Jiang et al., FIPIP: A novel fine-grained parallel partition based intra-frame prediction on heterogeneous many-core systems, Future Generation Computer Systems, 2018, vol. 78, p. 316-329.
Zhang et al., Enhanced Intra Coding with Joint Line and Pixel Prediction, Proceedings of 2010 IEEE 18th International Packet Video Workshop, Dec. 13-14, 2010, Hong Kong, p. 72-77.

* cited by examiner

Fig.7d-3
Fig.7e
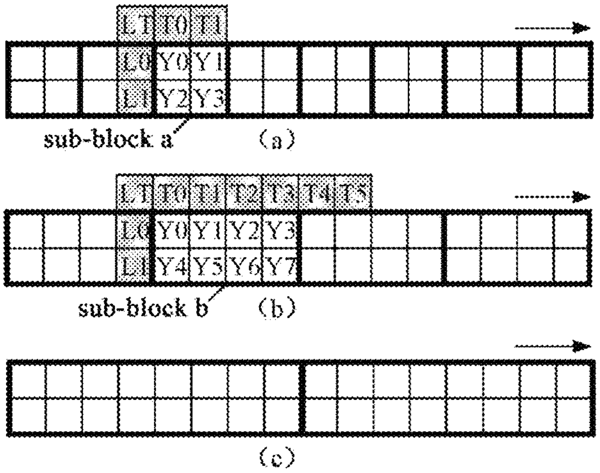
Fig.7f
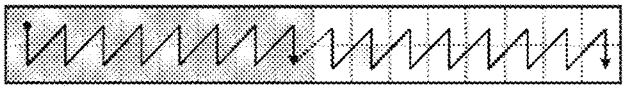
Fig.7g
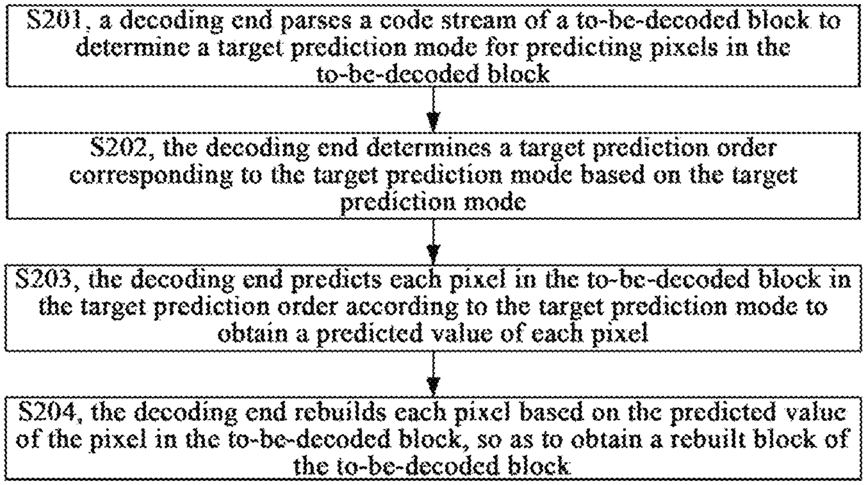
Fig.8

IMAGE CODING METHOD AND APPARATUS, IMAGE DECODING METHOD AND APPARATUS, AND ELECTRONIC DEVICE AND STORAGE MEDIUM

The present application claims the priority to a Chinese patent application No. 202210320915.5 filed with the China National Intellectual Property Administration on Mar. 29, 2022 and entitled "image coding method and apparatus, image decoding method and apparatus, and electronic device and storage medium", which is incorporated herein by reference in its entirety.

TECHNICAL FIELD

The present application relates to the field of image coding and decoding technologies, in particular to image coding method and apparatus, image decoding method and apparatus, an electronic device and a storage medium.

BACKGROUND

A complete image in a video is usually called a "frame", and a video composed of multiple frames in chronological order is called a video sequence. The video sequence contains a series of redundant information, including spatial redundancy, temporal redundancy, visual redundancy, information entropy redundancy, structural redundancy, knowledge redundancy, and importance redundancy. In order to remove the redundant information in the video sequence as much as possible and reduce the amount of data representing the video, a video coding technology has been proposed to achieve an effect of reducing storage space and saving transmission bandwidth. The video coding technology is also referred to as a video compression technology.

With the continuous development of technology, it is becoming more and more convenient to collect video data, and the scale of the collected video data is also getting larger. Therefore, how to effectively code and decode the video data has become an urgent problem that needs to be solved.

SUMMARY

The present application provides image coding method and apparatus, image decoding method and apparatus, an electronic device and a storage medium. The image coding and decoding method can improve the efficiency of image coding and decoding.

To achieve the above objective, the present application provides the following technical solutions:

In a first aspect, the present application provides an image decoding method, the method includes: parsing a code stream of a to-be-decoded block, to determine a target prediction mode for predicting pixels in the to-be-decoded block; determining a target prediction order corresponding to the target prediction mode based on the target prediction mode; predicting each pixel in the to-be-decoded block in the target prediction order according to the target prediction mode; rebuilding the each pixel based on a predicted value of the each pixel to obtain a rebuilt block of the to-be-decoded block.

Through the image decoding method provided by the present application, when the decoding end predicts the pixels in the to-be-decoded block in the target prediction mode, the pixels in the to-be-decoded block are predicted in the target prediction order corresponding to the target prediction mode. In this process, when the decoding end predicts any pixel in the to-be-decoded block, a pixel used to predict the pixel has been rebuilt. Therefore, the image decoding method provided by the present application predicts each pixel in the to-be-decoded block in the target prediction order according to the target prediction mode, which can predict some of the pixels in the to-be-decoded block in parallel, thereby improving the efficiency of predicting the pixels in the to-be-decoded block. When the decoding end obtains a rebuilt value based on a predicted value and a residual value, there is no need to buffer the above residual value. Therefore, the decoding method provided by the embodiment of the present application can not only save the buffer space used to buffer the residual value, but also improve the decoding efficiency.

In a possible design manner, when predicting any pixel in the to-be-decoded block in the target prediction order, a pixel used to predict this pixel has been rebuilt. Using the pixel that has been rebuilt for pixel prediction can ensure that a pixel used for prediction in the decoding process is consistent with the pixel used for prediction in the coding process, thereby reducing decoding errors, making the predicted value of the pixel in the decoding process more accurate, and improving the accuracy of decoding.

In another possible design manner, if the target prediction mode indicates that each pixel in the to-be-decoded block is predicted point by point in the target prediction order, then predicting each pixel in the to-be-decoded block in the target prediction order according to the target prediction mode includes: predicting each pixel in the to-be-decoded block point by point in a direction indicated by the target prediction order according to the target prediction mode; wherein, when the target prediction mode is a first target prediction mode, the target prediction order is a first prediction order, and when the target prediction mode is a second target prediction mode, the target prediction order is a second prediction order, and the first and second prediction orders are different.

In other words, different prediction modes correspond to different prediction orders. In this way, when coding on the coding side, selecting the appropriate prediction order for different prediction modes can reduce the difference between pixels in the to-be-coded block and the predicted values, so that the to-be-coded block is coded with fewer bits. Accordingly, fewer bits need to be decoded on the decoding side, and the decoding efficiency is improved. Therefore, the decoding method provided by this possible design can further improve the efficiency of image decoding.

In another possible design manner, for the to-be-decoded block with a size of a first size, predicting the to-be-decoded block by adopting a third prediction order in the target prediction mode: for the to-be-decoded block with a size of a second size, predicting the to-be-decoded block by adopting a fourth prediction order in the target prediction mode: wherein the third and fourth prediction orders are different.

In other words, when the size of the to-be-decoded block is different, if the same prediction mode is used to predict the pixels in the to-be-decoded block, the prediction order may also be different. In this way, when coding on the coding side, selecting the appropriate prediction order for to-be-decoded blocks of different sizes can reduce the difference between the pixels in the to-be-decoded blocks and the predicted values, so that the to-be-decoded block is coded with fewer bits. Accordingly, fewer bits need to be decoded on the decoding side, and the decoding efficiency is improved. Therefore, the decoding method provided by this possible design can further improve the efficiency of image decoding.

In a possible design manner, if the target prediction mode indicates that pixels of each sub-block in the to-be-decoded block are predicted sequentially with a sub-block of a preset size in the to-be-decoded block as a unit, then predicting each pixel in the to-be-decoded block in the target prediction order according to the target prediction mode includes: predicting the pixels in each sub-block in the to-be-decoded block sequentially in a direction indicated by the target prediction order according to the target prediction mode.

In another possible design manner, the target prediction mode comprises a prediction mode for each sub-block in the to-be-decoded block, and for a first sub-block in the to-be-decoded block, the first sub-block comprises a first pixel and a second pixel, and a prediction mode for the first sub-block is used to predict the first pixel and the second pixel in parallel based on rebuilt pixels around the first sub-block.

Through these two possible designs, when predicting one sub-block, the decoding end can predict multiple pixels in the sub-block in parallel based on the rebuilt pixels around the sub-block, that is, this prediction mode can further improve the efficiency of the decoding end in predicting the to-be-decoded block. When the decoding end obtains the rebuilt value based on the predicted value and the residual value, there is no need to buffer the residual value, so the decoding method provided by the two possible designs further saves buffer space and improves decoding efficiency.

In another possible design manner, rebuilding the each pixel based on the predicted value of the each pixel to obtain the rebuilt block of the to-be-decoded block comprises: performing inverse quantization on a first residual block of the to-be-decoded block obtained by parsing the code stream of the to-be-decoded block, based on an inverse quantization parameter of each pixel in the to-be-decoded block obtained by parsing the code stream of the to-be-decoded block and an inverse quantization preset array, to obtain a second residual block: predicting the pixels in each sub-block in the to-be-decoded block sequentially in a direction indicated by the target prediction order according to the target prediction mode.

Through this possible design, it is possible to perform inverse quantization based on a preset inverse quantization preset array, thereby reducing the multiplication operations in the inverse quantization process. Since the multiplication operations are time-consuming, reducing the multiplication operations can improve the calculation efficiency of the inverse quantization process, that is, it can efficiently implement the inverse quantization of the first residual block of the to-be-decoded block, so the decoding method provided by this possible design can further improve the efficiency of image decoding.

In a possible design manner, parsing the code stream of the to-be-decoded block includes: parsing the code stream of the to-be-decoded block by using a variable code length decoding method to obtain the first residual block and a code length (CL) for coding each value in a residual block corresponding to the to-be-decoded block.

Through this possible design, the residual block and the CL of the to-be-decoded block are coded with fewer bits on the coding side, so fewer bits need to be decoded on the corresponding decoding side, and the decoding efficiency is improved. Therefore, the decoding method provided by this possible design can further improve the efficiency of image decoding.

In a second aspect, the present application provides an image coding method, the method includes: determining a target prediction mode for a to-be-coded block, and determining a target prediction order corresponding to the target prediction mode: predicting each pixel in the to-be-coded block in the target prediction order according to the target prediction mode; determining a residual block of the to-be-coded block based on a predicted value of the each pixel: coding the residual block in the target prediction order to obtain a code stream of the to-be-coded block.

Through the image coding method provided by the present application, when the coding end predicts the pixels in the to-be-coded block in the target prediction mode, the pixels in the to-be-coded block are predicted in the target prediction order corresponding to the target prediction mode. In this process, when the coding end predicts any pixel in the to-be-coded block, a pixel used to predict the pixel has been rebuilt. Therefore, the image coding method provided by the present application predicts each pixel in the to-be-coded block in the target prediction order according to the target prediction mode, which can predict some of the pixels in the to-be-coded block in parallel, thereby improving the efficiency of predicting the pixels in the to-be-coded block. When the coding end obtains a rebuilt value based on a predicted value and a residual value, there is no need to buffer the above residual value. Therefore, the coding method provided by the embodiment of the present application can not only save the buffer space used to buffer the residual value, but also improve the coding efficiency.

In a possible design manner, when predicting any pixel in the to-be-decoded block in the target prediction order, a pixel used to predict this pixel has been rebuilt.

In another possible design manner, if the target prediction mode indicates that each pixel in the to-be-decoded block is predicted point by point in the target prediction order, then predicting each pixel in the to-be-decoded block in the target prediction order according to the target prediction mode includes: predicting each pixel in the to-be-decoded block point by point in a direction indicated by the target prediction order according to the target prediction mode; wherein, when the target prediction mode is a first target prediction mode, the target prediction order is a first prediction order, and when the target prediction mode is a second target prediction mode, the target prediction order is a second prediction order, and the first and second prediction orders are different. In other words, different prediction modes correspond to different prediction orders.

In another possible design manner, for the to-be-decoded block with a size of a first size, predicting the to-be-decoded block by adopting a third prediction order in the target prediction mode: for the to-be-decoded block with a size of a second size, predicting the to-be-decoded block by adopting a fourth prediction order in the target prediction mode: wherein the third and fourth prediction orders are different. In other words, when the size of the to-be-decoded block is different, if the same prediction mode is used to predict the pixels in the to-be-decoded block, the prediction order may also be different.

In another possible design manner, if the target prediction mode indicates that pixels of each sub-block in the to-be-decoded block are predicted sequentially with a sub-block of a preset size in the to-be-decoded block as a unit, then predicting each pixel in the to-be-decoded block in the target prediction order according to the target prediction mode includes: predicting the pixels in each sub-block in the to-be-decoded block sequentially in a direction indicated by the target prediction order according to the target prediction mode.

In another possible design manner, the target prediction mode comprises a prediction mode for each sub-block in the to-be-decoded block, and for a first sub-block in the to-be-decoded block, the first sub-block comprises a first pixel and a second pixel, and a prediction mode for the first sub-block is used to predict the first pixel and the second pixel in parallel based on rebuilt pixels around the first sub-block.

In another possible design manner, before coding the residual block in the target prediction order to obtain the code stream of the to-be-coded block, the method includes: determining a quantization parameter QP of each pixel in the to-be-coded block: performing quantization on the residual block of the to-be-coded block based on the QP of each pixel and a quantization preset array to obtain the first residual block. In this case, coding the residual block in the target prediction order to obtain the code stream of the to-be-coded block includes: coding the first residual block in the target prediction order to obtain the code stream of the to-be-coded block.

In another possible design manner, coding the first residual block in the target prediction order to obtain the code stream of the to-be-coded block includes: coding the first residual block in the target prediction order by using a variable code length coding method to obtain the code stream of the to-be-coded block.

It can be understood that the image coding method provided by the second aspect and any of the possible design manner thereof corresponds to the image decoding method provided by the first aspect and any of the possible design thereof. Therefore, beneficial effects of a technical solution provided by the second aspect and any of the possible design manner thereof can be referred to the description of beneficial effects of corresponding image decoding method in the first aspect, which will not be repeated here.

In a third aspect, the present application provides an image decoding method, the method includes: parsing a code stream of a to-be-decoded block to obtain an inverse quantization parameter of each pixel in the to-be-decoded block and a first residual block of the to-be-decoded block: performing inverse quantization on the first residual block based on an inverse quantization preset array and a quantization parameter QP indicated by the inverse quantization parameter of each pixel, to obtain a second residual block: rebuilding the to-be-decoded block based on the second residual block to obtain a rebuilt block.

Through the image decoding method provided by the present application, in the image decoding process, the quantization processing method implemented based on the quantization preset array provided by the present application reduces the multiplication operations in the quantization process. Since the calculation resources occupied by the multiplication operations are relatively high, reducing the multiplication operation can reduce the calculation resources occupied in the quantization process, thereby greatly saving the calculation resources of the decoding end. In addition, the speed of the multiplication operations is slow, so the efficiency of the quantization processing process in the image decoding method is greatly improved compared with the prior art, and thus the image decoding method greatly improves the efficiency of the image decoding.

In a possible design manner, parsing the code stream of the to-be-decoded block to obtain the inverse quantization parameter of each pixel in the to-be-decoded block and the first residual block of the to-be-decoded block includes: determining a target prediction mode for predicting pixels in the to-be-decoded block and an inverse quantization parameter of each pixel in the to-be-decoded block based on the code stream of the to-be-decoded block: determining a residual scanning order corresponding to the target prediction mode based on the target prediction mode; parsing the code stream of the to-be-decoded block based on the residual scanning order to obtain the first residual block. Wherein when the target prediction mode is a first target prediction mode, the residual scanning order is a first scanning order, and when the target prediction mode is a second target prediction mode, the residual scanning order is a second scanning order, and the first and second scanning orders are different. In other words, different prediction modes correspond to different residual scanning orders.

In another possible design manner, for the to-be-decoded block with a size of a first size, parsing the code stream of the to-be-decoded block by adopting a third scanning order in the target prediction mode: for the to-be-decoded block with a size of a second size, parsing the code stream of the to-be-decoded block by adopting a fourth scanning order in the target prediction mode: wherein the third and fourth scanning orders are different. In other words, when the size of the to-be-decoded block is different, if the same prediction mode is used to predict the pixels in the to-be-decoded block, the residual scanning order when parsing the code stream of the to-be-decoded block may also be different.

Based on the two possible design manners, when the residual block of the to-be-decoded block is obtained based on the residual scanning order, if the predicted block of the to-be-decoded block is predicted in the target prediction order that is the same as the residual scanning order, the efficiency of rebuilding the to-be-decoded block based on the residual block and the predicted block can be improved, that is, the two possible design methods further improve the efficiency of image decoding. In addition, when coding on the coding side, a scanning order that is suitable for the target prediction mode can be selected, so that the residual block can be coded with fewer bits during coding, that is, the to-be-coded block is coded with fewer bits, and accordingly, the number of bits that need to be decoded on the decoding side decreases, and the decoding efficiency is improved. Therefore, the decoding method provided by the possible design can further improve the efficiency of image decoding.

In another possible design manner, in the above inverse quantization preset array, an interval between two adjacent numbers from the 1st to the nth numbers is 1, an interval between two adjacent numbers from the (n+1)th to the (n+m)th numbers is 2, and a numerical interval between two adjacent numbers from the (n+k*m+1)th to the (n+k*m+m) th numbers is $2^{k+1}$. Wherein, n and m are integers greater than 1, and i and k are both positive integers.

In another possible design manner, performing inverse quantization on the first residual block based on the QP of each pixel and the inverse quantization preset array to obtain the second residual block includes: determining an amplification coefficient corresponding to each pixel in the inverse quantization preset array based on the QP of each pixel: performing inverse quantization on the first residual block based on the amplification coefficient corresponding to each pixel, to obtain the second residual block.

In another possible design manner, performing inverse quantization on the first residual block based on the QP of each pixel and the inverse quantization preset array to obtain the second residual block includes: determining an amplification parameter and a displacement parameter corresponding to each pixel based on the QP of each pixel and the inverse quantization preset array, performing inverse quantization on the first residual block based on the amplification parameter and displacement parameter corresponding to each pixel to obtain the second residual block. Wherein, the value of the amplification parameter corresponding to each pixel is a value corresponding to a value after bitwise AND the QP and 7 in the inverse quantization preset array, and the value of the displacement parameter corresponding to each pixel is the difference between 7 and the quotient of the QP of each pixel divided by $2^3$.

Based on the above three possible implementations, it is possible to further reduce the multiplication operations in the inverse quantization process based on the preset inverse quantization preset array. Since the calculation resources occupied by the multiplication operations are relatively high, reducing the multiplication operations can reduce the calculation resources occupied in the inverse quantization process. That is, the inverse quantization processing method implemented based on the quantization preset array provided by the present application greatly saves the calculation resources of the decoding end. In addition, the speed of the multiplication operations is slow, so the efficiency of the inverse quantization processing process in the image decoding method is greatly improved compared with the prior art. Therefore, the decoding method provided by this possible design can further improve the efficiency of image decoding.

In another possible design manner, rebuilding the to-be-decoded block based on the second residual block to obtain the rebuilt block includes: performing inverse transform on the second residual block to rebuild the residual value block of the to-be-decoded block: rebuilding the to-be-decoded block based on the residual value block to obtain the rebuilt block.

In another possible design manner, rebuilding the to-be-decoded block based on the second residual block includes: predicting each pixel in the to-be-decoded block in a target prediction order corresponding to the target prediction mode according to the target prediction mode; rebuilding the to-be-decoded block based on a predicted value of each pixel and the second residual block to obtain the rebuilt block.

From the foregoing discussion, it can be seen that the prediction efficiency can be improved when predicting the to-be-decoded block based on the target prediction mode provided by the present application, and thus the efficiency of image decoding is further improved through this possible design manner.

In another possible design manner, parsing the code stream of the to-be-decoded block includes: parsing the code stream of the to-be-decoded block by using a variable code length decoding method to obtain a first residual block and a code length CL for coding each value in a residual block corresponding to the to-be-decoded block.

Through this possible design manner, the residual block and the CL of the to-be-decoded block are coded with fewer bits on the coding side, so fewer bits need to be decoded on the corresponding decoding side, and the decoding efficiency is improved. Therefore, the decoding method provided by this possible design manner can further improve the efficiency of image decoding.

In a fourth aspect, the present application provides an image coding method, the method includes: determining a second residual block of a to-be-coded block and a quantization parameter QP of each pixel in the to-be-coded block; quantizing the second residual block based on the QP of each pixel and the quantization preset array to obtain a first residual block: coding the first residual block to obtain a code stream of the to-be-coded block.

Through the image coding method provided by the present application, in the image coding process, the quantization processing method implemented based on the quantization preset array provided by the present application reduces the multiplication operations in the quantization process. Since the calculation resources occupied by multiplication are relatively high, reducing the multiplication operations can reduce the calculation resources occupied in the quantization process, thereby greatly saving the calculation resources of the coding end, and since the multiplication operations is time-consuming, reducing the multiplication operations can improve the calculation efficiency of the quantization process, and thus the image coding method greatly improves the efficiency of image coding.

In another possible design manner, coding the first residual block to obtain the code stream of the to-be-coded block includes determining the target prediction mode of the to-be-coded block, and determining the residual scanning order corresponding to the target prediction mode; coding the residual block in the residual scanning order to obtain the code stream of the to-be-coded block. Wherein, when the target prediction mode is a first target prediction mode, the residual scanning order is a first scanning order, and when the target prediction mode is a second target prediction mode, the residual scanning order is a second scanning order, and the first and second scanning orders are different.

In another possible design manner, for the to-be-coded block with a size of a first size, coding the to-be-coded block by using a third scanning order in the target prediction mode: for the to-be-coded block with a size of a second size, coding the to-be-coded block by using a fourth scanning order in the target prediction mode: wherein the third and fourth scanning orders are different.

In another possible design manner, the above quantization preset array includes an amplification parameter array and a displacement parameter array, the amplification parameter array and the displacement parameter array include the same number of numerical values, for the i-th value amp[i] in the amplification parameter array and the i-th value shift[i] in the displacement parameter array, an inverse quantization preset array formed by a quotient of $2^{shift[i]}$ and amp[i] has the following rules: an interval between two adjacent numbers from the 1st to the nth is 1, an interval between two adjacent numbers from the (n+1)th to the (n+m)th is 2, and a numerical interval between two adjacent numbers from the (n+k*m+1)th to the (n+k*m+m)th is $2^{k+1}$. Wherein, n and m are integers greater than 1, and i and k are both positive integers.

In another possible design manner, performing quantization on the second residual block based on the QP of each pixel and the quantization preset array to obtain the first residual block includes: determining an amplification parameter of each pixel in an amplification parameter array based on the QP of each pixel, and determining a displacement parameter of each pixel in a displacement parameter array: performing quantization on the second residual block based on the amplification parameter and displacement parameter of each pixel to obtain the first residual block.

In another possible design manner, performing quantization on the second residual block based on the QP of each pixel and the quantization preset array to obtain the first residual block includes: determining an amplification parameter and a displacement parameter corresponding to each pixel based on the QP of each pixel and the quantization preset array: performing quantization on the second residual block based on the amplification parameter and displacement parameter corresponding to each pixel, to obtain the second residual block. Wherein, the value of the amplification parameter corresponding to each pixel is a value corresponding to a value after bitwise AND the QP and 7 in the quantization preset array, and the value of the displacement parameter corresponding to each pixel is the sum of 7 and the quotient of the QP of each pixel divided by $2^3$.

In another possible design manner, the second residual block is an original residual value block of the to-be-coded block, or the second residual block is a residual coefficient block obtained after the residual value block is transformed.

In another possible design manner, determining the second residual block of the to-be-coded block includes: predicting each pixel in the to-be-coded block in a target prediction order according to the target prediction mode, and determining the second residual block based on a predicted value of each pixel in the to-be-coded block.

In another possible design manner, coding the first residual block to obtain the code stream of the to-be-coded block includes: coding the first residual block in a variable code length coding method to obtain the code stream of the to-be-coded block.

It can be understood that the image coding method provided by the fourth aspect and any of the possible design manner thereof corresponds to the image decoding method provided by the third aspect and any of the possible design thereof. Therefore, beneficial effects of a technical solution provided by the fourth aspect and any of the possible design manner thereof can be referred to the description of beneficial effects of the corresponding method in the third aspect, which will not be repeated here.

In a fifth aspect, the present application provides an image coding method, the method includes: determining a residual block corresponding to a to-be-coded block, and coding the residual block by using a variable code length coding method to obtain a code stream of the to-be-coded block.

Through the coding method provided by the present application, when the coding end codes the residual block of the to-be-coded block through a variable code length coding method, for example, an exponential Golomb coding algorithm with a transformable order, it can adaptively code the smaller residual value with fewer bits, thereby achieving the purpose of saving bits. That is, while improving the compression rate of image coding, the coding method provided by the present application also improves the coding efficiency.

In one possible design manner, the variable code length coding method includes an exponential Golomb coding method with a transformable order. Then, coding the residual block by using the variable code length coding method to obtain the code stream of the to-be-coded block includes: determining an attribute type of each pixel in the to-be-coded block; for a first value in the residual block corresponding to a third pixel of the to-be-coded block, determining a target order for coding the first value based on a preset strategy and the attribute type of the third pixel: coding the first value by using the exponential Golomb coding algorithm of the target order to obtain a code stream.

In another possible design manner, the above variable code length coding method includes an exponential Golomb coding method of a preset order, and coding the residual block by using the variable code length coding method to obtain the code stream of the to-be-coded block includes: for a first value in the residual block corresponding to a third pixel of the to-be-coded block, coding the first value by using the exponential Golomb coding algorithm of the preset order to obtain a code stream.

The two possible design manners realize variable-length coding of residual values in residual blocks through the exponential Golomb coding method of a transformable or specified order. This coding method can adaptively code the smaller residual value with fewer bits, thereby achieving the purpose of saving bits.

In another possible design manner, the method further includes: determining a syntax element corresponding to the residual block, wherein the syntax element includes a code length CL for coding each value in the residual block, and coding the CL of each value in a variable code length coding method to obtain a code stream.

In another possible design manner, the variable code length coding method includes an exponential Golomb coding method of a transformable order, and for any value in the residual block, coding the CL of each value by using the variable code length coding method to obtain the code stream includes: determining a target order for coding a CL of any value: coding the CL of this value by using an exponential Golomb coding algorithm of the target order to obtain the code stream.

The two possible designs manner implement variable-length coding of a CL of a residual value in the residual block through the exponential Golomb coding method of variable or specified order. The coding method can adaptively code a smaller CL with fewer bits, thereby achieving the purpose of saving bits.

In another possible design manner, for any value in the residual block, coding the CL of each value by using the variable code length coding method to obtain the code stream includes: when a CL of any value is less than or equal to a threshold, coding the CL of this value by using a preset number of bits to obtain the code stream: when a CL of any value is greater than the threshold, coding the CL of this value by using a truncated unary code to obtain the code stream.

This possible design manner implements variable-length coding of the CL of the residual value in the residual block through fixed-length coding and truncated unary code. This coding method can adaptively code a smaller CL with fewer bits, thereby achieving the purpose of saving bits.

In another possible design manner, the above residual block is an original residual value block of the to-be-coded block: or, the above residual block is a residual coefficient block obtained after the original residual value block is transformed: or, the above residual block is the quantized coefficient block obtained after the residual coefficient block is quantized.

In another possible design manner, if the above residual block is the original residual value block of the to-be-coded block, then determining the residual block corresponding to the to-be-coded block includes: determining a target prediction mode of the to-be-coded block, and determining a target prediction order corresponding to the target prediction mode: predicting each pixel in the to-be-coded block in the target prediction order according to the target prediction mode: determining the residual block based on a predicted value of each pixel in the to-be-coded block.

Through this possible design manner, since the prediction efficiency can be improved when predicting the to-be-coded block based on the target prediction mode provided by the present application, this possible design method further improves the efficiency of image coding.

In another possible design manner, if the above residual block is a quantized coefficient block obtained after quantization of the residual coefficient block, then before coding the residual block by using the variable code length coding method to obtain the code stream of the to-be-coded block, the above method further includes: determining a quantization parameter QP of each pixel in the to-be-coded block:

performing quantization on the residual value block of the to-be-coded block based on QP of each pixel and a quantization preset array to obtain a residual block.

Through this possible design manner, the quantization of the residual value block of to-be-coded block can be achieved based on fewer multiplication operations, that is, the quantization of the residual value block of the to-be-coded block can be achieved efficiently. Therefore, the coding method provided by this possible design can further improve the efficiency of image coding.

In a sixth aspect, the present application provides an image decoding method, the method includes: parsing a code stream of a to-be-decoded block by using a variable code length decoding method to obtain a code length CL for coding each value in a residual block corresponding to the to-be-decoded block: determining the residual block based on the CL for coding each value: rebuilding the to-be-decoded block based on the residual block to obtain a rebuilt block.

In another possible design manner, the variable code length decoding method comprises an exponential Golomb decoding method of a transformable order or a preset order, and parsing the code stream of the to-be-decoded block by using the variable code length decoding method to obtain the code length CL for coding each value in the residual block corresponding to the to-be-decoded block includes: determining a target order for parsing the CL for coding each value in the residual block: parsing the code stream by using an exponential Golomb decoding algorithm of the target order to obtain the CL for coding each value in the residual block.

In another possible design manner, parsing the code stream of the to-be-decoded block by using the variable code length decoding method to obtain the code length CL for coding each value in the residual block corresponding to the to-be-decoded block includes: when the number of bits of a CL for coding any value in the residual block is a preset number, parsing the code stream based on a fixed-length decoding strategy to obtain the CL for coding this value: when the number of bits of the CL for coding any value in the residual block is greater than the preset number, parsing the code stream based on a rule of truncated unary code to obtain the CL for coding this value.

In another possible design manner, determining the residual block based on the CL for coding each value includes: determining a bit group corresponding to each pixel in the to-be-decoded block in the code stream based on the CL for coding the each value: determining an attribute type of each pixel in the to-be-decoded block: for a first bit group corresponding to a third pixel in the to-be-decoded block, determining a target order for parsing the first bit group based on a preset strategy and an attribute type of the third pixel: parsing the first bit group by using the exponential Golomb decoding algorithm of the target order to obtain the residual block.

In another possible design manner, determining the residual block based on the CL for coding each value comprises: determining a bit group corresponding to each pixel in the to-be-decoded block in the code stream based on the CL for coding the each value: for the first bit group corresponding to the third pixel in the to-be-decoded block, parsing the first bit group by using the exponential Golomb decoding algorithm of a preset order to obtain the residual block.

In another possible design manner, rebuilding the to-be-decoded block based on the residual block to obtain the rebuilt block includes: performing inverse quantization and inverse transformation on the residual block, or performing inverse quantization on the residual block to rebuild a residual value block of the to-be-decoded block; rebuilding the to-be-decoded block based on the residual value block to obtain the rebuilt block.

In another possible design manner, rebuilding the to-be-decoded block based on the residual block to obtain the rebuilt block includes: determining a target prediction mode for predicting pixels in the to-be-decoded block based on the code stream of the to-be-decoded block; determining a target prediction order corresponding to the target prediction mode based on the target prediction mode: predicting each pixel in the to-be-decoded block in the target prediction order according to the target prediction mode: rebuilding the to-be-decoded block based on a predicted value of the each pixel of the to-be-decoded block to obtain the rebuilt block.

In another possible design manner, performing inverse quantization on the residual block includes: performing inverse quantization on the residual block based on an inverse quantization parameter of each pixel in the to-be-decoded block obtained by parsing the code stream of the to-be-decoded block and an inverse quantization preset array.

It can be understood that the image decoding method provided by the sixth aspect and any of the possible design manner thereof corresponds to the image coding method provided by the fifth aspect and any of the possible design thereof. Therefore, beneficial effects of a technical solution provided by the sixth aspect and any of the possible design manner thereof can be referred to the description of beneficial effects of the corresponding image coding method in the fifth aspect, which will not be repeated here.

In a seventh aspect, the present application provides an image decoding apparatus. The decoding apparatus may be a video decoder or a device including the video decoder. The decoding apparatus includes individual module for implementing the method in any possible implementation of the first, third, or sixth aspect. The decoding apparatus has a function of implementing the actions in the above related method instance. The function may be implemented by hardware, or by the hardware executing corresponding software. The hardware or software includes one or more modules corresponding to the above function. Beneficial effects thereof can be found in the description of the corresponding method, which will not be repeated here.

In an eighth aspect, the present application provides an image coding apparatus. The coding apparatus may be a video coder or a device including the video coder. The coding apparatus includes individual module for implementing the method in any possible implementation of the second, fourth, or fifth aspect. The coding apparatus has a function of implementing the actions in the above related method instance. The function may be implemented by hardware, or by the hardware executing respective software. The hardware or software includes one or more modules corresponding to the above function. Beneficial effects thereof can be found in the description of the corresponding method, which will not be repeated here.

In a ninth aspect, the present application provides an electronic device including a processor and a memory, wherein the memory is configured to store computer instructions, and a processor configured to call and execute the computer instructions from the memory to implement a method of any implementation in the first to sixth aspects.

For example, the electronic device may refer to a video coder, or a device including the video coder.

For another example, the electronic device may refer to a video decoder, or a device including the video decoder.

In a tenth aspect, the present application provides a computer-readable storage medium, which stores a computer program or instructions thereon which, when executed by a computing device or a storage system where the computing device is located, a method of any implementation of the first to sixth aspects is implemented.

In an eleventh aspect, the present application provides a computer program product containing instructions, which when running on a computing device or a processor, causes the computing device or the processor to execute the instructions to implement a method of any implementation of the first to sixth aspects.

In a twelfth aspect, the present application provides a chip containing a processor and a memory, wherein the memory is configured to store computer instructions, and the processor is configured to call and execute the computer instructions from the memory to implement a method of any implementation in the first to sixth aspects.

In a thirteenth aspect, the present application provides an image decoding system, which includes a coding end and a decoding end, wherein the decoding end is configured to implement the corresponding decoding method provided in the first, third or sixth aspect, and the coding end is configured to implement the coding method corresponding to the decoding method.

Based on the implementations provided in the above aspects, the present application can be further combined to provide more implementations. In other words, any possible implementation of any of the above aspects can be applied to other aspects without conflict, thereby obtaining a new embodiment. For example, any image decoding method provided in the first, third and sixth aspects can be combined in pairs or in three aspects without conflict, thereby obtaining a new image decoding method.

BRIEF DESCRIPTION OF THE DRAWINGS

The accompanying drawings described here are used to provide a further understanding of the present application and constitute a part of the same. The illustrative embodiments of the present application and their descriptions are used to explain the present application and do not constitute an improper limitation of the present application.

FIG. 7*c*-1 is a schematic diagram of another prediction order provided by an embodiment of the present application;

FIG. 7*c*-2 is a schematic diagram of another prediction order provided by an embodiment of the present application;

FIG. 7*d*-1 is a schematic diagram of another prediction order provided by an embodiment of the present application;

FIG. 7*d*-2 is a schematic diagram of another prediction order provided by an embodiment of the present application;

FIG. 7*d*-3 is a schematic diagram of another prediction order provided by an embodiment of the present application;

FIG. 7*e* is a schematic diagram of another prediction order provided by an embodiment of the present application;

FIG. 7*f* is a schematic diagram of another prediction order provided by an embodiment of the present application;

FIG. 7*g* is a schematic diagram of another coding order provided by an embodiment of the present application;

FIG. 8 is a schematic diagram of a flow chart of another image decoding method provided in an embodiment of the present application;

DETAILED DESCRIPTION

Figure 1:
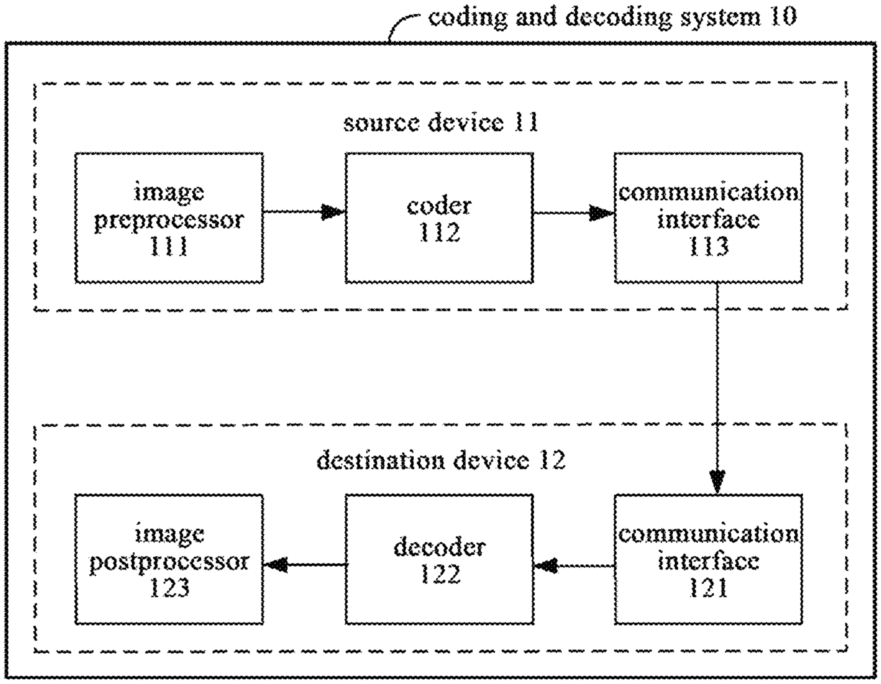
FIG. 1 is a schematic diagram of an architecture of a coding and decoding system 10 applied in an embodiment of the present application.

In order to more clearly understand embodiments of the present application, some terms or technologies involved in the embodiments of the present application are explained below:

1) Prediction Mode

The combination of prediction methods used to predict a predicted value of each pixel in the current image block (such as an image block to be coded (hereinafter referred to as a to-be-coded block) or an image block to be decoded (hereinafter referred to as a to-be-decoded block)) is referred to as a prediction mode. Wherein different prediction methods can be used to predict different pixels in the current image block, or the same prediction method can be used. The prediction methods used to predict all of the pixels in the current image block can be collectively referred to as a (or corresponding) prediction mode of the current image block.

Optionally, the prediction modes include a point-by-point prediction mode, an intra-frame prediction mode, a block copy mode, and an original value mode (i.e., a mode that directly decodes the rebuilt value with a fixed bit width), etc.

For example, the point-by-point prediction mode refers to a prediction mode that uses rebuilt values of adjacent pixels around a pixel to be predicted as the predicted value of the pixel to be predicted. The point-by-point prediction mode includes one or more combinations of prediction method such as a vertical prediction, a horizontal prediction, a vertical mean prediction, and a horizontal mean prediction.

Wherein the vertical prediction is to obtain the predicted value (PointPredData) of the pixel to be predicted by using the rebuilt value of a pixel on the upper side of the pixel to be predicted (which can be an adjacent upper side or a non-adjacent upper side but close to the pixel). In the embodiment of the present application, the prediction method using vertical prediction is referred to as T prediction method. One example is that the rebuilt value of the adjacent pixel on the upper side of the pixel to be predicted is used as the predicted value of the pixel to be predicted.

The horizontal prediction is to obtain the predicted value of the pixel to be predicted by using the rebuilt value of a pixel on the left side of the pixel to be predicted (which can be an adjacent left side or a non-adjacent left side but close to the pixel). In the embodiment of the present application, the prediction method using horizontal prediction is referred to as a L prediction method. One example is that the rebuilt value of the adjacent pixel on the left side of the pixel to be predicted is used as the predicted value of the pixel to be predicted.

The vertical mean prediction is to obtain the predicted value of the pixel to be predicted by using the rebuilt values of pixels above and below the pixel to be predicted. In the embodiment of the present application, the prediction method using vertical mean prediction is referred to as a TB prediction method. One example is that the average of the rebuilt value of the adjacent pixel vertically above the pixel to be predicted and the rebuilt value of the adjacent pixel vertically below the pixel to be predicted is used as the predicted value of the pixel to be predicted.

The horizontal mean prediction is to obtain the predicted value of the pixel to be predicted by using the rebuilt values of pixels on the left and right sides of the pixel to be predicted. In the embodiment of the present application, the prediction method using horizontal mean prediction is referred to as a RL prediction method. One example is that the average of the rebuilt value of the adjacent pixel on the left side of the pixel to be predicted and the rebuilt value of the adjacent pixel on the right side of the pixel to be predicted is used as the predicted value of the pixel to be predicted.

For example, the intra prediction mode is a prediction mode that uses the rebuilt value of a pixel in the adjacent block around the block to be predicted as the predicted value.

For example, the block copy mode is a prediction mode that uses the rebuilt value of a pixel in a (decoded) block of (not necessarily adjacent) as the predicted value.

For example, the original value mode is a mode that directly decodes the rebuilt value with a fixed bit width, that is, a non-reference prediction mode.

2) Residual Coding Mode

The way of coding a residual (i.e., a residual block, which is composed of a residual value of each pixel in the current image block) of the current image block (such as the to-be-coded block or the to-be-decoded block) is referred to as a residual coding mode. The residual coding mode may include a skip residual coding mode and a normal residual coding mode.

In the skip residual coding mode, three is no need to code (decode) a residual coefficient. At this time, the residual values of the pixels in the current image block are all 0, and the rebuilt value of each pixel is equal to the predicted value of the pixel.

In the normal residual coding mode, it is necessary to code (decode) a residual coefficient. At this time, the residual values of the pixels in the current image block are not all 0, and the rebuilt value of each pixel can be obtained based on the predicted value and residual value of the pixel.

In one example, the residual coefficient of the pixel may be equivalent to the residual value of this pixel; in another example, the residual coefficient of the pixel may be obtained after a certain processing on the residual value of the pixel.

3) Quantization and Inverse Quantization

In the process of image coding, in order to achieve compression of the image, a residual block of a to-be-coded block is usually quantized, or a residual coefficient block obtained after a certain processing on the residual block is quantized, so that the quantized residual block or residual coefficient block can be coded with fewer bits. It can be understood that the residual block is a residual value block obtained based on an original pixel block and a predicted block of the to-be-coded block, and the residual coefficient block is a coefficient block obtained after a certain processing and transform of the residual block.

As an example, taking the coding apparatus quantizing the residual block as an example, the coding apparatus may divide each residual value in the residual block of the to-be-coded block by a quantization coefficient to reduce the residual value in the residual block. In this way, compared with the residual value that has not been quantized, the reduced residual value after quantization can be coded with fewer bits, thus achieving compression coding of the image.

Correspondingly, in order to rebuild the image block from a compressed and coded code stream, the decoding apparatus can perform inverse quantization on the residual block or residual coefficient block parsed from the code stream, so as to rebuild the un-quantized residual block or residual coefficient block corresponding to the image block. Then, the decoding apparatus rebuilds the image block based on the rebuilt residual block or residual coefficient block, so as to obtain a rebuilt block of the image.

As an example, taking the quantized residual block of the to-be-decoded block parsed from the code stream by the decoding apparatus as an example, the coding apparatus can perform inverse quantization on the residual block. Specifically, the coding apparatus can multiply each residual value in the parsed residual block by a quantization coefficient to rebuild the residual value in the un-quantized residual block corresponding to the to-be-decoded block, thereby obtaining a rebuilt residual block. Wherein, the quantization coefficient is a quantization coefficient used by the coding apparatus to the residual block of the to-be-decoded block when coding the to-be-decoded block. In this way, the decoding apparatus can realize the rebuilding of the to-be-decoded block based on the residual block rebuilt after inverse quantization, and obtain the rebuilt block of the to-be-decoded block.

4) Other Terms

A term "at least one" in embodiments of the present application includes one or more. "More" refers to two or more than two. For example, at least one of A, B and C includes the cases that A exists alone, B exists alone, A and B exist at the same time, A and C exist at the same time, B and C exist at the same time, and A, B and C exist at the same time. In the description of the present application, unless otherwise specified, "/" means or, for example, A/B can represent A or B; "and/or" herein is only a description of an association relationship of the associated objects, indicating that there can be three relationships, for example, A and/or B can represent that A exists alone, A and B exist at the same time, and B exists alone. "More" refers to two or more than two. In addition, in order to facilitate the clear description of the technical solution of the embodiments of the present application, in the embodiments of the present application, words such as "first", "second" are used to distinguish the same items or similar items with substantially the same functions and effects. Those skilled in the art can understand that the words such as "first", "second" do not limit quantity and execution order, and the words such as "first", "second" are not necessarily different.

The system architecture used in embodiments of the present application is described in the following.

Referring to FIG. 1, FIG. 1 shows a schematic diagram of the architecture of a coding and decoding system 10 applied in an embodiment of the present application. As shown in FIG. 1, the coding and decoding system 10 may include a source device 11 and a destination device 12. Wherein the source device 11 is used to code an image, thus the source device 11 may be referred to as an image coding apparatus or a video coding apparatus. The destination device 12 is used to decode the coded image data generated by the source device 11, thus the destination device 12 may be referred to as an image decoding apparatus or a video decoding apparatus.

The specific form of the source device 11 and the destination device 12 can be various devices, which are not limited in the embodiment of the present application. For example, the source device 11 and the destination device 12 can be a desktop computer, a mobile computing device, a notebook (e.g., a laptop) computer, a tablet computer, a set-top box, a telephone handset such as a so-called "smart" phone, a television, a camera, a display device, a digital media player, a video game console, a car computer, or other similar devices.

Optionally, the source device 11 and the destination device 12 in FIG. 1 may be two separate devices. Alternatively, the source device 11 and the destination device 12 are the same device, that is, the source device 11 or a function corresponding to the source device 11, and the destination device 12 or a function corresponding to the destination device 12 may be integrated on the same device.

The source device 11 and the destination device 12 may communicate with each other. For example, the destination device 12 may receive coded image data from the source device 11. In one example, one or more communication media used to transmit the coded image data may be included between the source device 11 and the destination device 12. The one or more communication media may include a router, a switch, a base station, or other devices that facilitate communication from the source device 11 to the destination device 12, which is not limited in the embodiments of the present application.

As shown in FIG. 1, the source device 11 includes a coder 112. Optionally, the source device 11 may also include an image preprocessor 111 and a communication interface 113. Wherein, the image preprocessor 111 is used to perform preprocessing on the received to-be-coded image. For example, the preprocessing performed by the image preprocessor 111 may include retouching, color format conversion (for example, from RGB format to YUV format), color adjustment or denoising, etc. The coder 112 is used to receive an image preprocessed by the image preprocessor 111, and process the preprocessed image by using a related prediction mode to provide coded image data. In some embodiments, the coder 112 may be used to perform coding processes in various embodiments described below. The communication interface 113 may be used to transmit the coded image data to the destination device 12 or any other device (such as a memory) for storage or direct reconstruction. The other device may be any device for decoding or storage. The communication interface 113 may also encapsulate the coded image data into a suitable format before transmission.

Optionally, the image preprocessor 111, the coder 112, and the communication interface 113 may be hardware components in the source device 11, or may be software programs in the source device 11, which is not limited in the embodiment of the present application.

The destination device 12 includes a decoder 122. Optionally, the destination device 12 may also include a communication interface 121 and an image post-processor 123. The communication interface 121 may be used to receive coded image data from the source device 11 or any other source device, such as a storage device. The communication interface 121 may also decapsulate the data transmitted by the communication interface 113 to obtain the coded image data. The decoder 122 is used to receive the coded image data and output the decoded image data (also referred to as reconstructed image data or the image data that has been reconstructed). In some embodiments, the decoder 122 may be used to perform the decoding processes described in various embodiments described below. The image post-processor 123 is used to perform post-processing on the decoded image data to obtain post-processed image data. The post-processing performed by the image post-processor 123 may include color format conversion (for example, from YUV format to RGB format), color adjustment, retouching or resampling, or any other processing. The image post-processor 123 may also be used to transmit the post-processed image data to a display device for display.

Optionally, the communication interface 121, the decoder 122, and the image post-processor 123 may be hardware components in the destination device 12, or may be software programs in the destination device 12, which is not limited in the embodiment of the present application.

The structures of the coder 112 and the decoder 122 in FIG. 1 are briefly introduced below.

Figure 2:
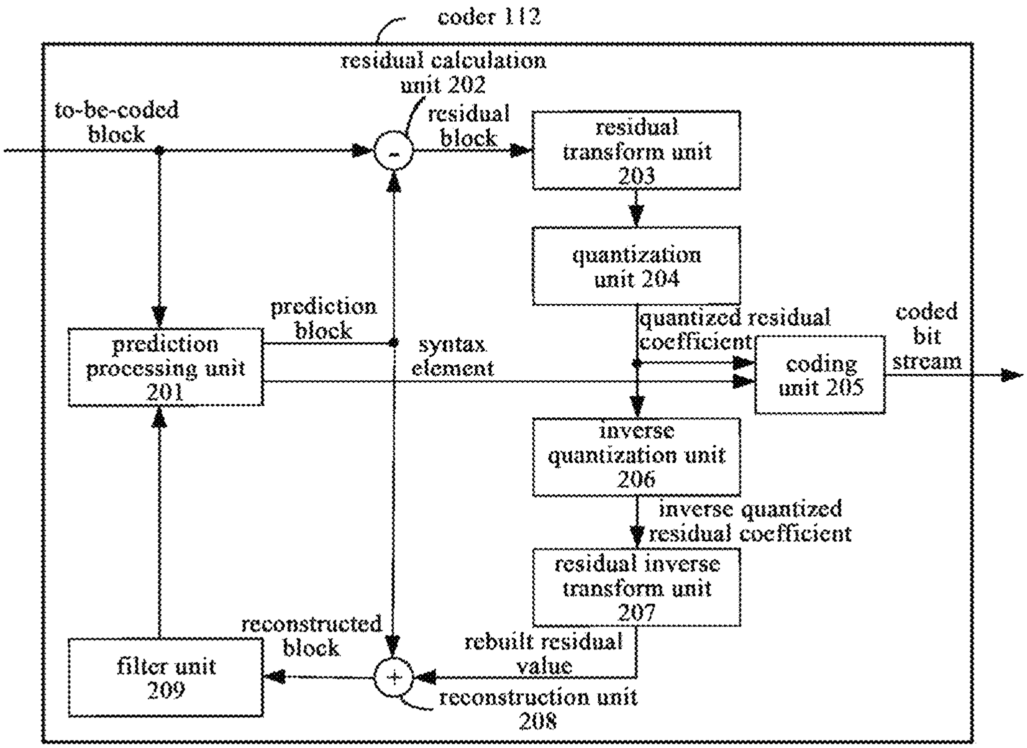
FIG. 2 is a schematic block diagram of an instance of a coder 112 for implementing a method of an embodiment of the present application.

Referring to FIG. 2, FIG. 2 shows a schematic block diagram of an instance of an coder 112 for implementing a method of an embodiment of the present application. As shown in FIG. 2, the coder 112 includes a prediction processing unit 201, a residual calculation unit 202, a residual transform unit 203, a quantization unit 204, an coding unit 205, an inverse quantization unit (also referred to as an inverse quantizer) 206, a residual inverse transform unit 207, a reconstruction unit (or referred to as a rebuilding unit) 208, and a filter unit 209. Optionally, the coder 112 may also include a buffer and a decoded image buffer. Wherein the buffer is used to buffer the reconstructed block (or rebuilt block) output by the reconstruction unit 208, and the decoded image buffer is used to buffer the filtered image block output by the filter unit 209.

In one example, an input of the coder 112 is an image block of the to-be-coded image (i.e., a to-be-coded block or a coding unit). In another example, the input of the coder 112 is the to-be-coded image, and the coder 112 may include a segmentation unit (not shown in FIG. 2), which is used to segment the to-be-coded image into multiple image blocks. The coder 112 is used to code block by block to complete coding of the to-be-coded image. For example, the coder 112 performs coding process on each image block to complete the coding of the to-be-coded image.

In one example, a method for dividing a to-be-coded image into multiple image blocks may include:

Step 1: dividing one frame of image into one or more non-overlapping parallel coding units. There is no dependency between the parallel coding units and they can code and decode in parallel or independently.

Step 2: for each parallel coding unit, a coding end may divide the parallel coding unit into one or more non-overlapping independent coding units. The respective independent coding units may not depend on each other, but may share some header information of the parallel coding unit.

Step 3: for each independent coding unit, a coding end may further divide the independent coding unit into one or more non-overlapping coding units. Wherein, if the independent coding unit is divided into multiple non-overlapping coding units, the division method may be a horizontal equal division method, a vertical equal division method, or a horizontal and vertical equal division method. Of course, the specific implementation is not limited to this. The coding units in the independent coding unit may depend on each other, that is, they may refer to each other during the process of executing the prediction step.

The width of the coding unit is w_cu and the height is h_cu. Optionally, the width is greater than the height (unless it is an edge area). Usually, the coding unit can be fixed w_cu×h_cu, wherein w_cu and h_cu are both powers of 2 (N is greater than or equal to 0), such as 16×4, 8×4, 16×2, 8×2, 4×2, 8×1, 4×1, etc.

The coding unit can include three components: luminance Y, chrominance Cb, and chrominance Cr (or red R, green G, and blue B), or only one of the three components. If it includes three components, the sizes of the three components can be exactly the same or different, which is related to an image input format.

Figure 3:
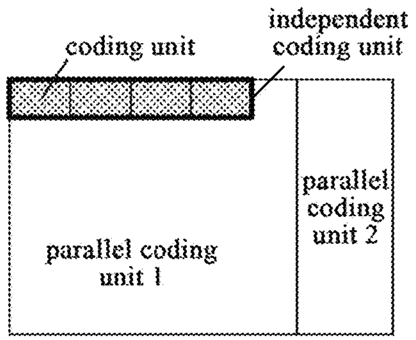
FIG. 3 is a schematic diagram of a correspondence among an image, a parallel coding unit, an independent coding unit, and a coding unit provided by an embodiment of the present application.

As shown in FIG. 3, FIG. 3 is a schematic diagram of a correspondence among an image, a parallel coding unit, an independent coding unit, and a coding unit. For example, the parallel coding unit 1 and the parallel coding unit 2 in FIG. 3 divide an image based on an image area ratio of 3:1, wherein the parallel coding unit 1 includes one independent coding unit divided into 4 coding units.

The prediction processing unit 201 is used to receive or obtain a real value of a to-be-coded block and reconstructed image data, and to predict the to-be-coded block based on the relevant data in the reconstructed image data to obtain a predicted block of the to-be-coded block.

The residual calculation unit 202 is used to calculate a residual value between the real value of the to-be-coded block and the predicted block of the to-be-coded block to obtain a residual block. For example, the residual block is obtained by subtracting the pixel value of the predicted block from the real pixel value of the to-be-coded block pixel by pixel.

In one example, a residual transform unit 203 is used to determine a residual coefficient based on the residual block. Optionally, in this process, it can include performing transform such as discrete cosine transform (DCT) or discrete sine transform (DST) on the residual block to obtain a transform coefficient in the transform domain, and the transform coefficient can also be referred to as a transform residual coefficient or a residual coefficient, and the residual coefficient can represent the residual block in the transform domain. Of course, the coder 112 may not include residual transform in the process of coding the to-be-coded block.

The quantization unit 204 is used to quantize the transform coefficient or residual value by applying scalar quantization or vector quantization to obtain a quantized residual coefficient (or a quantized residual value). The quantization process can reduce a bit depth associated with some or all of the residual coefficients. For example, a p-bit transform coefficient can be rounded down to a q-bit transform coefficient during quantization, wherein p is greater than q. The degree of quantization can be modified by adjusting a quantization parameter (QP). For example, for the scalar quantization, different scales can be applied to achieve finer or coarser quantization. A smaller quantization step size corresponds to the finer quantization, while a larger quantization step size corresponds to the coarser quantization. An appropriate quantization step size can be indicated by the QP.

The coding unit 205 is used to code the above quantized residual coefficient (or the quantized residual value), and output the coded image data (i.e., a coding result of the current to-be-coded block) in the form of a coded bit stream (or code stream), and then the coded bit stream can be transmitted to the decoder, or stored and subsequently transmitted to the decoder or used for retrieval. The coding unit 205 can also be used to code a syntax element of the to-be-coded block, such as coding the prediction mode used by the to-be-coded block into the code stream, etc.

In one example, the coding unit 205 codes the residual coefficient, and a feasible method is semi-fixed length coding. First, the maximum absolute value of the residual in one residual block (RB) is defined as modified maximum (mm). According to the above mm, the number of coding bits for the residual coefficient in the RB is determined (the number of coding bits for the residual coefficient in the same RB is consistent), that is, a coding length CL. For example, if the CL of the current RB is 2 and the current residual coefficient is 1, 2 bits are required to code the residual coefficient 1, which is expressed as 01. In a special case, if the CL of the current RB is 7, it means coding an 8-bit residual coefficient and a 1-bit sign bit. Wherein, the method for determining the CL is to find the minimum M value that satisfies that all of the residuals in the current RB are within the range of [−2^(M−1), 2^(M−1)], and the found M is used as the CL of the current RB. If both boundary values, −2^(M−1) and 2^(M−1), exist in the current RB, M should be increased by 1, that is, M+1 bits are required to code all of the residuals of the current RB; if only one of the two boundary values, −2^(M−1) and 2^(M−1), exists in the current RB, a Trailing bit (a last bit) requires to be coded to determine whether the boundary value is −2^(M−1) or 2^(M−1); if none of the residuals of the current RB exist in either −2^(M−1) or 2^(M−1), there is no need to code the Trailing bit.

Of course, other residual coefficient coding methods may also be used, such as an exponential Golomb (Golomb coding algorithm) coding method, a Golomb-Rice (a variant of the Golomb coding algorithm) coding method, a truncated unary code coding method, a run-length coding method, direct coding of the original residual value, etc.

In addition, for some special cases, the coding unit 205 may also directly code the original value instead of the residual value.

The inverse quantization unit 206 is used to perform inverse quantization on the above quantized residual coefficient (or the quantized residual value) to obtain an inverse quantized residual coefficient (an inverse quantized residual value). The inverse quantization is inverse application of the above quantization unit 204, for example, an application of an inverse quantization solution of the quantization solution applied by the quantization unit 204 based on or using the same quantization step size as the quantization unit 204.

The residual inverse transform unit 207 is used to perform inverse transformation (or inverse transform) on the above inverse quantized residual coefficient to obtain a rebuilt residual block. Optionally, the inverse transform may include an inverse discrete cosine transform (DCT) or inverse discrete sine transform (DST). In this way, an inverse transform value obtained after the inverse transformation (or inverse transform) of the above inverse quantized residual coefficient is a residual value rebuilt in a pixel domain (or a sample domain). That is, the block obtained after the residual inverse transform unit 207 performing inverse transformation on the inverse quantized residual coefficient block is the rebuilt residual block. Of course, when the above residual transform unit 203 is not included in the coder 112, the coder 112 may also not include the step of inverse transformation.

The reconstruction unit 208 is used to add the rebuilt residual block to the predicted block to obtain a reconstructed block in the sample domain. The reconstruction unit 208 can be a summer. For example, the reconstruction unit 208 sums the residual value in the rebuilt residual block with the predicted value of the respective pixel in the predicted block, so as to obtain the rebuilt value of the corresponding pixel. The reconstructed block output by the reconstruction unit 208 can be subsequently used to predict other image blocks to be coded.

The filter unit 209 (or simply "filter") is used to filter the reconstructed block to obtain a filtered block, so as to smoothly perform pixel conversion and thus improve image quality.

Figure 4:
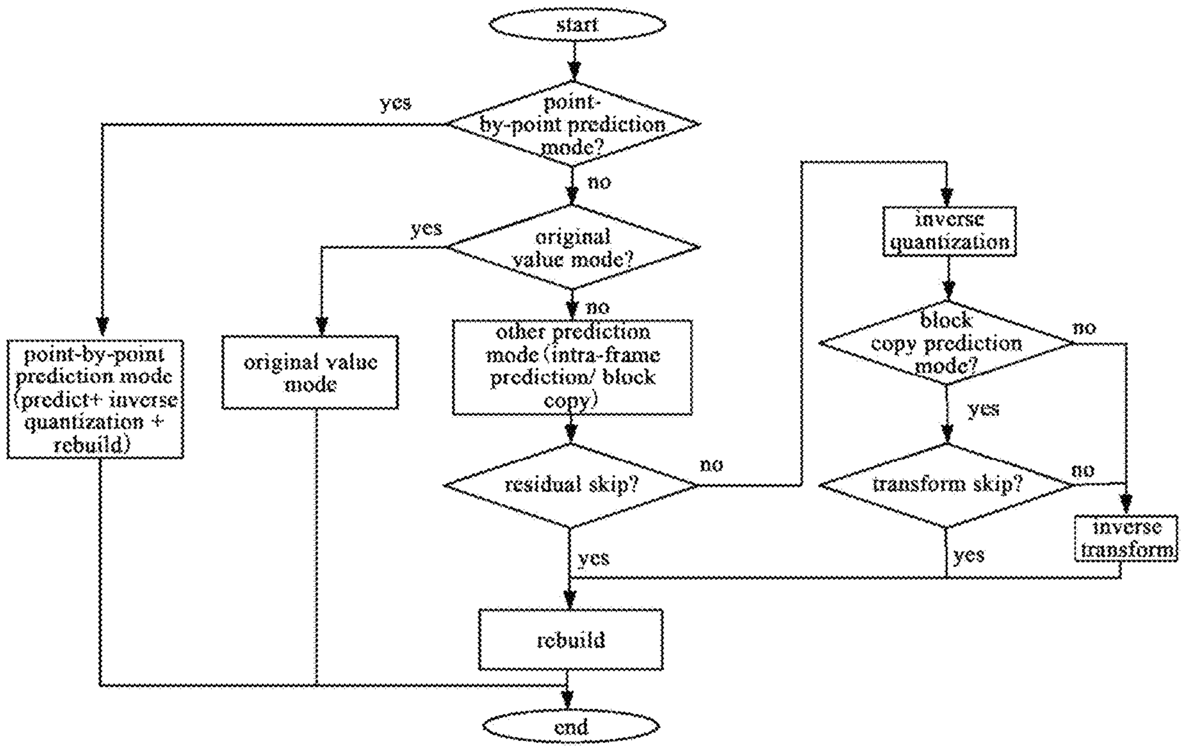
FIG. 4 is a flow chart of a coding process provided by an embodiment of the present application.

In one example, one coding process is shown in FIG. 4. Specifically, a coder determines whether to use a point-by-point prediction mode. If the point-by-point prediction mode is used, the coder predicts pixels in a to-be-coded block based on the point-by-point prediction mode to code the to-be-coded block, and performs inverse quantization and reconstructing on the coding result, thereby realizing the coding process; if the point-by-point prediction mode is not used, the coder determines whether to use an original value mode. If the original value mode is used, the original value mode is used for coding; if the original value mode is not used, the coder determines to use other prediction modes such as an intra-frame prediction mode or a block copy mode for predicting and coding. Subsequently, when it is determined to perform residual skipping, the rebuilding step is directly performed on the coding result; when it is determined not to perform residual skipping, the coding result is first subjected an inverse quantization step to obtain an inverse quantized residual block, and it is determined whether to use the block copy prediction mode. If the block copy prediction mode is determined to be used, in one case, when it is determined to skip the transformation, the rebuilding step is directly performed on the inverse quantized residual block, and in another case, when it is determined not to skip the transformation, the inverse transformation step and rebuilding step are performed on the inverse quantized residual block to realize the coding process. If it is determined not to use the block copy mode (in this case, one of the prediction modes used is the intra-frame prediction mode), the inverse transformation step and rebuilding step are performed on the inverse quantized residual block to realize the coding process.

Specifically, in the embodiment of the present application, the coder 112 is used to implement the coding method described in the embodiments below.

In one example, one coding process implemented by the coder 112 may include the following steps:

Step 11: the prediction processing unit 201 determines a prediction mode, and predicts a to-be-coded block based on the determined prediction mode and a reconstructed block of the coded image block to obtain a predicted block of the to-be-coded block.

Wherein the reconstructed block of the coded image block is obtained after the inverse quantization unit 206, the residual inverse transform unit 207 and the reconstruction unit 208 sequentially process the quantized residual coefficient block of the coded image block.

Step 12: the residual calculation unit 202 obtains a residual block of the to-be-coded block based on the predicted block and original pixel values of the to-be-coded block.

Step 13: the residual transform unit 203 transforms the residual block to obtain a residual coefficient block.

Step 14: the quantization unit 204 quantizes the residual coefficient block to obtain a quantized residual coefficient block.

Step 15: the coding unit 205 codes the quantized residual coefficient block and a related syntax element (such as a prediction mode, a coding mode) to obtain a code stream of the to-be-coded block.

Figure 5:
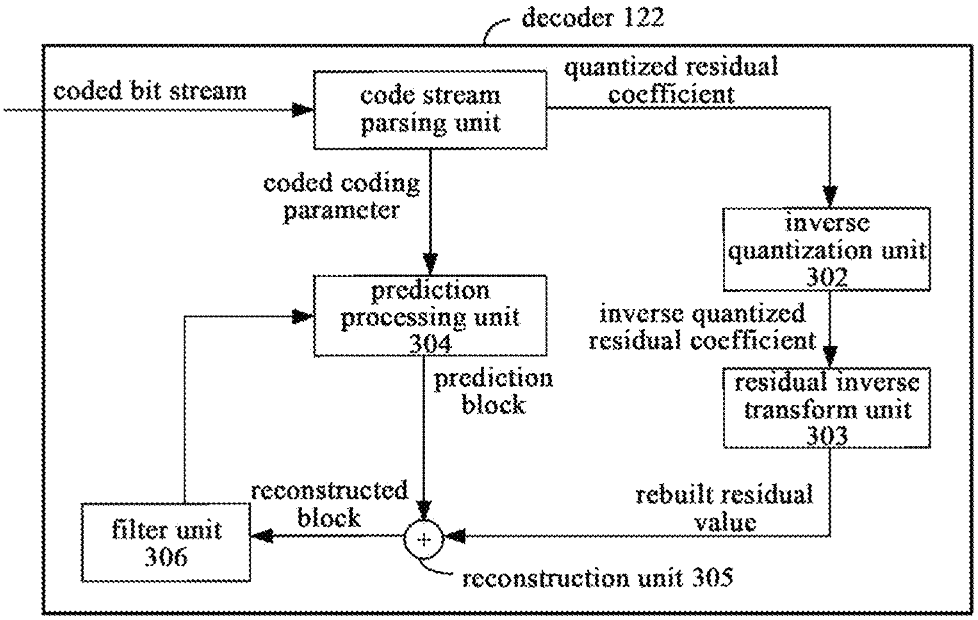
FIG. 5 is a schematic block diagram of an instance of a decoder 122 for implementing the method of an embodiment of the present application.

Referring to FIG. 5, FIG. 5 shows a schematic block diagram of an instance of a decoder 122 for implementing the method of an embodiment of the present application. The decoder 122 is used to receive image data (i.e., a coded bit stream, for example, comprising a coded bit stream of an image block and associated syntax elements) coded by the coder 112 to obtain a decoded image block.

As shown in FIG. 5, the decoder 122 includes a code stream parsing unit 301, an inverse quantization unit 302, a residual inverse transform unit 303, a prediction processing unit 304, a reconstruction unit 305, and a filter unit 306. In some instance, the decoder 122 may perform a decoding process that is substantially an inverse of the coding process described by the coder 112 of FIG. 2. Optionally, the decoder 122 may further include a buffer and a filtered image buffer, wherein the buffer is used to buffer the reconstructed image blocks output by the reconstruction unit 305, and the filtered image buffer is used to buffer the filtered image blocks output by the filter unit 306.

The code stream parsing unit 301 is used to decode the coded bit stream to obtain a quantized residual coefficient (or a quantized residual value) and/or a decoding parameter (for example, the decoding parameter may include any one or all of inter-frame prediction parameters, intra-frame prediction parameters, filter parameters and/or other syntax elements performed by a coding side). The code stream parsing unit 301 is also used to forward the above decoding parameter to the prediction processing unit 304, so that the prediction processing unit 304 performs prediction process based on the decoding parameter.

The function of the inverse quantization unit 302 may be the same as that of the inverse quantization unit 206 of the coder 112, the inverse quantization unit 302 is used to perform inverse quantization (i.e., inverse quantizing) on the quantized residual coefficient decoded and output by the code stream parsing unit 301.

The function of the residual inverse transform unit 303 may be the same as that of the residual inverse transform unit 207 of the coder 112, the residual inverse transform unit 303 is used to perform inverse transformation (e.g., inverse DCT, inverse integer transform, or conceptually similar inverse transform process) on the above inverse quantized residual coefficient to obtain a reconstructed residual value. The block obtained through the inverse transform is a residual block of the reconstructed to-be-decoded block in the pixel domain.

The function of the reconstruction unit 305 (e.g., a summer) may be the same as that of the reconstruction unit 208 of the coder 112.

The prediction processing unit 304 is used to receive or obtain the coded image data (for example, the coded bit stream of the current image block) and the reconstructed image data. The prediction processing unit 304 can also receive or obtain a relevant parameter of the prediction mode and/or information about the selected prediction mode (that is, the above decoding parameter) from, for example, the code stream parsing unit 301, and predict the current image block based on the relevant data and decoding parameter in the reconstructed image data to obtain a predicted block of the current image block.

The reconstruction unit 305 is used to add the rebuilt residual block to the predicted block to obtain a reconstructed block of the image to be decoded in the sample domain, for example, adding the residual value in the rebuilt residual block to the predicted value in the predicted block.

The filter unit 306 is used to filter the reconstructed block to obtain a filtered block, and the filtered block is a decoded image block.

Specifically, in the embodiment of the present application, the decoder 122 is used to implement the decoding method described in the embodiments below.

It should be understood that in the coder 112 and decoder 122 of the embodiment of the present application, the processing result of a certain step can also be further processed and output to the next step. For example, after the steps such as interpolation filtering, motion vector derivation or filtering, the processing result of the corresponding step can be further subjected to operations such as truncation Clip or shift.

In one example, a decoding process implemented by the decoder 122 may include the following steps:

Step 21: the code stream parsing unit 301 parses a prediction mode and a residual coding mode;

Step 22: the code stream parsing unit 301 parses a quantization relevant value (such as neat value (a quantization step size representation value), or QP values, etc.) based on the prediction mode and the residual coding mode;

Step 23: the inverse quantization unit 302 analyzes the residual coefficients based on the prediction mode and the quantization correlation value;

Step 24: the prediction processing unit 304 obtains a predicted value of each pixel of the current image block based on the prediction mode;

Step 25: the residual inverse transform unit 303 performs inverse transformation on the residual coefficient to rebuild the residual value of each pixel of the current image block;

Step 26: the reconstruction unit 305 obtains the rebuilt value of each pixel in the current coding unit based on the predicted value and residual value of each pixel in the current coding unit.

Hereinafter, in combination with the accompanying drawings, embodiments of the present application will illustrate the following image coding or decoding method.

It should be noted that the coding end in any embodiment of the present application may be the coder 112 in FIG. 1 or FIG. 2, or the source device 11 in FIG. 1. The decoding end in any embodiment of the present application may be the decoder 122 in FIG. 1 or FIG. 5, or the destination device 12 in FIG. 1, and the embodiment of the present application does not limit this.

Figure 6A:
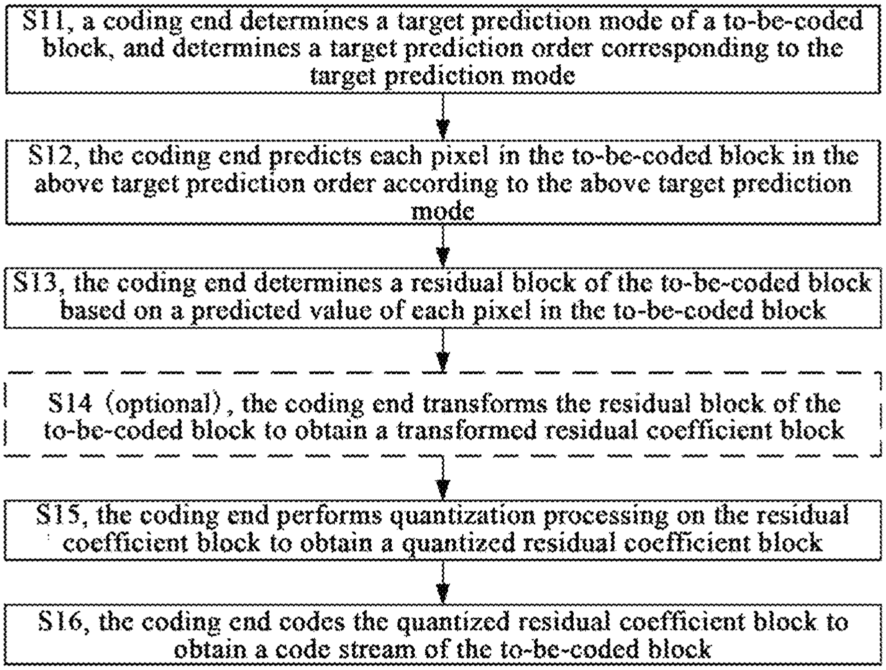
FIG. 6*a* is a flow chart of an image coding method provided by an embodiment of the present application.

Referring to FIG. 6*a*, which shows a flow chart of an image coding method provided by an embodiment of the present application, the method may include the following steps:

S11, a coding end determines a target prediction mode of a to-be-coded block, and determines a target prediction order corresponding to the target prediction mode.

Wherein, the detailed description of S11 can refer to the description of S101 below, which will not be repeated here.

S12, the coding end predicts each pixel in the to-be-coded block in the above target prediction order according to the above target prediction mode.

Wherein, the detailed description of S12 can refer to the description of S102 below, which will not be repeated here.

S13, the coding end determines a residual block of the to-be-coded block based on a predicted value of each pixel in the to-be-coded block.

Wherein, the detailed description of S13 can refer to the description of S103 below, which will not be repeated here.

S14 (optional), the coding end transforms the residual block of the to-be-coded block to obtain a transformed residual coefficient block.

S15, the coding end performs quantization processing on the residual coefficient block to obtain a quantized residual coefficient block.

It can be understood that when the coding end does not execute S14, the coding end can directly perform quantization processing on the above residual block to obtain the quantized residual block.

Wherein, the detailed description of the quantization processing performed on the residual block or residual coefficient block by the coding end may refer to the detailed description of the quantization processing performed on the residual block in S301-S302 below, which will not be repeated here.

S16, the coding end codes the quantized residual coefficient block to obtain a code stream of the to-be-coded block.

It can be understood that when the coding end does not perform S14, the coder codes the quantized residual block to obtain a code stream of the to-be-coded block.

Wherein, the process of the coding end coding the quantized residual coefficient block (or residual block) may refer to the detailed description of S502 below, which will not be repeated here.

It should be noted that the residual scanning order of the residual coefficient block coded by the coding end may be the same as the target prediction order in S11. In this way, on the decoding side, the decoding end can predict the predicted value of the pixel in the to-be-decoded block in the target prediction order, and simultaneously decode the residual block of the to-be-decoded block in the residual scanning order that is the same as the target prediction order, thereby efficiently obtain the reconstructed block of the to-be-decoded block.

In the image coding method described in S11-S16, the target prediction mode used by the coding end to predict the pixel in the to-be-coded block has a high prediction efficiency, and the quantization method used by the coding end to quantize the residual block or the residual coefficient block can reduce the multiplication operation of the coding end, that is, the quantization efficiency is improved, and the coding method used by the coding end can reduce the number of bits used to code the residual block or the residual coefficient block. Therefore, the method provided by the embodiment of the present application can greatly improve the coding efficiency of the coding end.

Figure 6B:
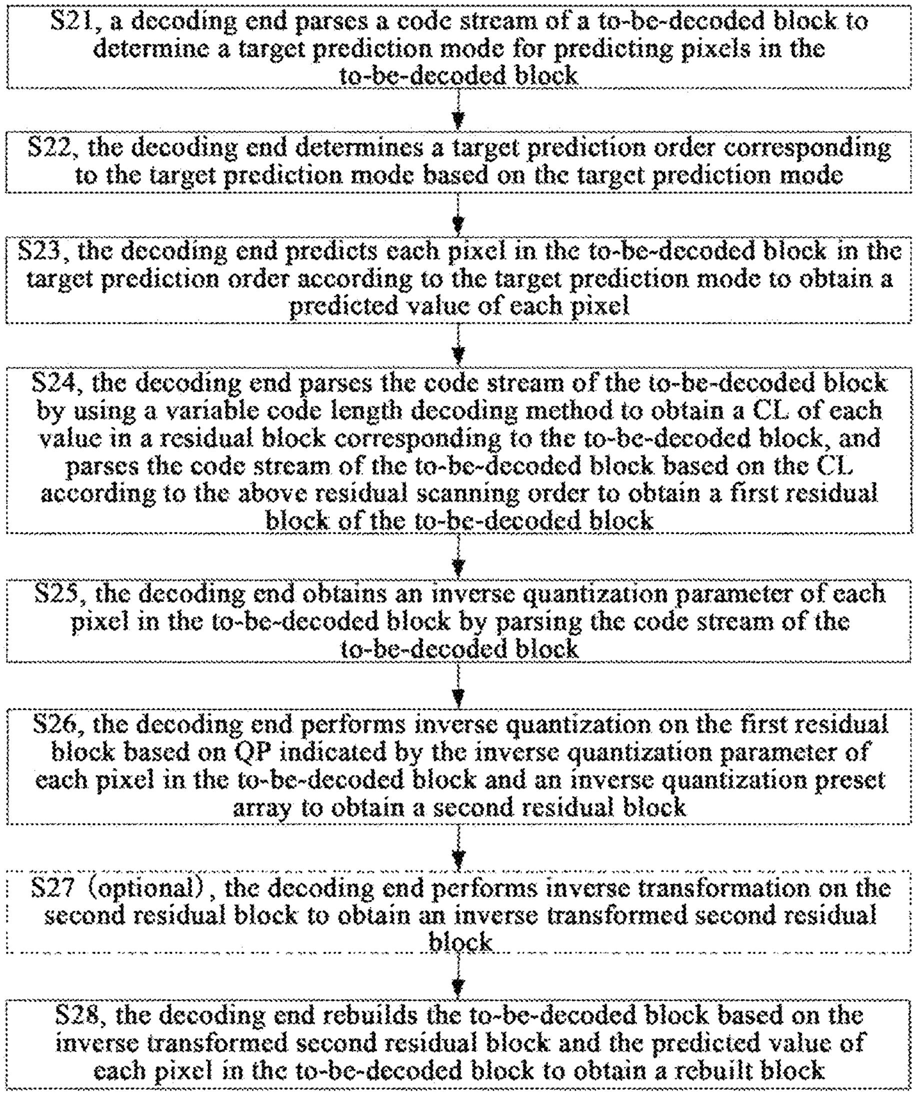
FIG. 6*b* is a flow chart of an image decoding method provided by an embodiment of the present application.

Referring to FIG. 6*b*, which shows a flow chart of an image decoding method provided by an embodiment of the present application, the method may include the following steps:

S21, a decoding end parses a code stream of a to-be-decoded block to determine a target prediction mode for predicting pixels in the to-be-decoded block.

Wherein, the detailed description of S21 can refer to the description of S201 below, which will not be repeated here.

S22, the decoding end determines a target prediction order corresponding to the target prediction mode based on the target prediction mode.

Wherein, the detailed description of S22 can refer to the description of S202 below, which will not be repeated here.

S23, the decoding end predicts each pixel in the to-be-decoded block in the target prediction order according to the target prediction mode to obtain a predicted value of each pixel.

S24, the decoding end parses the code stream of the to-be-decoded block by using a variable code length decoding method to obtain a CL of each value in a residual block corresponding to the to-be-decoded block, and parses the code stream of the to-be-decoded block based on the CL and according to the above residual scanning order to obtain a first residual block of the to-be-decoded block.

Wherein, the residual scanning order and the above target prediction order may be the same. When the residual scanning order and the above target prediction order are the same, that is, when the decoding end predicts the pixels in the to-be-decoded block in the target prediction order, the decoding end also parses the code stream of the to-be-decoded block according to the residual scanning order that is the same as the target prediction order to obtain the first residual block of the to-be-decoded block. This can improve the decoding efficiency of the decoding end.

Wherein, the process of the decoding end parsing the code stream of the to-be-decoded block by using the variable code length decoding method to obtain the CL of each value in the residual block corresponding to the to-be-decoded block can be referred to the description of S601 below. The description of the decoding end determining the first residual block based on the CL is similar to the implementation of obtaining the residual block of the to-be-decoded block described in S602, which will not be repeated.

S25, the decoding end obtains an inverse quantization parameter of each pixel in the to-be-decoded block by parsing the code stream of the to-be-decoded block.

Wherein, the detailed description of the inverse quantization parameter may refer to the description in S401 below, which will not be repeated here.

S26, the decoding end performs inverse quantization on the first residual block based on a QP indicated by the inverse quantization parameter of each pixel in the to-be-decoded block and an inverse quantization preset array to obtain a second residual block.

Wherein, the detailed description of S26 may refer to the description in S402 below, which will not be repeated here.

It should be noted that the embodiments of the present application do not limit the execution order of S23 and S24-S26. For example, S23 and S24-S26 can be executed at the same time.

S27 (optional), the decoding end performs inverse transformation on the second residual block to obtain an inverse transformed second residual block.

It should be understood that when the image coding process includes the above S14, the decoding end executes S27.

S28, the decoding end rebuilds the to-be-decoded block based on the inverse transformed second residual block and the predicted value of each pixel in the to-be-decoded block to obtain a rebuilt block.

It can be understood that when the decoding end does not execute S27, the decoding end directly rebuilds the to-be-decoded block based on the second residual block and the predicted value of each pixel in the to-be-decoded block to obtain the rebuilt block.

It should be noted that the image decoding method of S21-S28 corresponds to the image coding method of S11-S16. In the image decoding method described in S21-S28, the target prediction mode used by the decoding end to predict the pixels in the to-be-decoded block has a high prediction efficiency, and the inverse quantization method used by the decoding end to perform inverse quantization on the residual block or the residual coefficient block can reduce the multiplication operations of the decoding end, that is, the inverse quantization efficiency is improved, and the decoding method used by the decoding end can reduce the number of bits used to code the residual block or the residual coefficient block. Therefore, the method provided by the embodiment of the present application can greatly improve the decoding efficiency of the decoding end.

Embodiment 1

Figure 6C:
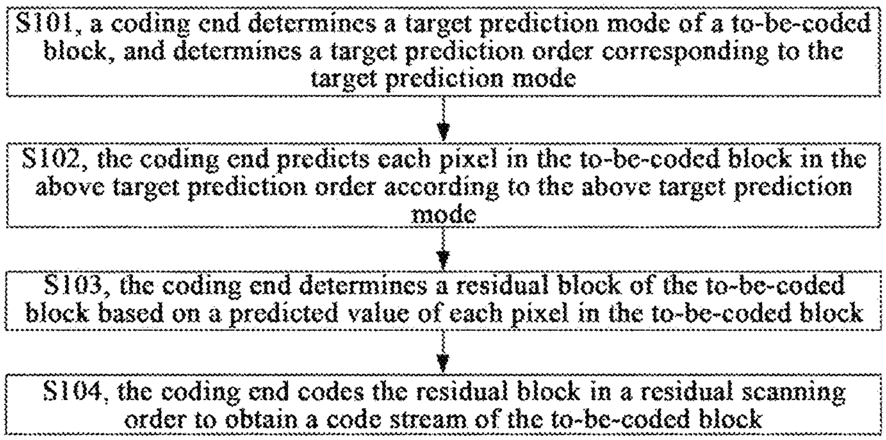
FIG. 6*c* is a flow chart of another image coding method provided by an embodiment of the present application.

As shown in FIG. 6*c*, which is a flow chart of another image coding method provided by an embodiment of the present application, the method shown in FIG. 6*c* includes the following steps:

S101, a coding end determines a target prediction mode of a to-be-coded block, and determines a target prediction order corresponding to the target prediction mode.

Specifically, the coding end may use different prediction modes to predict the to-be-coded block respectively, and predict a coding performance of the to-be-coded block based on predicted values under different prediction modes, so as to determine the target prediction mode.

For example, the coding end can use different prediction modes to predict to-be-coded block respectively, and after obtaining the predicted block based on the different prediction modes, the coding end performs steps 13 to 16 described above to obtain code streams of the to-be-coded block under the different prediction modes. The coding end determines the time to obtain the code streams of the to-be-coded block under the different prediction modes, and determines a prediction mode with the shortest time as the target prediction mode. In other words, the coding end determines a prediction mode with the highest coding efficiency as the target prediction mode.

In addition to the existing prediction mode, the embodiment of the present application also provides multiple prediction modes. In the prediction modes provided by the embodiment of the present application, the coding end can sequentially predict the pixels in the to-be-coded block according to a preset order. The coding end sequentially predicts the pixels in the to-be-coded block according to the preset order, which means that the coding end sequentially predicts the pixels in the to-be-coded block according to a preset trajectory. In this process, when the coding end predicts any pixel in the to-be-coded block, a pixel used to predict this pixel has been rebuilt. Wherein, the detailed description of the prediction modes provided by the embodiment of the present application can be referred to below, and will not be repeated here.

After the coding end predicts the coding performance of the to-be-coded block based on different prediction modes and determines the target prediction mode, it can determine the target prediction order when predicting the pixels in the to-be-coded block by using the target prediction mode.

Wherein, the target prediction order may be a prediction order for pixels in the to-be-coded block, or a prediction order for sub-block in the to-be-coded block.

S102, the coding end predicts each pixel in the to-be-coded block in the above target prediction order according to the above target prediction mode.

Optionally, the target prediction mode may be used to indicate that each pixel in the to-be-coded block is predicted point by point in the target prediction order. For example, when the target prediction mode is first to fifth prediction modes described below, the target prediction order is used to indicate that each pixel in the to-be-coded block is predicted point by point in the trajectory direction indicated by the target prediction order.

In this case, the coding end predicts each pixel in the to-be-coded block point by point in the trajectory direction indicated by the target prediction order, so as to obtain the predicted value of each pixel.

Optionally, the target prediction mode may also be used to indicate that pixels of each sub-block in the to-be-coded block are predicted sequentially with a sub-block of a preset size in the to-be-coded block as a unit. For example, when the target prediction mode is a sixth prediction mode described below, the target prediction mode is used to indicate that the pixels of each sub-block in the to-be-coded block are predicted sequentially with a sub-block of the preset size in the to-be-coded block as a unit.

In this case, the target prediction mode includes a prediction mode of each sub-block in the to-be-coded block. In this way, the coding end can predict the pixels of each sub-block in the to-be-coded block sequentially in the direction indicated by the target prediction order according to the target prediction mode. In addition, when the coding end predicts one sub-block of the to-be-coded block, the coder can predict each pixel in the sub-block in parallel based on the reconstructed pixels around the sub-block.

S103, the coding end determines a residual block of the to-be-coded block based on a predicted value of each pixel in the to-be-coded block.

The coder may determine the residual block of the to-be-coded block based on the predicted value of each pixel in the to-be-coded block and an original pixel value of the to-be-coded block.

For example, the coding end may perform difference operation on the predicted value of each pixel in the to-be-coded block and the original pixel value of the to-be-coded block through the residual calculation unit 202 shown in FIG. 2, thereby obtaining the residual block of the to-be-coded block.

S104, the coding end codes the residual block in a residual scanning order to obtain a code stream of the to-be-coded block.

Wherein, the residual scanning order corresponds to the above target prediction mode. Optionally, the residual scanning order and the above target prediction order may be the same.

For example, when the to-be-coded block is an image block of size 16×2, if the target prediction mode is a prediction mode shown in Table 1 below, the residual scanning order may be an order indicated by a preset trajectory shown in FIG. 7*a*. If the target prediction mode is a prediction mode shown in Table 2 below, the residual scanning order may be an order indicated by a preset trajectory shown in FIG. 7*b*. If the target prediction mode is a prediction mode shown in Table 3-1 below, the residual scanning order may be an order indicated by a preset trajectory shown in FIG. 7*c*-1. If the target prediction mode is a prediction mode shown in Table 4-1 below, the residual scanning order may be an order indicated by the preset trajectory shown in FIG. 7*d*-1.

For another example, when the to-be-coded block is an image block of size 8×2, if the target prediction mode is a prediction mode shown in Table 3-2 below, the residual scanning order may be an order indicated by a preset trajectory shown in FIG. 7*c*-2. If the target prediction mode is a prediction mode shown in Table 4-2 below, the residual scanning order may be an order indicated by a preset trajectory shown in FIG. 7*d*-2.

For another example, when the to-be-coded block is an image block of size 8×1, if the target prediction mode is a prediction mode shown in Table 4-3 below, the residual scanning order may be an order indicated by a preset trajectory shown in FIG. 7*d*-3. If the target prediction mode is a prediction mode shown in Table 5 below, the residual scanning order may be an order indicated by a preset trajectory shown in FIG. 7*e*.

For another example, when the to-be-coded block is an image block of size 16×2, if the target prediction mode is a prediction mode shown in FIG. 7*f*, the residual scanning order may be an order indicated by a preset trajectory shown in FIG. 7*g*.

Optionally, the coding end may first transform the residual block of the to-be-coded block to obtain the residual coefficient block of the to-be-coded block. The coding end may also quantize the residual coefficient block to obtain the quantized residual coefficient block. Then, the coding end codes the quantized residual coefficient block in the above target prediction order, so as to obtain a coded code stream of the to-be-coded block.

For example, the coding end may first transform the residual block of the to-be-coded block through the residual transform unit 203 shown in FIG. 2 to obtain the residual coefficient block of the to-be-coded block. The coding end may also quantize the residual coefficient block through the quantization unit 204 shown in FIG. 2 to obtain the quantized residual coefficient block. Then, the coding end codes the quantized residual coefficient block in the above target prediction order through the coding unit 205 shown in FIG. 2, thereby obtain the coded code stream of the to-be-coded block.

Optionally, the coding end may directly quantize the residual block of the to-be-coded block to obtain the quantized residual block. Then the coding end codes the quantized residual block in the above target prediction order, so as to obtain the coded code stream of the to-be-coded block.

For example, the coding end can directly quantize the residual block of the to-be-coded block through the quantization unit 204 shown in FIG. 2 to obtain a quantized residual block. Then the coding end codes the quantized residual block in the above target prediction order through the coding unit 205 shown in FIG. 2 to obtain the coded code stream of the to-be-coded block.

Optionally, the coding end further uses the above target prediction mode as a syntax element of the to-be-coded block, or uses the above target prediction mode and the corresponding target prediction order as the syntax element of the to-be-coded block, and codes the syntax element. The coding end may also add coded syntax element data to the coded code stream of the to-be-coded block.

It should be noted that the embodiment of the present application does not specifically limit the way in which the residual block or residual coefficient block of the to-be-coded block is quantized. For example, the residual block or residual coefficient block of the to-be-coded block can be quantized by using the quantization method described in the following Embodiment 2, which is certainly not limited.

It should also be noted that the specific coding method for coding the quantized residual block or residual coefficient and the related syntax element at the coding end is not specifically limited in the embodiments of this application. For example, the variable-length decoding method described in the following Embodiment 3 can be used for coding, which is certainly not limited.

The prediction mode provided by the embodiment of the present application is described in detail below. It should be noted in advance that in the prediction mode for predicting one to-be-coded block, at least one of the T prediction method, TB prediction method, L prediction method and RL prediction method described above may be included. Wherein, one pixel in the to-be-coded block can be predicted by any one of the T prediction method, TB prediction method, L prediction method or RL prediction method.

It should be noted that any of the following prediction modes can be applied to the process of coding an image at the coding end, and can also be applied to the process of decoding image data at the decoding end, and the embodiments of the present application are not limited to this.

In a first prediction mode, taking the size of the to-be-coded block as 16×2 as an example, as shown in Table 1, Table 1 shows a prediction mode for predicting each pixel in the to-be-coded block of size 16×2. In this prediction mode, the prediction order used by the coding end to predict pixels in the to-be-coded block may be an order indicated by a preset trajectory shown in FIG. 7*a*. That is, when the coding end sequentially predicts the pixels in the to-be-coded block one by one according to a preset trajectory shown in FIG. 7*a*, each pixel in the to-be-coded block will be predicted in a specific prediction way in a prediction mode shown in Table 1.

TABLE 1

| | | | | | | | | | | | | | | | |
|---|---|---|---|---|---|---|---|---|---|---|---|---|---|---|---|
| T | RL | T | RL | T | RL | T | RL | T | RL | T | RL | T | RL | T | L |
| T | RL | T | RL | T | RL | T | RL | T | RL | T | RL | T | RL | T | L |

Figure 7A:
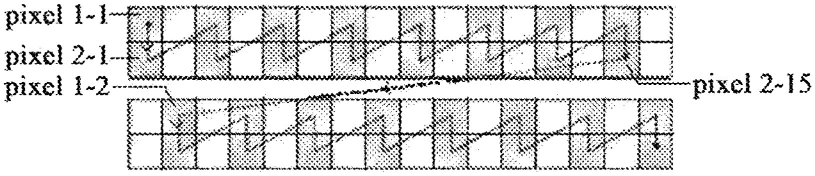
FIG. 7*a* is a schematic diagram of a prediction order provided by an embodiment of the present application.

It can be understood that the prediction method displayed in each grid in Table 1 is used to predict the predicted value of the pixel at the corresponding position in the to-be-coded block shown in FIG. 7*a*. For example, the T prediction method displayed in a first grid of a first row in Table 1 is used to predict a predicted value of a pixel 1-1 located in the first grid of the first row in the to-be-coded block shown in FIG. 7*a*. For another example, the RL prediction method displayed in a second grid of the first row in Table 1 is used to predict a predicted value of a pixel 1-2 located in the second grid of the first row in the to-be-coded block shown in FIG. 7*a*. For another example, the T prediction method displayed in a first grid of a second row in Table 1 is used to predict a predicted value of a pixel 2-1 located in the first grid of the second row in the to-be-coded block shown in FIG. 7*a*. For another example, the T prediction method displayed in a fifteenth grid of the second row in Table 1 is used to predict a predicted value of a pixel 1-15 located in the fifteenth grid of the second row in the to-be-coded block shown in FIG. 7*a*.

It should also be understood that the two blocks of size 16×2 shown in FIG. 7*a* represent the same image block in the to-be-coded image (such as the to-be-coded block). FIG. 7*a* uses two blocks to represent the to-be-coded block, only to clearly show the preset trajectory when the coding end sequentially predicts the pixels in the to-be-coded block, and the preset trajectory is a trajectory shown by a black solid line with an arrow in FIG. 7*a*. Wherein, a origin is a starting point of the preset trajectory, and pixel points at both ends of a black dotted line are two adjacent pixel points on the preset trajectory.

Thus, as an example, when the coding end predicts the to-be-coded block according to the preset trajectory shown in FIG. 7*a*, the coding end first predicts the pixel 1-1 shown in FIG. 7*a* in the T prediction method shown in Table 1. That is, the predicted value of the pixel 1-1=$P_{T1-1}$, and $P_{T1-1}$ is the rebuilt value of the pixel above the pixel 1-1 (for example, the pixel in an image block on the upper side of the to-be-coded block. It should be understood that the image blocks on the upper and the left sides of the to-be-coded block are usually coded earlier than the to-be-coded block, so the pixel values in the image blocks on the upper and the left sides of the to-be-coded block have been rebuilt). It should be understood that after the coding end obtains the predicted value of the pixel 1-1, the rebuilt value of the pixel 1-1 can be determined based on the predicted value of the pixel 1-1 (for example, after the coding end obtains the predicted value of the pixel 1-1, the residual value of the pixel is rebuilt by executing steps 13 to 16 described above, and rebuilding the residual value of the pixel through inverse quantization and inverse transform, and then the rebuilt value of the pixel 1-1 is obtained based on the predicted value and the rebuilt residual value).

As another example, according to the preset trajectory shown in FIG. 7*a*, after the coding end completes the prediction of the pixel 1-1, it predicts the pixel 2-1 shown in FIG. 7*a* in the T prediction method shown in Table 1. That is, the predicted value of the pixel 2-1=$P_{T2-1}$, and $P_{T2-1}$ is the rebuilt value of the pixel above the pixel 2-1 (for example, the pixel 1-1 that has been rebuilt).

As another example, according to the preset trajectory shown in FIG. 7*a*, after the coding end completes the prediction of pixel 2-15, it predicts pixel 1-2 shown in FIG. 7*a* in the RL prediction method shown in Table 1. That is, the predicted value of the pixel 1-2=$(P_{R1\text{-}2}+P_{L1\text{-}2}+1)>>1$, wherein $(P_{R1\text{-}2}+P_{L1\text{-}2}+1)>>1$ represents the value obtained by right shifting a binary value of $(P_{R1\text{-}2}+P_{L1\text{-}2}+1)$ by 1 bit, which is mathematically equivalent to the value of $(P_{R1\text{-}2}+P_{L1\text{-}2}+1)$ divided by $2^1$. $P_{R1\text{-}2}$ is the rebuilt value of the pixel to on the right side of the pixel 1-2 (for example, pixel 1-3 that has been rebuilt, since the prediction order of the pixel 1-3 is before pixel 1-2), and $P_{L1\text{-}2}$ is the rebuilt value of the pixel to on the left side of the pixel 1-2 (for example, the pixel 1-1 that has been rebuilt).

In a second prediction mode, taking the size of the to-be-coded block as 16×2 as an example, as shown in Table 2, Table 2 shows another prediction mode for predicting each pixel in the to-be-coded block of size 16×2. In this prediction mode, the prediction order used by the coding end to predict the pixels in the to-be-coded block may be an order indicated by a preset trajectory shown in FIG. 7*b*. That is, when the coding end sequentially predicts the pixels in the to-be-coded block one by one according to a preset trajectory shown in FIG. 7*b*, each pixel in the to-be-coded block will be predicted in a specific prediction way in a prediction mode shown in Table 2. Wherein, the detailed description of predicting each pixel in the to-be-coded block in the prediction method shown in Table 2 can refer to the relevant description of predicting each pixel in the to-be-coded block in the prediction method shown in Table 1 above, and the description of the preset trajectory shown in FIG. 7*b* can also refer to the description of the preset trajectory in FIG. 7*a*, which will not be repeated.

TABLE 2

| | | | | | | | | | | | | | | | |
|---|---|---|---|---|---|---|---|---|---|---|---|---|---|---|---|
| TB | TB | TB | TB | T | TB | TB | TB | T | TB | TB | TB | T | TB | TB | TB |
| L | L | L | L | T | L | L | L | T | L | L | L | T | L | L | L |

Figure 7B:
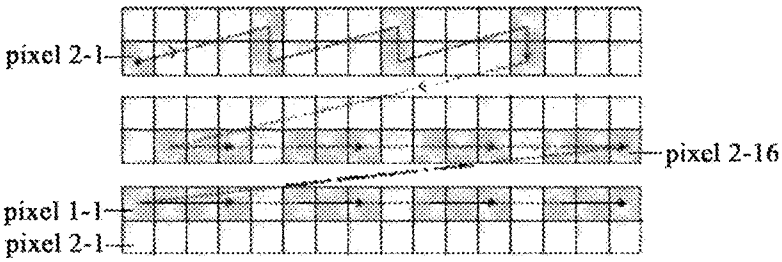
FIG. 7*b* is a schematic diagram of another prediction order provided by an embodiment of the present application.

Thus, for example, when the coding end predicts the to-be-coded block according to the preset trajectory shown in FIG. 7*b*, the coding end first predicts a pixel 2-1 shown in FIG. 7*b* in the L prediction mode shown in Table 2. That is, a predicted value of the pixel 2-1=$P_{L2\text{-}1}$, and $P_{L2\text{-}1}$ is a reconstructed value of the pixel on the left side of the pixel 2-1 (for example, the pixel in the image block on the left side of the to-be-coded block).

For another example, according to the preset trajectory shown in FIG. 7*b*, after the coding end completes the prediction of a pixel 2-16, it predicts a pixel 1-1 shown in FIG. 7*b* in the TB prediction method shown in Table 2. That is, a predicted value of pixel 1-1=$(P_{T1\text{-}1}+P_{B1\text{-}1}+1)>>1$. $P_{T1\text{-}1}$ is a reconstructed value of the pixel on the upper side of pixel 1-1 (for example, the pixel in the image block on the upper side of the to-be-coded block), and $P_{B1\text{-}1}$ is a reconstructed value of the pixel below pixel 1-1 (for example, the pixel 2-1 that has been reconstructed, since the prediction order of pixel 2-1 is before pixel 1-1).

In a third prediction mode, taking the size of the to-be-coded block as 16×2 as an example, as shown in Table 3-1, Table 3-1 shows another prediction mode for predicting each pixel in the to-be-coded block of size 16×2. In this prediction mode, the prediction order used by the coding end to predict the pixels in the to-be-coded block may be an order indicated by a preset trajectory shown in FIG. 7*c*-1. That is, when the coding end sequentially predicts the pixels in the to-be-coded block one by one according to a preset trajectory shown in FIG. 7*c*-1, each pixel in the to-be-coded block will be predicted in a specific prediction way in a prediction mode shown in Table 3-1. Wherein, the detailed description of predicting each pixel in the to-be-coded block in the prediction method shown in Table 3-1 can refer to the relevant description of predicting each pixel in the to-be-coded block in the prediction method shown in Table 1 above, and the description of the preset trajectory shown in FIG. 7*c*-1 can also refer to the description of the preset trajectory in FIG. 7*a*, which will not be repeated.

TABLE 3-1

| | | | | | | | | | | | | | | | |
|---|---|---|---|---|---|---|---|---|---|---|---|---|---|---|---|
| L | L | L | L | T | L | L | L | T | L | L | L | T | L | L | L |
| L | L | L | L | T | L | L | L | T | L | L | L | T | L | L | L |

In the third prediction mode, taking the size of the to-be-coded block as 8×2 as an example, as shown in Table 3-2, Table 3-2 shows a prediction mode for predicting each pixel in the to-be-coded block of size 8×2. In this prediction mode, the prediction order used by the coding end to predict pixels in the to-be-coded block may be an order indicated by a preset trajectory shown in FIG. 7*c*-2. That is, when the coding end sequentially predicts the pixels in the to-be-coded block one by one according to a preset trajectory shown in FIG. 7*c*-2, each pixel in the to-be-coded block will be predicted in a specific prediction way in a prediction mode shown in Table 3-2. Wherein, the detailed description of predicting each pixel in the to-be-coded block in the prediction method shown in Table 3-2 can refer to the relevant description of predicting each pixel in the to-be-coded block in the prediction method shown in Table 1 above, and the description of the preset trajectory shown in FIG. 7*c*-2 can also refer to the description of the preset trajectory in FIG. 7*a*, which will not be repeated.

TABLE 3-2

| | | | | | | | |
|---|---|---|---|---|---|---|---|
| L | L | L | L | T | L | L | L |
| L | L | L | L | T | L | L | L |

In a fourth prediction mode, taking the size of the to-be-coded block as 16×2 as an example, as shown in Table 4-1, Table 4-1 shows another prediction mode for predicting each pixel in the to-be-coded block of size 16×2. In this prediction mode, the prediction order used by the coding end to predict pixels in the to-be-coded block may be an order indicated by a preset trajectory shown in FIG. 7*d*-1. That is, when the coding end sequentially predicts the pixels in the to-be-coded block one by one according to a preset trajectory shown in FIG. 7d-1, each pixel in the to-be-coded block will be predicted in a specific prediction way in a prediction mode shown in Table 4-1. Wherein, the detailed description of predicting each pixel in the to-be-coded block in the prediction method shown in Table 4-1 can refer to the relevant description of predicting each pixel in the to-be-coded block in the prediction method shown in Table 1 above, and the description of the preset trajectory shown in FIG. 7d-1 can also refer to the description of the preset trajectory in FIG. 7a, which will not be repeated.

TABLE 4-1

| | | | | | | | | | | | | | | | |
|---|---|---|---|---|---|---|---|---|---|---|---|---|---|---|---|
| T | T | T | T | T | T | T | T | T | T | T | T | T | T | T | T |
| T | T | T | T | T | T | T | T | T | T | T | T | T | T | T | T |

In the fourth prediction mode, taking the size of the to-be-coded block as 8×2 as an example, as shown in Table 4-2, Table 4-2 shows another prediction mode for predicting each pixel in the to-be-coded block of size 8×2. In this prediction mode, the prediction order used by the coding end to predict pixels in the to-be-coded block may be an order indicated by a preset trajectory shown in FIG. 7d-2. That is, when the coding end sequentially predicts the pixels in the to-be-coded block one by one according to a preset trajectory shown in FIG. 7d-2, each pixel in the to-be-coded block will be predicted in a specific prediction way in a prediction mode shown in Table 4-2. Wherein, the detailed description of predicting each pixel in the to-be-coded block in the prediction method shown in Table 4-2 can refer to the relevant description of predicting each pixel in the to-be-coded block in the prediction method shown in Table 1 above, and the description of the preset trajectory shown in FIG. 7d-2 can also refer to the description of the preset trajectory in FIG. 7a, which will not be repeated.

TABLE 4-2

| | | | | | | | |
|---|---|---|---|---|---|---|---|
| T | T | T | T | T | T | T | T |
| T | T | T | T | T | T | T | T |

In the fourth prediction mode, taking the size of the to-be-coded block as 8×1 as an example, as shown in Table 4-3, Table 4-3 shows another prediction mode for predicting each pixel in the to-be-coded block of size 8×1. In this prediction mode, the prediction order used by the coding end to predict pixels in the to-be-coded block may be an order indicated by a preset trajectory shown in FIG. 7d-3. That is, when the coding end sequentially predicts the pixels in the to-be-coded block one by one according to a preset trajectory shown in FIG. 7d-3, each pixel in the to-be-coded block will be predicted in a specific prediction way in a prediction mode shown in Table 4-3. Wherein, the detailed description of predicting each pixel in the to-be-coded block in the prediction method shown in Table 4-3 can refer to the relevant description of predicting each pixel in the to-be-coded block in the prediction method shown in Table 1 above, and the description of the preset trajectory shown in FIG. 7d-3 can also refer to the description of the preset trajectory in FIG. 7a, which will not be repeated.

TABLE 4-3

| | | | | | | | |
|---|---|---|---|---|---|---|---|
| T | T | T | T | T | T | T | T |

In a fifth prediction mode, taking the size of the to-be-coded block as 8×1 as an example, as shown in Table 5, Table 5 shows a prediction mode for predicting each pixel in the to-be-coded block of size 8×1. In this prediction mode, the prediction order used by the coding end to predict pixels in the to-be-coded block may be an order indicated by a preset trajectory shown in FIG. 7e. That is, when the coding end sequentially predicts the pixels in the to-be-coded block one by one according to a preset trajectory shown in FIG. 7e, each pixel in the to-be-coded block will be predicted in a specific prediction way in a prediction mode shown in Table 5. Wherein, the detailed description of predicting each pixel in the to-be-coded block in the prediction method shown in Table 5 can refer to the relevant description of predicting each pixel in the to-be-coded block in the prediction method shown in Table 1 above, and the description of the preset trajectory shown in FIG. 7e can also refer to the description of the preset trajectory in FIG. 7a, which will not be repeated.

TABLE 5

| | | | | | | | |
|---|---|---|---|---|---|---|---|
| L | L | L | L | T | L | L | L |

It can be seen that each of the above prediction modes corresponds to different prediction orders. For example, when the prediction mode is the first prediction mode, the prediction order is the first prediction order, and when the prediction mode is the second prediction mode, the prediction order is the second prediction order, wherein the first prediction order and the second prediction order are different. The first prediction order and the second prediction order can be one of the prediction orders corresponding to the first prediction mode to the sixth prediction mode in the above instance.

It can also be seen that in the same prediction mode, when the sizes of the to-be-decoded block are different, the corresponding prediction orders are also different. For example, for a to-be-decoded block of a first size, a third prediction order is used to predict the to-be-decoded block in a prediction mode 1, and for a to-be-decoded block of a second size, a fourth prediction order is used to predict the to-be-decoded block in the prediction mode 1, wherein the third prediction order and the fourth prediction order are different. For example, for the to-be-decoded blocks of three different sizes of 16×2, 8×2 and 8×1, in the fourth prediction mode mentioned above, the three different prediction orders as shown in FIG. 7d-1, FIG. 7d-2 and FIG. 7d-3 can be used respectively.

Wherein, the first prediction order, the second prediction order, the third prediction order and the fourth prediction order can all represent the prediction trajectory for the pixels in the to-be-coded block, and can also represent the prediction trajectory for the sub-blocks in the to-be-coded block.

In a sixth prediction mode, the prediction mode is used to indicate that the coding end sequentially predicts each sub-block in the to-be-coded block in the direction indicated by the prediction order corresponding to the prediction mode with a sub-block of a preset size in the to-be-coded block as a unit. In addition, in this prediction mode, when the coding end predicts any sub-block of the to-be-coded block, it can predict pixels in any sub-block in parallel based on the rebuilt pixels around the sub-block.

In this prediction mode, the coding end may divide the to-be-coded block into multiple non-overlapping sub-blocks with preset sizes, and use the arrangement direction of the divided sub-blocks as the direction indicated by the prediction order corresponding to the prediction mode.

As an example, referring to FIG. 7*f*, it shows a schematic diagram of sub-blocks in a to-be-coded block provided by an embodiment of the present application.

As shown in (a) of FIG. 7*f*, assuming that the sub-block with a preset size is a sub-block of 2×2, for a to-be-coded block of 16×2, the to-be-coded block can be divided into 8 non-overlapping sub-blocks of 2×2 as shown in a black thick line box in (a) of FIG. 7*f*. In addition, for example, the arrangement direction of these 8 sub-blocks is direction indicated by a prediction order corresponding to the prediction mode, such as the direction indicated by the arrow shown in (a) of FIG. 7*f*.

As shown in (b) of FIG. 7*f*, assuming that the sub-block with a preset size is a sub-block of 4×2, for a to-be-coded block of 16×2, the to-be-coded block can be divided into 4 non-overlapping sub-blocks of 4×2 as shown in a black thick line box in (b) of FIG. 7*f*. In addition, for example, the arrangement direction of these 4 sub-blocks is the direction indicated by a prediction order corresponding to the prediction mode, such as the direction indicated by arrows shown in (b) of FIG. 7*f*.

As shown in (c) in FIG. 7*f*, assuming that the sub-block with a preset size is a sub-block of 8×2, for a to-be-coded block of 16×2, the to-be-coded block can be divided into 2 non-overlapping sub-blocks of 8×2 as shown in a black thick line box in (c) of FIG. 7*f*. In addition, for example, the arrangement direction of these 8 sub-blocks is the direction indicated by a prediction order corresponding to the prediction mode, such as the direction indicated by arrows shown in (c) of FIG. 7*f*.

Specifically, for any sub-block in the to-be-coded block, the sixth prediction mode indicates that a pixel in any sub-block is predicted based on the rebuilt value of a pixel on the upper side (adjacent or non-adjacent), left side (adjacent or non-adjacent) and oblique upper side (adjacent or non-adjacent) of any sub-block. It should be noted that in this prediction mode, one pixel in one sub-block will not depend on other pixels in the same sub-block for prediction. For simple description, the embodiment of the present application uses this prediction mode to indicate that a pixel in any sub-block is predicted based on the rebuilt values of the adjacent pixels on the upper side, left side and oblique upper side of any sub-block.

The sixth prediction mode is taken as an example, which indicates that the sub-block shown in (a) of FIG. 7*f* is used as a unit, and each sub-block in the to-be-coded block is sequentially predicted in the direction indicated by the prediction order corresponding to the prediction mode. As shown in (a) of FIG. 7*f*, it is assumed that any of the above sub-blocks is a sub-block a, and gray squares shown in (a) of FIG. 7*f* are the adjacent pixels on the upper side, left side, and oblique upper side of the sub-block a. For example, the pixels in the sub-block a are Y0, Y1, Y2, and Y3, the pixels on the upper side of the sub-block a include T0 and T1, the pixels on the left side of the sub-block a include L0 and L1, and the pixel on the oblique upper side of the sub-block a is LT:

then in one possible implementation, the sixth prediction mode may specifically indicate that a predicted value of Y0 in a sub-block a is obtained based on T0, L0 and LT, a predicted value of Y1 in the sub-block a is obtained based on T1, L0 and LT, a predicted value of Y2 in the sub-block a is obtained based on T0, L1 and LT, and a predicted value of Y3 in the sub-block a is obtained based on T1, L1 and LT.

Optionally, the prediction method 1 specifically indicated by the sixth prediction mode may be that for any pixel in any sub-block in the to-be-coded block, a predicted value of this pixel is determined based on a horizontal gradient or vertical gradient of an upper pixel, a left pixel and an oblique upper pixel of this pixel.

Referring to (a) in FIG. 7*f*, taking the pixel Y0 in the sub-block a as an example, when the coding end determines that the rebuilt values of the upper pixel T0, the left pixel L0, and the oblique upper pixel LT of Y0 satisfy Condition 1, the rebuilt value of the left pixel L0 of Y0 is determined as the predicted value of Y0. Wherein, Condition 1 is used to characterize that the horizontal gradient of the pixels around Y0 is the smallest. Condition 1 is specifically: |T0 rebuilt value−LT rebuilt value|≤|L0 rebuilt value−LT rebuilt value|, and |T0 rebuilt value−LT rebuilt value|≤|L0 rebuilt value+T0 rebuilt value−2*LT rebuilt value|. When the coding end determines that the rebuilt values of the upper pixel T0, the left pixel L0, and the oblique upper pixel LT of Y0 satisfy Condition 2, the rebuilt value of the upper pixel T0 of Y0 is determined as the predicted value of Y0. Wherein, Condition 2 is used to characterize that the vertical gradient of the pixels around Y0 is the smallest. Condition 2 is specifically: |TO rebuilt value-LT rebuilt value|≤| L0 rebuilt value+T0 rebuilt value−2*LT rebuilt value|. When the coding end determines that the rebuilt values of the upper pixel T0, the left pixel L0, and the oblique upper pixel LT of Y0 do not satisfy above Conditions 1 and 2, the rebuilt value of the oblique upper pixel LT of Y0 is determined as the predicted value of Y0.

Optionally, the prediction method 2 specifically indicated by the sixth prediction mode may be that for any pixel in any sub-block in the to-be-coded block, the predicted value of this pixel is determined based on the mean of the rebuilt values of the upper pixel, the left pixel and the oblique upper pixel of this pixel.

Continuing to refer to (a) in FIG. 7*f*, taking the pixel Y0 in the sub-block a as an example, the predicted value of Y0 may be: (L0 rebuilt value+TO rebuilt value+2*LT rebuilt value)>>2. Wherein, (L0 rebuilt value+TO rebuilt value+2*LT rebuilt value)>>2 represents the value obtained by right shifting a binary value of (L0 rebuilt value+TO rebuilt value+2*LT rebuilt value) by 2 bits.

In another possible implementation, the sixth prediction mode may specifically indicate that for any pixel in any sub-block of the to-be-coded block, the rebuilt value of the upper pixel, the left pixel, or the obliquely upper pixel in the prediction direction of this pixel is determined as the predicted value of this pixel. Wherein, the prediction direction may be a 45-degree left oblique direction of the any pixel, or the 45-degree right oblique direction, which is not limited in the embodiment of the present application.

The sixth prediction mode is taken as an example, which indicates that the sub-block shown in (b) of FIG. 7*f* is used as a unit, and each sub-block in the to-be-coded block is sequentially predicted in the prediction order corresponding to the prediction mode. Referring to (b) of FIG. 7*f*, it is assumed that any of the above sub-blocks is a sub-block b, and gray squares shown in (b) of FIG. 7*f* are the adjacent pixels on the upper side, left side, and oblique upper side of the sub-block a. For example, the pixels in the sub-block b are Y0, Y1, Y2, Y3, Y4, Y5, Y6 and Y7, the pixels on the upper side of the sub-block b include TO, T1, T2, T3, T4 and T5, the pixels on the left side of the sub-block b include L0 and L1, and the pixel on the oblique upper side of the sub-block b is LT:

then when the prediction direction is a 45-degree left oblique direction of the pixel to be predicted, the sixth prediction mode can specifically indicate that the rebuilt value of LT located in the 45-degree left oblique direction of Y0 in the sub-block b is determined as the predicted value of Y0, the rebuilt value of TO located in the 45-degree left oblique direction of Y1 in the sub-block b is determined as the predicted value of Y1, the rebuilt value of T1 located in the 45-degree left oblique direction of Y2 in the sub-block b is determined as the predicted value of Y2, the rebuilt value of T2 located in the 45-degree left oblique direction of Y3 in the sub-block b is determined as the predicted value of Y3, the rebuilt value of L0 located in the 45-degree left oblique direction of Y4 in the sub-block b is determined as the predicted value of Y4, the rebuilt value of LT located in the 45-degree left oblique direction of Y5 in the sub-block b is determined as the predicted value of Y5, the rebuilt value of TO located in the 45-degree left oblique direction of Y6 in the sub-block b is determined as the predicted value of Y6, and the rebuilt value of T1 located in the 45-degree left oblique direction of Y7 in the sub-block b is determined as the predicted value of Y7.

When the prediction direction is a 45-degree right oblique direction of the pixel to be predicted, the sixth prediction mode can specifically indicate that the rebuilt value of T1 located in the 45-degree right oblique direction of Y0 in the sub-block b is determined as the predicted value of Y0, the rebuilt value of T2 located in the 45-degree right oblique direction of Y1 in the sub-block b is determined as the predicted value of Y1, the rebuilt value of T3 located in the 45-degree right oblique direction of Y2 in the sub-block b is determined as the predicted value of Y2, and the rebuilt value of T4 located in the 45-degree right oblique direction of Y3 in the sub-block b is determined as the predicted value of Y3, the rebuilt value of T3 located in the 45-degree right oblique direction of T2 is determined as the predicted value of Y4, the rebuilt value of T3 located in the 45-degree right oblique direction of Y5 in the sub-block b is determined as the predicted value of Y5, the rebuilt value of T4 located in the 45-degree right oblique direction of Y6 in the sub-block b is determined as the predicted value of Y6, and the rebuilt value of T5 located in the 45-degree right oblique direction of Y7 in the sub-block b is determined as the predicted value of Y7.

Optionally, in the case of that the target prediction mode includes a prediction mode for each sub-block in the to-be-decoded block, for a first sub-block in the to-be-decoded block, the first sub-block includes first and second pixels, then the prediction mode of the first sub-block is used to predict the first and second pixels in parallel based on rebuilt pixels around the first sub-block.

Wherein, the first sub-block is a sub-block in the to-be-decoded block that is currently being predicted. For example, as shown in (a) in FIG. 7*f*, the size of each sub-block in the to-be-decoded block is 2×2, so the to-be-decoded block can be divided into 8 sub-blocks. When the prediction of the to-be-coded block shown in (a) in FIG. 7*f* is started, the first sub-block is the first one of the sub-blocks from left to right. When the pixels in the first sub-block have been rebuilt, the pixels in the second sub-block from left to right can be rebuilt. At this time, the first sub-block is the second one of the sub-blocks mentioned above. The first pixels and the second pixels included in the first sub-block can be two non-overlapping groups of pixels in the first sub-block, and the first pixels or the second pixels can include one or more pixels in the first sub-block. For example, taking the sub-block a in (a) in FIG. 7*f* as an example, in one case, the first pixels in the sub-block a can include Y0, and the second pixels in the sub-block a can include Y1, Y2, and Y3. In another case, the first pixels in the sub-block a can include Y0 and Y1, and the second pixels in the sub-block a can include Y2 and Y3. In yet another case, the first pixels in the sub-block a can include Y1, and the second pixels in the sub-block a can include Y2.

It should be noted that when the coding end uses the sixth prediction mode to predict the pixels in the to-be-coded block, when the coding end codes the residual block or residual coefficient block corresponding to the to-be-coded block, it can be coded in the order indicated by the trajectory shown in FIG. 7*g*.

So far, based on the coding method described in S101-S104 above, when the coding end predicts the pixels in the to-be-coded block in the target prediction mode, the pixels in the to-be-coded block are predicted in the target prediction order corresponding to the target prediction mode. In this process, when the coding end predicts any pixel in the to-be-coded block, the pixels used to predict this pixel have been rebuilt. Therefore, the coding method provided by the embodiment of the present application predicts each pixel in the to-be-coded block in the target prediction order according to the target prediction mode, and can predict some of the pixels in the to-be-coded block in parallel, thereby improving the efficiency of predicting the pixels in the to-be-coded block. When the coding end obtains the rebuilt values based on the predicted values and the residual values, there is no need to buffer the above residual values. Therefore, the coding method provided by the embodiment of the present application can not only save the buffer space used to buffer the residual values, but also improve the coding efficiency.

In addition, when the target prediction mode indicates that each sub-block in the to-be-coded block is sequentially predicted with a sub-block as a unit, since in this prediction mode, when the coding end predicts one sub-block, it can predict multiple pixels in the sub-block in parallel based on the rebuilt pixels around the sub-block, that is, this prediction mode can further improve the efficiency of the coding end in predicting the to-be-coded block. Furthermore, when the coding end re-obtains the rebuilt values based on the predicted values and the residual values, the coding end does not need to buffer the residual values. Therefore the coding method provided by the embodiment of the present application further saves buffer space and improves coding efficiency.

As shown in FIG. 8, which is a flowchart of another image decoding method provided by an embodiment of the present application, the method shown in FIG. 8 includes the following steps:

S201, a decoding end parses a code stream of a to-be-decoded block to determine a target prediction mode for predicting pixels in the to-be-decoded block.

Wherein, the code stream of the to-be-decoded block can be a code stream received by the decoding end from a coding end, or a code stream obtained from other devices, such as a code stream obtained from a storage device, which is not limited in this embodiment of the present application.

Wherein, the target prediction mode is used to predict pixels in the to-be-decoded block to obtain the predicted values of the pixels in the to-be-decoded block. It can be understood that the target prediction mode here is a prediction mode used by the coder to predict pixels in an image block during coding.

Specifically, the decoding end may parse the code stream of the to-be-decoded block by using a decoding method corresponding to the coding end, thereby obtaining the target prediction mode.

S202, the decoding end determines a target prediction order corresponding to the target prediction mode based on the target prediction mode.

Wherein, the description of the prediction mode and the prediction order corresponding to the prediction mode can be referred to the description above, which will not be repeated here.

Optionally, the decoding end may preset a correspondence between multiple prediction modes and their corresponding prediction orders. Thus, when the decoding end determines a prediction mode is the target prediction mode, the target prediction order corresponding to the target prediction mode can be determined from the preset correspondence.

S203, the decoding end predicts each pixel in the to-be-decoded block in the target prediction order according to the target prediction mode to obtain a predicted value of each pixel.

Here, the description of predicting each pixel in the to-be-decoded block in a prediction order corresponding to the prediction mode based on the prediction mode can refer to the detailed description of the prediction mode above, which will not be repeated here.

S204, the decoding end rebuilds each pixel based on the predicted value of the pixel in the to-be-decoded block, so as to obtain a rebuilt block of the to-be-decoded block.

Optionally, the decoding end may first parse the code stream to obtain a residual block of the to-be-decoded block. Then, the decoding end performs inverse quantization on the residual block to obtain a rebuilt residual block of the to-be-decoded block. In this way, the decoding end may obtain the rebuilt block of the to-be-decoded block based on the predicted values of the pixels in the to-be-decoded block obtained above and the residual values in the rebuilt residual block.

For example, the decoding end may first parse the code stream of the to-be-decoded block through the code stream parsing unit 301 shown in FIG. 5 to obtain the residual block of the to-be-decoded block. Then, the decoding end may perform inverse quantization on the residual block through the inverse quantization unit 302 shown in FIG. 5 to obtain the rebuilt residual block of the to-be-decoded block. In this way, the decoding end may obtain the rebuilt block of the to-be-decoded block through the reconstruction unit 305 based on the predicted values of the pixels in the to-be-decoded block obtained above and the residual values in the rebuilt residual block.

Optionally, the decoding end may first parse the code stream to obtain a residual coefficient block of the to-be-decoded block. Then, the decoding end performs inverse quantization on the residual block to obtain an inverse quantized residual coefficient block. Next, the decoding end performs inverse transformation on the inverse quantized residual coefficient block to obtain a rebuilt residual block of the to-be-decoded block. In this way, the decoding end can obtain the rebuilt block of the to-be-decoded block based on the predicted values of the pixels in the to-be-decoded block obtained above and the residual values in the rebuilt residual block.

For example, the decoding end may first parse the code stream of the to-be-decoded block through the code stream parsing unit 301 shown in FIG. 5 to obtain the residual coefficient block of the to-be-decoded block. Then, the decoding end may perform inverse quantization on the residual coefficient block through the inverse quantization unit 302 shown in FIG. 5 to obtain the inverse quantized residual coefficient block. Next, the decoding end performs inverse transformation on the inverse quantized residual coefficient block through the residual inverse transform unit 303 shown in FIG. 5 to obtain the rebuilt residual block of the to-be-decoded block. In this way, the decoding end may obtain the rebuilt block of the to-be-decoded block through the reconstruction unit 305 based on the predicted values of the pixels in the to-be-decoded block obtained above and the residual values in the rebuilt residual block.

Wherein, the decoding end can parse the code stream of the to-be-decoded block by a decoding method corresponding to the coding end, so as to obtain the residual block or residual coefficient block of the to-be-decoded block. For example, the residual scanning order used by the decoding end to decode the code stream of the to-be-decoded block is the target prediction order of the pixels in the to-be-decoded block. Wherein, the target prediction order corresponds to the target prediction mode used to predict the to-be-decoded block. The relevant description of the residual scanning order can be referred to above, and will not be repeated here.

It should be noted that the image decoding method shown in FIG. 8 corresponds to the image coding method shown in FIG. 6*c*. Therefore, the image decoding method helps to improve the efficiency of predicting the to-be-decoded block. When reconstructing the to-be-decoded block based on the predicted values and the residual values to obtain the rebuilt value of the to-be-decoded block, it can save buffer space used to buffer the residual values and improve the decoding efficiency.

It should be noted that the embodiment of the present application does not specifically limit the method for performing inverse quantization on the residual block or residual coefficient block of the to-be-decoded block. For example, the inverse quantization method described in the following Embodiment 2 can be used to perform inverse quantization on the residual block or residual coefficient block of the to-be-decoded block, but it is certainly not limited to this.

It should also be noted that the embodiment of the present application does not specifically limit the way in which the decoding end decodes the code stream of the to-be-decoded block. For example, the variable-length decoding method described in the following Embodiment 3 may be used for decoding, which is certainly not limited thereto.

Embodiment 2

Figure 9A:
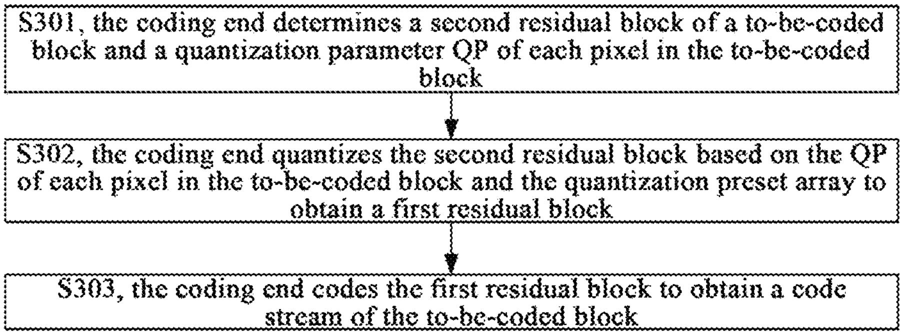
FIG. 9*a* is a flow chart of another image coding method provided by an embodiment of the present application.

As shown in FIG. 9*a*, which is a flowchart of another image coding method provided by an embodiment of the present application, the method shown in FIG. 9*a* includes the following steps:

S301, the coding end determines a second residual block of a to-be-coded block and a quantization parameter QP of each pixel in the to-be-coded block.

Here, the second residual block may be an original residual value block of the to-be-coded block, or the second residual block may be a residual coefficient block obtained after the original residual value block is transformed.

Wherein, the original residual value block of the to-be-coded block is the residual block obtained by the coding end based on the original pixel values of the to-be-coded block and the predicted block of the to-be-coded block. It can be understood that the process of the coding end predicting the pixels in the to-be-coded block to obtain the predicted block can be implemented based on the method described in Embodiment 1, and of course, it can also be obtained based on any method in the art that can obtain the predicted block of the to-be-coded block, and the embodiment of the present application does not limit this. The residual coefficient block is obtained after the coding end transforms the original residual value block, and the embodiment of the present application does not specifically limit the process of the coding end transforming the original residual value block.

For the sake of simplicity, the embodiment of the present application is described below by taking the second residual block being the original residual value block of the to-be-coded block as an example.

In addition, before or after obtaining the second residual block of the to-be-coded block, the coding end can also determine the quantization parameter QP of each pixel in the to-be-coded block. For example, the coding end can read a preset quantization parameter QP. Here, the embodiment of the present application does not limit the specific process of the coding end determining the quantization parameter QP of each pixel in the to-be-coded block.

S302, the coding end quantizes the second residual block based on the QP of each pixel in the to-be-coded block and a quantization preset array to obtain a first residual block.

Wherein, the quantization preset array is used to perform quantization processing on values in the second residual block.

In a first possible implementation, the quantization preset array includes an amplification parameter array and a displacement parameter array that include the same number of values. If amp represents an amplification parameter in the amplification parameter array, and shift represents a displacement parameter in the displacement parameter array, the coding end can perform quantization processing on each value in the second residual block based on Formula (1):

$$\text{Residual value after quantization} = (\text{Residual value before quantization} \times amp[QP] \gg \text{shift}[QP] \qquad \text{Formula (1)}$$

Wherein, amp[QP] represents the QP-th amplification parameter in the amplification parameter array, shift[QP] represents the QP-th displacement parameter in the displacement parameter array, and (Residual value before quantization×amp[QP])>>shift[QP] means shifting a binary value of (Residual value before quantization×amp[QP]) right by shift [QP] bits.

In the embodiment of the present application, for the value amp[i] of the i-th amplification parameter in the amplification parameter array and the value shift[i] of the i-th displacement parameter in the displacement parameter array, an inverse quantization preset array formed by a quotient of $2^{shift[i]}$ and amp[i] has the following rules: an interval between two adjacent numbers from the 1st to the nth numbers in the inverse quantization preset array is 1, an interval between two adjacent numbers from the (n+1)th to the (n+m)th numbers in the inverse quantization preset array is 2, and a numerical interval between two adjacent numbers from the (n+k*m+1)th to the (n+k*m+m)th in the inverse quantization preset array is $2^{k+1}$. Wherein, n and m are integers greater than 1, and i and k are both positive integers.

Wherein the inverse quantization preset array is used to perform inverse quantization processing on the first residual block obtained after quantization, and the inverse quantization operation implemented by the inverse quantization preset array is the inverse of the quantization operation implemented by the quantization preset array. Therefore, based on the inverse quantization preset array with the above rules, the amplification parameter array and the displacement parameter array used to implement the quantization operation can be inversely determined.

As an example, assuming that mult represents the amplification parameter in the inverse quantization preset array, and the inverse quantization preset array includes 42 amplification parameters, taking the n=12 and m=6 as an example, the inverse quantization preset array based on the above rules can be:

$$mult\,(42) = \begin{matrix} \{1, & 2, & 3, & 4, & 5, & 6, \\ 7, & 8, & 9, & 10, & 11, & 12, \\ 14, & 16, & 18, & 20, & 22, & 24, \\ 28, & 32, & 36, & 40, & 44, & 48, \\ 56, & 64, & 72, & 80, & 88, & 96, \\ 112, & 128, & 144, & 160, & 176, & 192, \\ 224, & 256, & 288, & 320, & 352, & 384\} \end{matrix}$$

then the amplification parameter array can be:

$$amp\,[42] = \begin{matrix} \{1, & 2048, & 2731, & 2048, & 3277, & 2731, \\ 2341, & 2048, & 3641, & 3277, & 2979, & 2731, \\ 2341, & 2048, & 3641, & 3277, & 2979, & 2731, \\ 2341, & 2048, & 3641, & 3277, & 2979, & 2731, \\ 2341, & 2048, & 3641, & 3277, & 2979, & 2731, \\ 2341, & 2048, & 3641, & 3277, & 2979, & 2731, \\ 2341, & 2048, & 3641, & 3277, & 2979, & 2731\} \end{matrix}$$

the displacement parameter array can be:

$$\text{shift}\,[42] = \begin{matrix} \{0, & 12, & 13, & 13, & 14, & 14, \\ 14, & 14, & 15, & 15, & 15, & 15, \\ 15, & 15, & 16, & 16, & 16, & 16, \\ 16, & 16, & 17, & 17, & 17, & 17, \\ 17, & 17, & 18, & 18, & 18, & 18, \\ 18, & 18, & 19, & 19, & 19, & 19, \\ 19, & 19, & 20, & 20, & 20, & 20\} \end{matrix}$$

In this way, the coding end can determine the amplification parameter of each pixel in the above amplification parameter array based on the determined QP of the each pixel in the to-be-coded block, and determine the displacement parameter of each pixel in the above displacement parameter array. Then, the coding end performs quantization operation on the second residual block based on the amplification parameter and displacement parameter corresponding to each pixel in the to-be-coded block, thereby obtaining a first residual block.

For example, for any pixel in the to-be-coded block, the coding end can search in the above amplification parameter array based on the determined QP of the any pixel, and determine the QP-th value in the amplification parameter array as an amplification parameter of the any pixel, and search in the above displacement parameter array, and determine the QP-th value in the displacement parameter array as a displacement parameter of the any pixel. Then, the coding end performs quantization operation on the residual value corresponding to the any pixel in the second residual block based on the amplification parameter and displacement parameter corresponding to the this pixel through the above Formula (1), thereby obtaining the quantized residual value corresponding to this pixel. When the coding end completes the quantization processing on all of the residual values in the second residual block, the first residual block is obtained.

Through this possible implementation, the coding end needs to perform at most 6 multiplication operations when quantizing the residual values in the second residual block. Compared with the prior art, this implementation greatly reduces the amount of calculation of the coding end, that is, this implementation greatly saves the calculation resources of the coding end.

In a second possible implementation, compared with the first possible implementation, a quantization preset array in this implementation may include fewer values. In this implementation, the coding end may implement quantization processing on each residual value in the second residual block based on Formula (2):

$$\text{Residual value after quantization} = (\text{Residual value before quantization} \times amp + \text{offset}) \gg \text{shift} \quad \text{Formula (2)}$$

Wherein, amp is an amplification parameter corresponding to each pixel determined by the coding end based on the QP of each pixel in the to-be-coded block and the quantization preset array, and shift is a displacement parameter corresponding to each pixel determined by the coding end based on the QP of each pixel in the to-be-coded block and the quantization preset array. Offset is an offset parameter used to round off the residual value after quantization. (Residual value before quantization×amp+offset)>>shift means that a binary value of (Residual value before quantization×amp+offset) is shifted right by shift bits.

Specifically, a value of the amplification parameter amp corresponding to each pixel in the to-be-coded block determined by the coding end is a value in the quantization preset array corresponding to a value after bitwise AND QP and 7, and a value of the displacement parameter shift corresponding to each pixel in the to-be-coded block determined by the coding end is the sum of 7 and the quotient of QP of each pixel divided by 23.

That is, assuming that quant_scal represents a value in the quantization preset array, the amplification parameter amp can be calculated by quant_scale[QP & 0x07], and the displacement parameter shift can be calculated by 7+(QP>>3). Wherein, [QP & 0x07] represents the bitwise AND of the binary value of QP and 7 (equivalent to the mathematical effect of QP divided by 8 and taking the remainder), and quant_scale[QP & 0x07] is the QP & 0x07-th value in the quantization preset array. QP>>3 represents shifting the binary value of QP to the right by 3 bits.

In addition, offset can be calculated as 1<< (shift−1), which means shifting the binary value of 1 left by (shift−1) (the mathematical effect is 1 multiplied by 2 to the power of (shift−1)).

In the embodiment of the present application, when the coding end implements the quantization processing on the second residual block according to Formula (2), the quantization preset array may be: quant_scal [8]={128, 140, 153, 166, 182, 197, 216, 234}.

In this way, the coding end calculates the amplification parameter and displacement parameter corresponding to each pixel based on the determined QP of each pixel in the to-be-coded block and quantization preset array. Then, the coding end performs quantization processing on the second residual block based on the calculated amplification parameter, displacement parameter and offset parameter of each pixel in the to-be-coded block, and through using Formula (2), thereby obtaining the first residual block.

It can be seen that, through this possible implementation, the coding end needs to perform at most 8 multiplication operations when performing quantization processing on the residual values in the second residual block. Compared with the prior art, this implementation greatly reduces the amount of calculation of the coding end, that is, this method greatly saves the calculation resources of the coding end.

In a third possible implementation, the coding end may implement quantization processing on each residual value in the second residual block by using Formula (3):

$$\text{Residual value after quantization} = (\text{Residual value before quantization} + \text{offset}) \gg \text{shift} \quad \text{Formula (3)}$$

Wherein, shift represents the displacement parameter, and the value of shift is a monotonically non-decreasing integer related to QP. Or it can be understood that when QP increases, shift corresponds to QP one-to-one, and the value of shift is a monotonically non-decreasing integer. The description of offset can be referred to above and will not be repeated here. In addition, offset can be determined by (shift==0)?0: (1<<(shift−1)), specifically: when the value of shift is 0, the value of offset is 0, and when the value of shift is not 0, the value of offset is (1<< (shift−1)) (that is, the value obtained by shifting the binary value of 1 left by (shift−1) bits).

In this way, the coding end can determine the displacement parameter of each pixel based on the determined QP of each pixel in the to-be-coded block, and further determine the offset parameter corresponding to each pixel in the to-be-coded block. Then, the coding end can quantize the second residual block based on the determined displacement parameter and offset parameter of each pixel in the to-be-coded block, and through by using Formula (3), thereby obtaining the first residual block.

It can be seen that, through this possible implementation, the coding end does not need to perform multiplication when quantizing the residual values in the second residual block. Compared with the prior art, in the coding scenario where the quantization granularity requirement is not high, this implementation greatly reduces the amount of calculation of the coding end, that is, this implementation greatly saves the calculation resources of the coding end.

S303, the coding end codes the first residual block to obtain a code stream of the to-be-coded block.

After obtaining the first residual block, the coding end codes the first residual block to obtain a coded code stream of the to-be-coded block.

Optionally, the coding end uses the QP corresponding to each pixel when quantizing the second residual block, and the specific quantization method used as the syntax element of the to-be-coded block, and codes the syntax element. The coding end can also add the coded syntax element data to the coded code stream of the to-be-coded block.

Optionally, the residual scanning order used by the coding end to code the first residual block can be the target prediction order, used by the coding end to predict the pixels in the to-be-coded block. Wherein, the target prediction order corresponds to the target prediction mode for predicting the to-be-decoded block. The relevant description of the target prediction mode and the target prediction order can be referred to above, which will not be repeated here.

It should be noted that the specific mode for predicting the to-be-decoded block in the embodiment of the present application is not specifically limited. For example, the prediction mode described in the above Embodiment 1 can be used to predict the to-be-decoded block, but it is certainly not limited to this.

It should also be noted that the embodiment of the present application does not specifically limit the specific way in which the coding end codes the first residual block and related syntax element. For example, the variable-length coding method described in Embodiment 3 can be used for coding.

Through the image coding method described in S301-S303 above, since a quantization processing method that can save calculation resources on the coding end is adopted during the image coding process, that is, the efficiency of the quantization processing process in the image coding method is greatly improved, and thus the image coding method greatly improves the image coding efficiency.

Figure 9B:
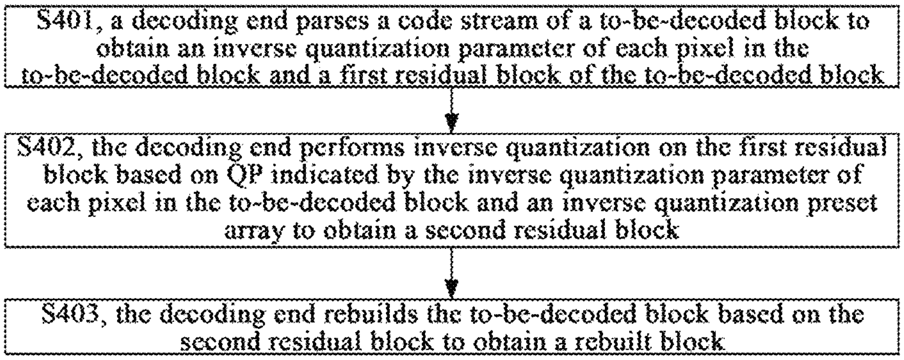
FIG. 9*b* is a flow chart of another image decoding method provided by an embodiment of the present application.

As shown in FIG. 9*b*, which is a flowchart of another image decoding method provided by an embodiment of the present application, the method shown in FIG. 9*b* includes the following steps:

S401, a decoding end parses a code stream of a to-be-decoded block to obtain an inverse quantization parameter of each pixel in the to-be-decoded block and a first residual block of the to-be-decoded block.

Wherein, the code stream of the to-be-decoded block can be a code stream received by the decoding end from the coding end, or a code stream obtained from other devices, such as a code stream obtained from a storage device, which is not limited in this embodiment of the present application.

Wherein, the inverse quantization parameter is used to indicate the decoding end to perform inverse quantization processing on the residual values in the first residual block by using an inverse quantization method corresponding to this inverse quantization parameter. The inverse quantization parameter may include a quantization parameter QP.

Specifically, the decoding end may parse the code stream of the to-be-decoded block in a decoding method corresponding to the coding end, thereby obtaining the inverse quantization parameter of each pixel in the to-be-decoded block and the first residual block of the to-be-decoded block.

For example, the residual scanning order used by the decoding end to decode the code stream of the to-be-decoded block is the target prediction order used to predict pixels in the to-be-decoded block. The target prediction order corresponds to the target prediction mode of the to-be-decoded block. The relevant description of the target prediction mode and the target prediction order can be referred to above, which will not be repeated here.

Optionally, the decoding end may parse the code stream of the to-be-decoded block using a variable-length decoding method to obtain the code length CL for coding each value in the residual block corresponding to the to-be-decoded block and the first residual block. Wherein, the process that the decoding end parses the code stream of the to-be-decoded block by using a variable-length decoding method to obtain the CL of each value in the residual block corresponding to the to-be-decoded block can be referred to the description of S601 below. The description of the decoding end determining the first residual block based on the CL can be referred to the description of S602, which will not be repeated here.

Other possible implementations of step S401 will be described below and will not be described in detail here.

S402, the decoding end performs inverse quantization on the first residual block based on a QP indicated by the inverse quantization parameter of each pixel in the to-be-decoded block and an inverse quantization preset array to obtain a second residual block.

The first possible implementation is that when the inverse quantization method used by the decoding end to perform inverse quantization on the first residual block based on the inverse quantization parameter of each pixel in the to-be-decoded block is the inverse of the quantization method described in the first possible implementation in S302, the description of the inverse quantization preset array can be referred to the relevant description of the inverse quantization preset array in S302 above, which will not be repeated here.

In this case, the decoding end can determine an amplification coefficient corresponding to each pixel in the inverse quantization preset array based on the QP of each pixel in the to-be-decoded block. Then, the decoding end can perform inverse quantization processing on the first residual block based on the amplification coefficient corresponding to each pixel, thereby obtaining a second residual block.

For example, for any pixel in the to-be-decoded block, the decoding end can search in the above inverse quantization preset array based on the QP of the any pixel, and determine the QP-th value in the inverse quantization preset array as the amplification coefficient of this pixel. Then, the decoding end performs multiplication operation on the residual value corresponding to any pixel in the first residual block based on the amplification coefficient corresponding to this pixel, so as to obtain the inverse quantized residual value corresponding to this pixel. When the decoding end completes the inverse quantization processing on all of the residual values in the first residual block, the second residual block is obtained.

Optionally, after determining the amplification coefficient corresponding to each pixel in the to-be-decoded block, the decoding end may also shift the residual value in the first residual block corresponding to each pixel to the left to implement the multiplication operation of the residual value and the amplification coefficient corresponding to the residual value. The embodiment of the present application does not make any specific limitation in comparison.

In a second possible implementation, when the inverse quantization method used by the decoding end to perform inverse quantization on the first residual block based on the inverse quantization parameter of each pixel in the to-be-decoded block is the inverse of the quantization method described in the second possible implementation in S302, the decoding end can implement inverse quantization processing on each residual value in the first residual block based on the above Formula (2) to obtain a second residual block.

In this case, the amplification parameter mult in Formula (2) (distinguished from amp in the quantization process above) can be calculated by dequant_scale[QP & 0x07], which is the (QP & 0x07)-th value in the inverse quantization preset array. The displacement parameter shift in Formula (2) can be calculated by 7−(QP>>3). The offset parameter offset in Formula (2) can be calculated by (shift==0)?0:(1<<(shift−1)).

In the embodiment of the present application, when the decoding end implements the inverse quantization processing on the first residual block according to Formula (2), the inverse quantization preset array may be: dequant_scal[8] ={128, 117, 107, 99, 90, 83, 76, 70}.

In this way, the decoding end calculates the amplification parameter and displacement parameter corresponding to each pixel based on the QP of each pixel in the to-be-decoded block and the inverse quantization preset array. Then, the decoding end can implement inverse quantization on the first residual block based on the calculated amplification parameter, displacement parameter and offset parameter of each pixel in the to-be-decoded block and through Formula (2), and obtain the second residual block.

It can be seen that, through this possible implementation, the decoding end needs to perform at most 8 multiplication operations when performing inverse quantization processing on the residual values in the first residual block. Compared with the prior art, this implementation greatly reduces the amount of calculation of the decoding end, that is, this implementation greatly saves the calculation resources of the decoding end.

In a third possible implementation, when the inverse quantization method used by the decoding end to perform inverse quantization on the first residual block based on the inverse quantization parameter of each pixel in the to-be-decoded block is the inverse of the quantization method described in the third possible implementation in S302, the decoding end can implement inverse quantization processing on each residual value in the first residual block based on Formula (4) to obtain the first residual block:

$$\text{Residual value after inverse quantization} = (\text{Residual value before inverse quantization} + \text{offset}) \ll \text{shift} \quad \text{Formula (4)}$$

Wherein, the description of the offset parameter offset and the displacement parameter shift may refer to the description of the third possible implementation in S302, which will not be repeated here.

In this way, the decoding end can determine the displacement parameter of each pixel based on the QP of each pixel in the to-be-decoded block, and further determine the corresponding offset parameter. Then, the decoding end can implement inverse quantization on the first residual block based on the determined displacement parameter and offset parameter of each pixel in the to-be-decoded block, and through Formula (4), thereby obtaining the second residual block.

It can be seen that, through this possible implementation, the decoding end does not need to perform multiplication when performing inverse quantization processing on the residual values in the first residual block. Compared with the prior art, in the coding scenario where the quantization granularity requirement is not high, this implementation greatly reduces the amount of calculation of the decoding end, that is, this implementation greatly saves the calculation resources of the decoding end.

It should be noted that the inverse quantization method in the above possible implementations can be applied to the process of coding an image by the coding end (for example, obtaining a reconstructed block for predicting pixels in an image block), and can also be applied to the process of decoding image data by the decoding end. The embodiments of the present application do not limit this.

S403, the decoding end rebuilds the to-be-decoded block based on the second residual block to obtain a rebuilt block.

Optionally, the decoding end may directly rebuild the second residual block to obtain a rebuilt block of the to-be-decoded block. Specifically, the decoding end may directly rebuild the to-be-decoded block based on the predicted block of the to-be-decoded block and the second residual block to obtain the rebuilt block of the to-be-decoded block. For example, the decoding end can obtain the rebuilt block of the to-be-decoded block by summing the predicted block of the to-be-decoded block and the second residual block.

Wherein, the predicted block of the to-be-decoded block may be obtained by predicting the to-be-decoded block based on the prediction mode by the decoding end. Optionally, the prediction mode may be obtained by parsing the code stream of the to-be-decoded block, for example, it may be any prediction mode in the above Embodiment 1, or the prediction mode may be any prediction mode in the prior art, which is not limited in the embodiment of the present application. In addition, the process of predicting the predicted block of the to-be-decoded block by the decoding end is not described in detail here.

Optionally, the decoding end may predict each pixel in the to-be-decoded block in a target prediction order corresponding to the target prediction mode according to the target prediction mode. The decoding end rebuilds the to-be-decoded block based on the predicted value of each pixel and the second residual block to obtain a rebuilt block.

Optionally, the decoding end may first perform inverse transformation on the second residual block to rebuild the residual value block of the to-be-decoded block. In this case, the second residual block is actually a residual coefficient block. Then, the decoding end may rebuild the to-be-decoded block based on the rebuilt residual value block and the predicted block of the to-be-decoded block to obtain a rebuilt block of the to-be-decoded block. For example, the decoding end may obtain the rebuilt block of the to-be-decoded block by summing the rebuilt residual value block and the predicted block of the to-be-decoded block.

Wherein, the description of the predicted block of the to-be-decoded block can be referred to the above, which will not be repeated here. In the embodiment of the present application, the process of the decoding end performing inverse transformation on the second residual block will not be described in detail.

It should be noted that the image decoding method shown in FIG. 9*b* corresponds to the image coding method shown in FIG. 9*a*. Based on the image decoding method described in S401-S403 above, the inverse quantization processing method that can save calculation resources on the decoding end is used during the image decoding process, that is, the efficiency of the inverse quantization processing process in the image decoding method is greatly improved, and thus the image decoding method greatly improves the image decoding efficiency.

It should also be noted that the specific mode for predicting the to-be-decoded block in the embodiment of the present application is not specifically limited. For example, the prediction mode described in the above Embodiment 1 can be used to predict the to-be-decoded block, but it is certainly not limited to this.

It should also be noted that the embodiment of the present application does not specifically limit the way in which the decoding end decodes the code stream of the to-be-decoded block. For example, the variable-length decoding method described in the following Embodiment 3 may be used for decoding, but it is certainly not limited thereto.

Possible implementations of step S401 are described below.

Optionally, the decoding end determines a target prediction mode for predicting pixels in the to-be-decoded block and an inverse quantization parameter for each pixel in the to-be-decoded block based on the code stream of the to-be-decoded block. The decoding end determines a residual scanning order corresponding to the target prediction mode based on the target prediction mode. The decoding end parses the code stream of the to-be-decoded block based on the residual scanning order to obtain the first residual block.

Wherein, when the target prediction mode is the first target prediction mode, the residual scanning order is the first scanning order, and when the target prediction mode is the second target prediction mode, the residual scanning order is the second scanning order, and the first scanning order and the second scanning order are different.

The first scanning order or the second scanning order is one of residual scanning orders, and the first scanning order or the second scanning order corresponds to the target prediction mode. For example, the first scanning order corresponds to the first target prediction mode, and the second scanning order corresponds to the second target prediction mode. Optionally, the residual scanning order may be the same as the target prediction order. The first and second scanning orders are used to represent two different scanning orders under different target prediction modes.

For example, when the to-be-decoded block is an image block of size 16×2, if the first target prediction mode is the prediction mode shown in Table 1 above, the first scanning order may be the order indicated by the preset trajectory shown in FIG. 7*a*. If the second target prediction mode is the prediction mode shown in Table 2 above, the second scanning order may be the order indicated by the preset trajectory shown in FIG. 7*b*.

Figures 1, 7C:
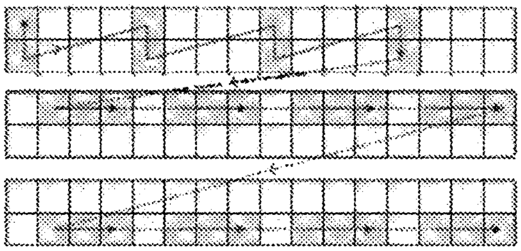
Figures 2, 7C:
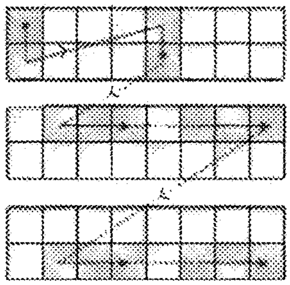

For another example, if the first target prediction mode is the prediction mode shown in Table 3-1 above, the first scanning order may be the order indicated by the preset trajectory shown in FIG. 7*c*-1. If the second target prediction mode is the prediction mode shown in Table 4-1 above, the second scanning order may be the order indicated by the preset trajectory shown in FIG. 7*d*-1.

It can be seen that the residual scanning order corresponding to the target prediction mode is determined differently under different prediction modes.

Optionally, based on the possible implementation of the above step S401, when the target prediction mode is determined, for a to-be-decoded block with size of a first size, the decoding end can also parse the code stream of the to-be-decoded block by using the third scanning order in the target prediction mode; for a to-be-decoded block with size of a second size, the decoding end can also parse the code stream of the to-be-decoded block by using the fourth scanning order in the target prediction mode.

Wherein, the third scanning order is different from the fourth scanning order. The third and fourth scanning orders are one of the residual scanning orders.

In addition, a residual scanning order represented by the first scanning order may be the same as or different from a residual scanning order represented by the third scanning order or the fourth scanning order. Similarly, a residual scanning order represented by the second scanning order may be the same as or different from a residual scanning order represented by the third scanning order or the fourth scanning order. The embodiments of the present application do not limit this.

The optional implementation described below is described by taking the first size being 8×1 and the second size being 8×2 as an example.

For example, when the target prediction mode is the prediction mode shown in Table 3-2 above or the prediction mode represented by Table 5 above, if the decoded block is of the first size, the residual scanning order may be the third scanning order, such as the scanning order shown in FIG. 7*e*, and if the decoded block is of the second size, the residual scanning order may be the fourth scanning order, such as the scanning order shown in FIG. 7*c*-2. Wherein, the prediction modes shown in Table 3-2 above and Table 5 above may represent two prediction modes of the same target prediction mode at different sizes.

Figures 1, 7D:
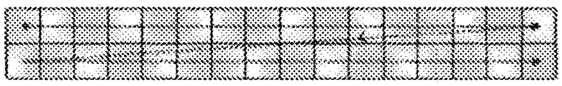
Figures 2, 7D:
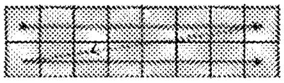

For another example, when the target prediction mode is the prediction mode shown in Table 4-2 above or the prediction mode represented by Table 4-3 above, if the decoded block is of the first size, the residual scanning order may be the third scanning order, such as the scanning order shown in FIG. 7*d*-3, and if the decoded block is of the second size, the residual scanning order may be the fourth scanning order, such as the scanning order shown in FIG. 7*d*-2. The prediction modes shown in Table 4-2 above and Table 4-3 above may represent two prediction modes of the same target prediction mode at different sizes.

Embodiment 3

Figure 10A:
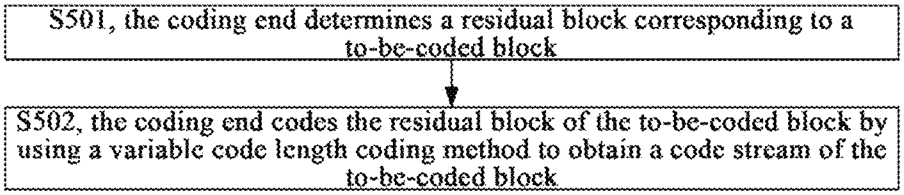
FIG. 10*a* is a flow chart of another image coding method provided by an embodiment of the present application.

As shown in FIG. 10*a*, which is a flow chart of another image coding method provided by an embodiment of the present application, the method shown in FIG. 10*a* includes the following steps:

S501, the coding end determines a residual block corresponding to a to-be-coded block.

Here, the residual block may be an original residual value block of the to-be-coded block, or the residual block may be a residual coefficient block obtained after the original residual value block is transformed, or the residual block may be the quantized residual block obtained after the coding end quantizes the residual coefficient block, and there is no limitation on this.

Wherein the original residual value block of the to-be-coded block is a residual block obtained by the coding end based on original pixel values of the to-be-coded block and a predicted block of the to-be-coded block.

It can be understood that the process of the coding end predicting the pixels in the to-be-coded block to obtain the predicted block can be implemented based on the method described in Embodiment 1, and of course, it can also be obtained based on any method in the prior art that can obtain the predicted block of the to-be-coded block. The embodiments of the present application are not limited to this.

The residual coefficient block is obtained after the coding end performs transformation processing on the original residual value block. The embodiment of the present application does not specifically limit the process of the coding end performing transformation processing on the original residual value block.

The process of the coding end obtaining the quantized residual block after the coding end quantizes the residual coefficient block can be implemented based on the method described in Embodiment 2, and of course, it can also be obtained based on any method in the art that can quantize the residual block. The embodiments of the present application are not limited to this.

For the sake of simplicity, the embodiments of the present application are described below by taking the residual block being the residual coefficient block of the to-be-coded block as an example.

S502, the coding end codes the residual block of the to-be-coded block by using a variable-length coding method to obtain a code stream of the to-be-coded block.

Optionally, the above variable-length coding method may include an exponential Golomb coding method with variable orders. In this way, the coding end can first determine an attribute type of each pixel in the to-be-coded block. For a first value in the residual block of the to-be-coded block corresponding to a third pixel in the to-be-coded block, the coding end can determine a target order for coding the first value based on a preset strategy and an attribute type of the third pixel. Then, the coding end can use the exponential Golomb coding algorithm of the target order to code the first value in the residual block of the to-be-coded block. When the coding end codes each value in the residual block of the to-be-coded block, the coded code stream of the to-be-coded block is obtained. Wherein, the coding end can be preset with the above prediction strategy, which is used to indicate orders used to code residual values corresponding to pixels of different attribute types. Wherein, the third pixel represents at least one pixel in the to-be-coded block.

It should be understood that the coding rules of the exponential Golomb coding methods of different orders are different. Referring to Table 6, which shows the coding rules (including codeword structure and corresponding coding range) of the exponential Golomb coding method when the order k takes different values. As shown in Table 6, X in the codeword structure shown in Table 6 can be 0 or 1.

TABLE 6

| order | codeword structure | coding range |
|---|---|---|
| K = 0 | 1 | 0 |
| | 01X | 1~2 |
| | 001XX | 3~6 |
| | 0001XXXX | 7~14 |
| | . . . | . . . |
| K = 1 | 1X | 0~1 |
| | 01XX | 2~5 |
| | 001XXX | 6~13 |
| | 0001XXXX | 14~29 |
| | . . . | . . . |
| K = 2 | 1XX | 0~3 |
| | 01XXX | 4~11 |
| | 01XXXX | 12~27 |
| | 01XXXXX | 28~59 |
| | . . . | . . . |
| K = 3 | 1XXX | 0~7 |
| | 01XXXX | 8~23 |
| | 001XXXXX | 24~55 |
| | 0001XXXXXX | 56~119 |
| | . . . | . . . |

In this way, for the first value in the residual block of the to-be-coded block corresponding to a third pixel of the to-be-coded block, the coding end determines a target order for coding the above first value based on a preset strategy and an attribute type of the third pixel. Then, the coding end can determine a codeword structure for coding the first value based on the exponential Golomb coding algorithm of the target order and the value of the first value, and code the first value with the codeword structure. Similarly, when the coding end codes each value in the residual block of the to-be-coded block, the coded code stream of the to-be-coded block is obtained.

For example, when the coding end determines that the target order for coding the first value corresponding to the third pixel is 0 based on the preset strategy and the attribute type of the third pixel. Assuming that the value of the first value is 2, as shown in Table 6, the first value belongs to the coding range 1~2, then the coding end can determine that the codeword structure for coding the first value is 011 (that is, the codeword structure 01X corresponding to the coding range 1~2) based on the 0-order exponential Golomb coding algorithm and the value of the first value. In this way, the coding end can code the first value with 011. Assuming that the value of the first value is 7, as shown in Table 6, the first value belongs to the coding range 7~14, then the coding end can determine that the codeword structure for coding the first value is 00010000 (that is, the codeword structure 0001XXXX corresponding to the coding range 7~14) based on the 0-order exponential Golomb coding algorithm and the value of the first value. In this way, the coding end can code the first value with 00010000. When the coding end codes each value in the residual block of the to-be-coded block, the coded code stream of the to-be-coded block is obtained.

Optionally, the variable-length decoding method may also include an exponential Golomb coding method with a preset order, wherein the preset order may be a value preset by the coding end, such as 0 or 1 (i.e., the value of K may be a preset 0 or 1), which is not limited in the present embodiment of the application.

It can be seen from Table 6 that when the coding end pre-specifies the order value (i.e., K value) of the exponential Golomb coding method, variable-length coding of the residual values in the residual block (or the residual coefficient value sin the residual coefficient block) can also be achieved.

It should be understood that after coding the residual block of the to-be-coded block, the coding end may also determine a syntax element corresponding to the residual block. For example, the syntax element includes a code length (CL) for coding each value in the residual block.

Optionally, the coding end may use the above exponential Golomb coding algorithm with a transformable order to code the CL to achieve the purpose of saving bits, thereby achieving the purpose of improving the coding efficiency while improving the compression rate of image coding.

For example, for any value in the residual block of the to-be-coded block, the coding end can determine a target order when coding the CL based on the CL of this value. Then, the coding end can code the CL by using the exponential Golomb coding algorithm of the target order, and add the coded data to the coded code stream of the to-be-coded block.

It can be seen that when the coding end codes the residual block (or the CL of the residual value in the residual block) of the to-be-coded block through the exponential Golomb coding algorithm with a transformable order, it can adaptively code the smaller residual value (or CL value) with fewer bits, thereby achieving the purpose of saving bits. That is, while improving the compression rate of image coding, the method provided by the embodiment of the present application also improves the coding efficiency.

Optionally, the coding may also use fixed-length coding and truncated unary coding to code the CL of each value in the residual block of the to-be-coded block. For example, for any value in the residual block of the to-be-coded block, the coding end may use the fixed-length coding or truncated unary code to code the CL of this value.

Specifically, when the CL of any value of the above values is less than or equal to a threshold, the coding end uses a preset number of bits to perform fixed-length coding on the CL of this value, and adds the coded data to the code stream of the to-be-coded block. When the CL of any value of the above values is greater than the aforementioned threshold, the coding end uses a truncated unary code to code the CL of this value, and adds the coded data to the code stream of the to-be-coded block. Wherein, the specific value of the threshold is not limited in the embodiment of the present application.

As an example, taking the value of the threshold as 2, as shown in Table 7, Table 7 shows the codewords obtained by the coding end coding CL values that are less than or equal to 2 by using 2 bits of fixed-length coding, and Table 7 also shows the codewords obtained by the coding end coding CL values that are greater than 2 by using truncated unary code. Wherein, if CLmax represents the maximum CL value, for CL values greater than 2, the codeword of CLmax consists of CLmax-1 ones, the codeword of CLmax-1 consists of CLmax-2 ones and 1 zero, . . . , and the codeword of CLmax-j consists of CLmax-j-1 ones and 1 zero, where j is a positive integer.

TABLE 7

| CL value | codeword |
|---|---|
| 0 | 00 |
| 1 | 01 |
| 2 | 10 |
| 3 | 110 |
| 4 | 1110 |
| 5 | 11110 |
| 6 | 111110 |
| . . . | . . . |
| CLmax-1 | 11 . . . 110 |
| CLmax | 11 . . . 111 |

It can be understood that the coding end can also use fixed-length coding and truncated unary code to code each value in the residual block of the to-be-coded block. For details, it can be refer to the description of the coding end coding the CL of each value in the residual block of the to-be-coded block by using fixed-length coding or truncated unary code, which will not be repeated here.

It can be seen that when the coding end uses fixed-length coding and truncated unary code to code the CL (or the residual value), it can adaptively code a smaller CL value (or residual value) with fewer bits, thereby achieving the purpose of saving bits. That is, the compression rate of image coding and the coding efficiency are improved simultaneously.

Figure 10B:
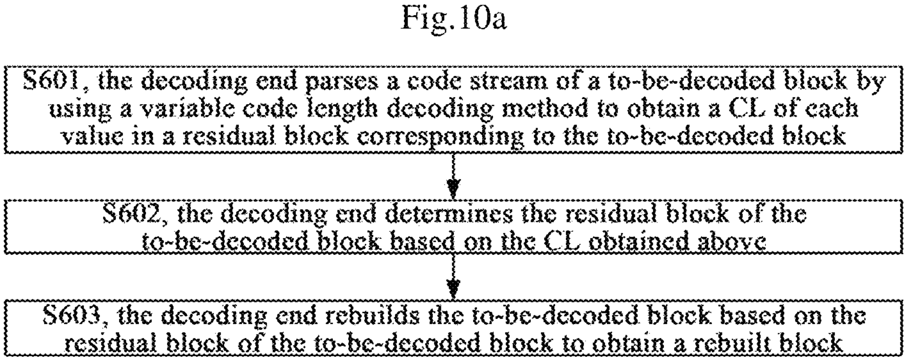
FIG. 10*b* is a flow chart of another image decoding method provided by an embodiment of the present application.

As shown in FIG. 10*b*, which is a flow chart of another image decoding method provided by an embodiment of the present application, the method shown in FIG. 10*b* includes the following steps:

S601, the decoding end parses a code stream of a to-be-decoded block by using a variable-length decoding method to obtain a CL of each value in a residual block corresponding to the to-be-decoded block.

Optionally, the variable-length decoding method may be an exponential Golomb decoding method with transformable order. The decoding end may first parse, from the code stream, a target order for decoding a code stream of the to-be-decoded block, and then use the exponential Golomb decoding algorithm of the target order to parse the code stream of the to-be-decoded block, thereby obtaining the CL of each value in the residual block of the to-be-decoded block.

Wherein, the exponential Golomb decoding method with transformable order can refer to the description of the exponential Golomb coding method with transformable order above. It can be understood that decoding is the inverse operation of coding, which will not be repeated here.

Optionally, the variable-length decoding method may be an exponential Golomb decoding method with preset order. In this case, the decoding end may use the exponential Golomb decoding algorithm of the preset order to parse the code stream of the to-be-decoded block, thereby obtaining the CL of each value in the residual block of the to-be-decoded block.

Optionally, when the number of bits in the code stream used to code any value CL in the residual block of the to-be-decoded block is a preset number, the decoding end can also parse the code stream of the to-be-decoded block based on a fixed-length decoding strategy to obtain CL for coding any value in the residual block of the to-be-decoded block. And, when the number of bits in the code stream used to code any value CL in the residual block of the to-be-decoded block is greater than the preset number, the decoding end can parse the code stream of the to-be-decoded block based on the rule of truncated unary code to obtain the CL for coding this any value. Wherein, the specific description can refer to the above description of the coding end coding the CL with fixed-length coding and truncated unary code. It can be understood that decoding is the inverse operation of coding and will not be repeated.

S602, the decoding end determines the residual block of the to-be-decoded block based on the CL obtained above.

After a coding end determines CL of each value in the residual block of the to-be-decoded block, i.e., the number of bits used to code each value in the residual block is determined. In this way, the decoding end can determine in the code stream of the to-be-decoded block, a bit group corresponding to each pixel in the to-be-decoded block based on the CL for coding each value, and determine a target order for parsing each bit group.

In one possible case, after parsing the CL of each value in the residual block of the to-be-decoded block, the decoding end may first determine an attribute type of each pixel in the to-be-decoded block. Then, for a first bit group corresponding to a third pixel in the to-be-decoded block, the decoding end may determine a target order for parsing the first bit group based on a preset strategy and the attribute type of the third pixel. In another possible case, the decoding end presets a preset order of a bit group corresponding to each pixel in the to-be-decoded block, and the decoding end determines the preset order of the bit group corresponding to each pixel in the to-be-decoded block as a target order of each bit group. For example, the attribute type of a pixel may include: whether the pixel has a sign, the number of bits of the pixel, and format information of the pixel, etc.

Then the decoding end uses an exponential Golomb decoding algorithm of the target order to parse the bit group corresponding to each pixel in the to-be-decoded block, so as to obtain a residual value of each pixel, thereby obtaining the residual block of the to-be-decoded block.

It can be understood that the order of the residual value in the residual block obtained by the decoding end parsing the code stream of the to-be-decoded block is the same as the order of the residual value in the residual block coded by the coding end.

S603, the decoding end rebuilds the to-be-decoded block based on the residual block of the to-be-decoded block to obtain a rebuilt block.

Optionally, when the residual block of the to-be-decoded block is a residual coefficient block, the decoding end may sequentially perform inverse quantization and inverse transformation on the residual block of the to-be-decoded block in order to obtain a rebuilt residual value block of the to-be-decoded block. Then, the decoding end may rebuild the to-be-decoded block based on the rebuilt residual value block to obtain a rebuilt block. For example, the decoding end may obtain the rebuilt block of the to-be-decoded block by summing the rebuilt residual value block and the predicted block of the to-be-decoded block.

Optionally, when the residual block of the to-be-decoded block is a residual value block, the decoding end may perform inverse quantization on the residual block of the to-be-decoded block to obtain a rebuilt residual value block of the to-be-decoded block. Then, the decoding end may rebuild the to-be-decoded block based on the rebuilt residual value block to obtain a rebuilt block. For example, the decoding end may obtain the rebuilt block of the to-be-decoded block by summing the rebuilt residual value block and the predicted block of the to-be-decoded block.

Optionally, the decoding end may also determine a target prediction mode for predicting pixels in the to-be-decoded block based on the code stream of the to-be-decoded block. The decoding end determines a target prediction order corresponding to the target prediction mode based on the target prediction mode. The decoding end predicts each pixel in the to-be-decoded block in the target prediction order according to the target prediction mode. The decoding end rebuilds the to-be-decoded block based on the predicted value of each pixel in the to-be-decoded block and the residual block to obtain a rebuilt block. Specifically, the specific content of the above optional implementation can be referred to the description of Embodiment 1, which will not be repeated here.

Wherein, the predicted block of the to-be-decoded block can be obtained by predicting the to-be-decoded block based on the prediction mode, wherein the prediction mode can be obtained by the decoding end parsing the code stream of the to-be-decoded block. Optionally, the prediction mode can be any prediction mode Embodiment 1, or the prediction mode can be any prediction mode in the prior art, which is not limited in the embodiment of the present application. In addition, the process of predicting the predicted block of the to-be-decoded block by the decoding end is not described in detail here.

Wherein, the decoding end can perform inverse quantization on the residual block of the to-be-decoded block based on an inverse quantization parameter of each pixel in the to-be-decoded block and an inverse quantization preset array obtained by parsing the code stream of the to-be-decoded block. Specifically, the above process can be implemented based on the method in Embodiment 2, and of course, it can based on any method in the prior art that can implement inverse quantization on the residual block, and the embodiment of the present application does not limited this.

It should be noted that the image decoding method shown in FIG. 10*b* corresponds to the image coding method shown in FIG. 10*a*. Therefore this method can improve the decoding efficiency while improving the compression rate of image coding.

It should also be noted that the variable-length coding/decoding method provided by Example 3 can also be applied to Example 1 and Example 2, or to any scenario requiring image coding/decoding, and the embodiments of the present application are not limited to this.

It can be understood that, in order to implement the functions in the above embodiments, the encoding end/decoding end includes a hardware structure and/or software module corresponding to executing each function. Those skilled in the art should easily realize that, in combination with the units and method steps of each example described in the embodiments disclosed in this application, the present application can be implemented in the form of hardware or a combination of hardware and computer software. Whether a function is executed in the form of hardware or computer software driving hardware depends on the specific application scenario and design constraints of the technical solution.

The following describes decoding apparatuses and coding apparatuses provided by embodiments of the present application.

In one example, any decoding apparatus provided by the embodiment of the present application may be the destination device 12 or the decoder 122 in FIG. 1. In another example, any coding apparatus provided below may be the source device 11 or the coder 112 in FIG. 1, which are explained uniformly here and will not be repeated below.

Figure 11:
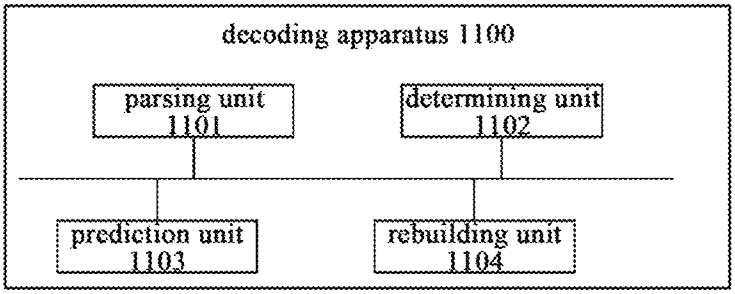
FIG. 11 is a structure schematic diagram of a decoding apparatus 1100 provided by an embodiment of the present application.

FIG. 11 is a structure schematic diagram of a decoding apparatus 1100 provided by an present application. Any of the above decoding method embodiments can be executed by the decoding apparatus 1100. The decoding apparatus 1100 includes a parsing unit 1101, a determining unit 1102, a prediction unit 1103 and a rebuilding unit 1104. Wherein, the parsing unit 1101 is configured to parse a code stream of a to-be-decoded block to determine a target prediction mode for predicting pixels in the to-be-decoded block. The determining unit 1102 is configured to determine a target prediction order corresponding to the target prediction mode based on the target prediction mode. The prediction unit 1103 is configured to predict each pixel in the to-be-decoded block in the target prediction order corresponding to the target prediction mode according to the determined target prediction mode. The rebuilding unit 1104 is configured to rebuild each pixel in the to-be-decoded block based on a predicted value of the pixel, to obtain a rebuilt block of the to-be-decoded block.

In one example, the parsing unit 1101 may be implemented through the code stream parsing unit 301 in FIG. 5. The determining unit 1102 and the prediction unit 1103 may be implemented through the prediction processing unit 304 in FIG. 5, and the rebuilding unit 1104 may be implemented through the reconstruction unit 305 in FIG. 5. The coded bit stream in FIG. 5 may be the code stream of the to-be-decoded block in the embodiment of the present application.

For a more detailed description of the above analysis unit 1101, determining unit 1102, prediction unit 1103 and rebuilding unit 1104, as well as a more detailed description of each technical feature therein, and a description of the beneficial effects, etc., please refer to the above-mentioned corresponding method embodiment part, which will not be repeated here.

In one possible design, when the prediction unit 1103 is specifically configured to predict any pixel in the to-be-decoded block in the target prediction order, pixels used to predict this pixel have been rebuilt.

In another possible design, if the target prediction mode indicates that each pixel in the to-be-decoded block is predicted point by point in the target prediction order, the prediction unit 1103 is specifically configured to predict each pixel in the to-be-decoded block point by point in a direction indicated by the target prediction order according to the target prediction mode; wherein, when the target prediction mode is a first target prediction mode, the target prediction order is a first prediction order, and when the target prediction mode is a second target prediction mode, the target prediction order is a second prediction order, and the first and second prediction orders are different.

In another possible design, for the to-be-decoded block with a size of a first size, the prediction unit 1103 is specifically configured to predict the to-be-decoded block by using a third prediction order under the target prediction mode; for the to-be-decoded block with the size of a second size, the prediction unit 1103 is specifically configured to predict the to-be-decoded block by using a fourth prediction order under the target prediction mode; wherein the third and fourth prediction orders are different.

In another possible design, if the target prediction mode indicates that pixels of each sub-block in the to-be-decoded block are sequentially predicted in units of sub-blocks with a preset size in the to-be-decoded block, then the prediction unit 1103 is specifically configured to sequentially predict the pixels in each sub-block in the to-be-decoded block in a direction indicated by the target prediction order according to the target prediction mode.

In another possible design, the target prediction mode comprises a prediction mode of each sub-block in the to-be-decoded block, and for a first sub-block in the to-be-decoded block, the first sub-block comprises a first pixel and a second pixel, and a prediction mode of the first sub-block is used to predict the first pixel and the second pixel in parallel based on the rebuilt pixels around the first sub-block.

In another possible design, the rebuilding unit 1104 includes: an inverse quantization sub-unit and a rebuilding sub-unit. Wherein the inverse quantization sub-unit is configured to perform inverse quantization on a first residual block of the to-be-decoded block obtained by parsing the code stream of the to-be-decoded block based on an inverse quantization parameter of each pixel in the to-be-decoded block obtained by parsing the code stream of the to-be-decoded block and an inverse quantization preset array, to obtain a second residual block. The rebuilding subunit is configured to rebuild each pixel based on the predicted value of the each pixel and the second residual block to obtain the rebuilt block.

In another possible design, the above inverse quantization sub-unit is specifically configured to parse the code stream of the to-be-decoded block by adopting a variable code length decoding method, to obtain the first residual block and a code length CL for coding each value in a residual block corresponding to the to-be-decoded block.

For a more detailed description of the above possible designs, a more detailed description of various technical features therein, a description of the beneficial effects, etc., please refer to the above corresponding method embodiment part, which will not be repeated here.

Figure 12:
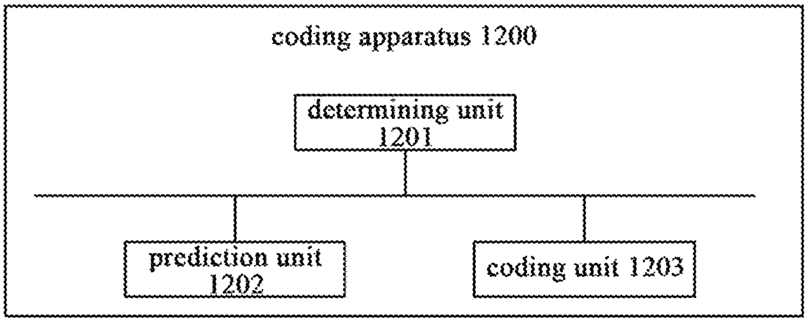
FIG. 12 is a structure schematic diagram of an coding apparatus 1200 provided by an embodiment of the present application.

FIG. 12 is a structure schematic diagram of a coding apparatus 1200 provided by an present application, any of the above coding method embodiments can be executed by the coding apparatus 1200. The coding apparatus 1200 includes a determining unit 1201, a prediction unit 1202 and a coding unit 1203. Wherein, the determining unit 1201 is configured to determine a target prediction mode of a to-be-coded block, and determine a target prediction order corresponding to the target prediction mode. The prediction unit 1202 is configured to predict each pixel in the to-be-coded block in the target prediction order according to the target prediction mode. The determining unit 1201 is further configured to determine a residual block of the to-be-coded block based on a predicted value of each pixel. The coding unit 1203 is configured to code the residual block in the target prediction order to obtain a code stream of the to-be-coded block.

In one example, the determining unit 1201 and the prediction unit 1202 may be implemented through the prediction processing unit 201 in FIG. 2. The determining unit 1201 may also be implemented through the residual calculation unit 202 in FIG. 2. The coding unit 1203 may be implemented through the coding unit 205 in FIG. 2. The to-be-coded block in FIG. 2 may be the to-be-coded block in the embodiment of the present application.

For a more detailed description of the above determining unit 1201, prediction unit 1202 and coding unit 1203, a more detailed description of various technical features therein, a description of the beneficial effects, etc., please refer to the above corresponding method embodiment part, which will not be repeated here.

Figure 13:
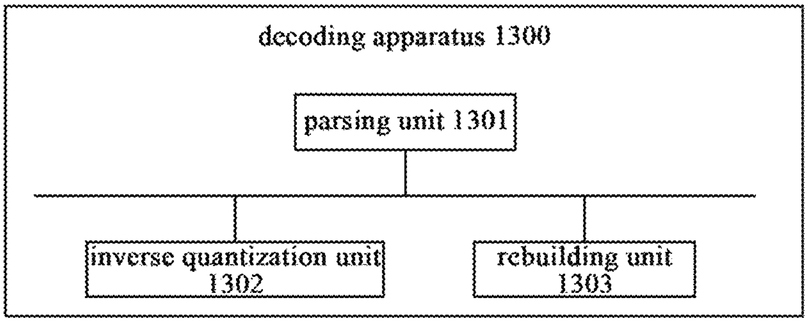
FIG. 13 is a structure schematic diagram of a decoding apparatus 1300 provided by an embodiment of the present application.

FIG. 13 is a structure schematic diagram of a decoding apparatus 1300 provided by the present application, any of the above decoding method embodiments can be executed by the decoding apparatus 1300. The decoding apparatus 1300 includes a parsing unit 1301, an inverse quantization unit 1302, and a rebuilding unit 1303. Wherein, the parsing unit 1301 is configured to parse a code stream of a to-be-decoded block to obtain an inverse quantization parameter of each pixel in the to-be-decoded block and a first residual block of the to-be-decoded block. The inverse quantization unit 1302 is configured to perform inverse quantization on the first residual block based on QP indicated by the inverse quantization parameter of each pixel and the inverse quantization preset array to obtain a second residual block. The rebuilding unit 1303 is configured to rebuild the to-be-decoded block based on the second residual block to obtain a rebuilt block.

In one example, the parsing unit 1301 may be implemented through the code stream parsing unit 301 in FIG. 5. The inverse quantization unit 1302 may be implemented through the inverse quantization unit 302 in FIG. 5. The rebuilding unit 1303 may be implemented through the reconstruction unit 305 in FIG. 5. The coded bit stream in FIG. 5 may be the code stream of the to-be-decoded block in the embodiment of the present application.

For a more detailed description of the above analysis unit 1301, inverse quantization unit 1302 and rebuilding unit 1303, a more detailed description of various technical features therein, a description of the beneficial effects, etc., please refer to the above corresponding method embodiment part, which will not be repeated here.

In one possible design, the parsing unit 1301 is specifically configured to determine a target prediction mode for predicting pixels in the to-be-decoded block and an inverse quantization parameter for each pixel in the to-be-decoded block based on the code stream of the to-be-decoded block; determine a residual scanning order corresponding to the target prediction mode based on the target prediction mode: wherein when the target prediction mode is a first target prediction mode, the residual scanning order is a first scanning order, and when the target prediction mode is a second target prediction mode, the residual scanning order is a second scanning order, and the first and second scanning orders are different; and parse the code stream of the to-be-decoded block based on the residual scanning order to obtain the first residual block.

In another possible design, for the to-be-decoded block with a size of a first size, the parsing unit 1301 parses the code stream of the to-be-decoded block by using a third scanning order in the target prediction mode; for the to-be-decoded block with the size of a second size, the parsing unit 1301 parses the code stream of the to-be-decoded block by using a fourth scanning order in the target prediction mode; wherein the third and fourth scanning orders are different.

In another possible design, in the inverse quantization preset array, an interval between two adjacent numbers from the 1st to the nth numbers is 1, an interval between two adjacent numbers from the (n+1)th to the (n+m)th numbers is 2, and a numerical interval between two adjacent numbers from the (n+k*m+1)th to the (n+k*m+m)th numbers is $2^{k+1}$. Wherein, n and m are integers greater than 1, and i and k are both positive integers.

In another possible design, the inverse quantization unit 1302 is specifically configured to determine an amplification coefficient corresponding to each pixel in the inverse quantization preset array based on the QP of each pixel: perform inverse quantization on the first residual block based on the amplification coefficient corresponding to each pixel to obtain the second residual block.

In yet another possible design, the inverse quantization unit 1302 is specifically configured to determine an amplification parameter and a displacement parameter corresponding to each pixel based on the QP of each pixel and the inverse quantization preset array: wherein, the value of the amplification parameter corresponding to each pixel is a value corresponding to a value after bitwise AND the QP and 7 in the inverse quantization preset array, and the value of the displacement parameter corresponding to each pixel is the difference between 7 and the quotient of the QP of each pixel divided by $2^3$: perform inverse quantization on the first residual block based on the amplification parameter and displacement parameter corresponding to each pixel to obtain the second residual block.

In yet another possible design, the rebuilding unit 1303 is specifically configured to perform inverse transformation on the second residual block to rebuild the residual value block of the to-be-decoded block; and rebuild the to-be-decoded block based on the residual value block to obtain the rebuilt block.

In yet another possible design, the rebuilding unit 1303 is specifically configured to predict each pixel in the to-be-decoded block in a target prediction order corresponding to the target prediction mode according to the target prediction mode; and rebuild the to-be-decoded block based on a predicted value of each pixel and the second residual block to obtain the rebuilt block.

In yet another possible design, the parsing unit 1301 is specifically configured to parse the code stream of the to-be-decoded block by using a variable code length decoding method to obtain a first residual block and a code length CL for coding each value in a residual block corresponding to the to-be-decoded block.

For a more detailed description of the above possible designs, a more detailed description of various technical features therein, a description of the beneficial effects, etc., please refer to the above corresponding method embodiment part, which will not be repeated here.

Figure 14:
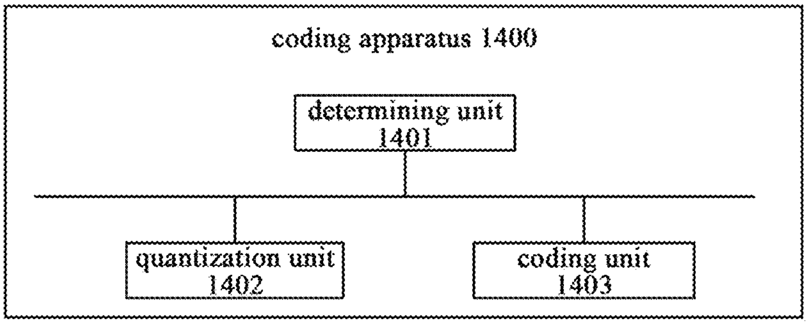
FIG. 14 is a structure schematic diagram of a coding apparatus 1400 provided by an embodiment of the present application.

FIG. 14 is a structure schematic diagram of a coding apparatus 1400 provided by the present application, any of the above coding method embodiments can be executed by the coding apparatus 1400. The coding apparatus 1400 includes a determining unit 1401, a quantization unit 1402, and a coding unit 1403. Wherein, the determining unit 1401 is configured to determine a second residual block of a to-be-coded block and a quantization parameter QP of each pixel in the to-be-coded block. The quantization unit 1402 is configured to quantize the second residual block based on the QP of each pixel and a quantization preset array to obtain a first residual block. The coding unit 1403 is configured to code the first residual block to obtain a code stream of the to-be-coded block.

In one example, the determining unit 1401 may be implemented through the residual calculation unit 202 in FIG. 2, or the determining unit 1401 may be implemented by combining the residual calculation unit 202 and the residual transform unit 203 in FIG. 2. The quantization unit 1402 may be implemented through the quantization unit 204 in FIG. 2. The coding unit 1403 may be implemented through the coding unit 205 in FIG. 2. The to-be-coded block in FIG. 2 may be the to-be-coded block in the embodiment of the present application.

For a more detailed description of the above determining unit 1401, quantization unit 1402 and coding unit 1403, a more detailed description of various technical features therein, a description of the beneficial effects, etc., please refer to the above corresponding method embodiment part, which will not be repeated here.

Figure 15:
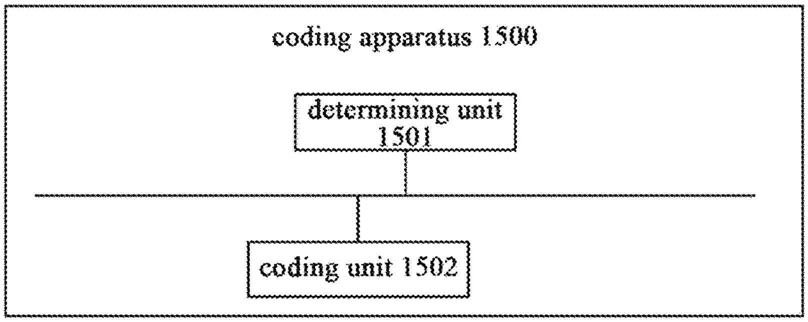
FIG. 15 is a structure schematic diagram of a coding apparatus 1500 provided in an embodiment of the present application.

FIG. 15 is a structure schematic diagram of a coding apparatus 1500 provided by the present application, any of the above coding method embodiments can be executed by the coding apparatus 1500. The coding apparatus 1500 includes a determining unit 1501 and a coding unit 1502. Wherein, the determining unit 1501 is configured to determine a residual block corresponding to a to-be-coded block. The coding unit 1502 is configured to code the residual block by using a variable code length coding method to obtain a code stream of the to-be-coded block.

In one example, the determining unit 1501 may be implemented through the residual calculation unit 202 in FIG. 2, or the determining unit 1501 may be implemented by combining the residual calculation unit 202 and the residual transform unit 203 in FIG. 2, or the determining unit 1501 may be implemented by combining the residual calculation unit 202, the residual transform unit 203, and the quantization unit 204 in FIG. 2. The coding unit 1502 may be implemented through the coding unit 205 in FIG. 2. The to-be-coded block in FIG. 2 may be the to-be-coded block in an embodiment of the present application.

For a more detailed description of the above determining unit 1501 and coding unit 1502, a more detailed description of various technical features therein, a description of the beneficial effects, etc., please refer to the above corresponding method embodiment part, which will not be repeated here.

Figure 16:
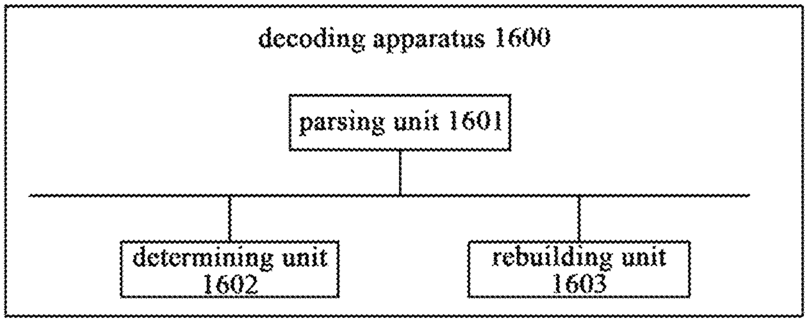
FIG. 16 is a structure schematic diagram of a decoding apparatus 1600 provided in an embodiment of the present application.

FIG. 16 is a structure schematic diagram of a decoding apparatus 1600 provided by the present application, any of the above decoding method embodiments can be executed by the decoding apparatus 1600. The decoding apparatus 1600 includes a parsing unit 1601, a determining unit 1602, and a rebuilding unit 1603. Wherein, the parsing unit 1601 is configured to parse a code stream of a to-be-decoded block by using a variable code length decoding method to obtain a code length CL of each value in a residual block corresponding to the to-be-decoded block. The determining unit 1602 is configured to determine the residual block of the to-be-decoded block based on the CL for coding each value. The rebuilding unit 1603 is configured to rebuild the to-be-decoded block based on the residual block of the to-be-decoded block to obtain a rebuilt block.

In one example, the parsing unit 1601 may be implemented through the code stream parsing unit 301 in FIG. 5. The determining unit 1602 may be implemented through the inverse quantization unit 302 in FIG. 5, or the determining unit 1602 may be implemented by combining the inverse quantization unit 302 and the residual inverse transform unit 303 in FIG. 5. The reconstructing unit 1603 may be implemented by the reconstruction unit 305 in FIG. 5. The coded code stream in FIG. 5 may be the code stream of the to-be-decoded block in the embodiment of the present application.

For a more detailed description of the above analysis unit 1601, determining unit 1602 and rebuilding unit 1603, a more detailed description of various technical features therein, a description of the beneficial effects, etc., please refer to the above corresponding method embodiment part, which will not be repeated here.

In one possible design, when the variable code length decoding method comprises an exponential Golomb decoding method with a transformable order or a preset order, the parsing unit 1601 is specifically configured to determine a target order for parsing a CL for coding each value in the residual block: parse the code stream by using an exponential Golomb decoding algorithm of the target order to obtain the CL for coding each value in the residual block.

In another possible design, the parsing unit 1601 is specifically configured to parse, when the number of bits of CL for coding any value in the residual block is a preset number, the code stream based on a fixed-length decoding strategy to obtain the CL for coding this value: parse, when the number of bits of CL for coding any value in the residual block is greater than the preset number, the code stream based on a rule of truncated unary code to obtain the CL for coding this value.

In another possible design, the determining unit 1602 is specifically configured to determine a bit group corresponding to each pixel in the to-be-decoded block in the code stream based on the CL for coding the each value: determining an attribute type of each pixel in the to-be-decoded block: for a first bit group corresponding to a third pixel in the to-be-decoded block, determine a target order for parsing the first bit group based on a preset strategy and an attribute type of the third pixel: parse the first bit group by using the exponential Golomb decoding algorithm of the target order to obtain the residual block.

In another possible design, the determining unit 1602 is specifically configured to determine a bit group corresponding to each pixel in the to-be-decoded block in the code stream based on the CL for coding the each value: for the first bit group corresponding to the third pixel in the to-be-decoded block, parse the first bit group by using the exponential Golomb decoding algorithm with a preset order to obtain the residual block.

In another possible design, the reconstructing unit 1603 is specifically configured to perform inverse quantization and inverse transformation on the residual block, or perform inverse quantization on the residual block to rebuild a residual value block of the to-be-decoded block: rebuild the to-be-decoded block based on the residual value block to obtain the rebuilt block.

In another possible design, the rebuilding unit 1603 is specifically configured to determine a target prediction mode for predicting pixels in the to-be-decoded block based on the code stream of the to-be-decoded block; determine a target prediction order corresponding to the target prediction mode based on the target prediction mode: predict each pixel in the to-be-decoded block in the target prediction order according to the target prediction mode: rebuild the each pixel based on a predicted value of the each pixel to obtain a rebuilt block of the to-be-decoded block.

In another possible design, the rebuilding unit 1603 is specifically configured to perform inverse quantization on the residual block based on an inverse quantization parameter of each pixel in the to-be-decoded block obtained by parsing the code stream of the to-be-decoded block and an inverse quantization preset array.

For a more detailed description of the above possible designs, a more detailed description of various technical features therein, a description of the beneficial effects, etc., please refer to the above corresponding method embodiment part, which will not be repeated here.

Figure 17:
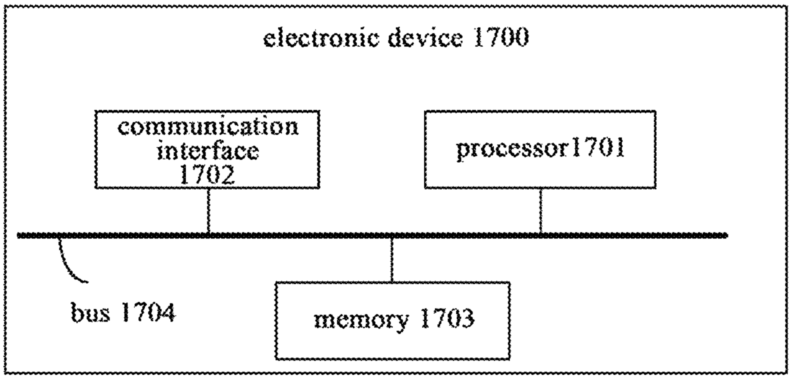
FIG. 17 is a structure schematic diagram of an electronic device provided by an embodiment of the present application.

The present application further provides an electronic device configured to execute any of the above embodiments of the image coding/decoding methods. As shown in FIG. 17, FIG. 17 is a structure schematic diagram of an electronic device provided by the present application, and the electronic device 1700 includes a processor 1701 and a communication interface 1702. The processor 1701 and the communication interface 1702 are coupled to each other. It can be understood that the communication interface 1702 can be a transceiver or an input/output interface.

In one example, the electronic device 1700 may further include a memory 1703 configured to store instructions executed by the processor 1701 or store input data required for the processor 1701 to execute the instructions or store data generated after the processor 1701 executes the instructions.

The embodiment of the present application does not limit the specific connection medium among the communication interface 1702, the processor 1701 and the memory 1703. In FIG. 17, the communication interface 1702, the processor 1701 and the memory 1703 are connected by a bus 1704, which is represented by a bold line in FIG. 17. The connection method between other components is only for schematic illustration and is not limited thereto. The bus can be divided into an address bus, a data bus, a control bus, etc. For ease of representation, only one bold line is used in FIG. 17, but it does not mean that there is only one bus or one type of bus.

The memory 1703 may be used to store software programs and modules, such as program instructions/modules corresponding to the image decoding method or image coding method provided by the embodiments of the present application. The processor 1701 executes the software programs and modules stored in the memory 1703 to perform various functional applications and data processing, so as to implement any of the image decoding methods or image coding methods provided above. The communication interface 1702 may be used to communicate signaling or data with other devices. In the present application, the electronic device 1700 may have multiple communication interfaces 1702.

It can be understood that the processor in the embodiments of the present application may be a central processing unit (CPU), a neural processing unit (NPU) or a graphic processing unit (GPU), or may be other general-purpose processors, a digital signal processor (DSP), an application specific integrated circuit (ASIC), a field programmable gate array (FPGA) or other programmable logic devices, transistor logic devices, hardware components or any combination thereof. The general-purpose processor may be a microprocessor or any conventional processor.

The method steps in the embodiments of the present application can be implemented by hardware or by a processor executing software instructions. The software instructions can be composed of corresponding software modules, and the software modules can be stored in a random access memory (RAM), a flash memory, a read-only memory (ROM), a programmable ROM (PROM), an erasable PROM (EPROM), an electrically erasable PROM (EEPROM), a register, a hard disk, a mobile hard disk, a CD-ROM or any other form of storage medium known in the art. One exemplary storage medium is coupled to the processor, so that the processor can read information from the storage medium and write information to the storage medium. Of course, the storage medium can also be a component of the processor. The processor and the storage medium can be located in an ASIC. In addition, the ASIC can be located in a network device or a terminal device. Of course, the processor and the storage medium can also be present in the network device or the terminal device as discrete components.

The present application further provides a computer-readable storage medium, which stores a computer program or instruction therein, which when executed by an electronic device, implement(s) an embodiment of any of the above image coding/decoding methods.

An embodiment of the present application further provides a coding and decoding system, including a coding end and a decoding end, wherein the coding end can be used to execute any one of the image coding methods provided above, and the decoding end is used to execute the corresponding image decoding method.

In the above embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the processes or functions described in the embodiments of the present application are generated in whole or in part. The computer may be a general purpose computer, special purpose computer, computer network, or other programmable device. The computer instructions may be stored in a computer readable storage medium or transmitted from one computer readable storage medium to another computer readable storage medium, for example, the computer instructions may be transmitted from a website, computer, server or data center to another website, computer, server, or data center by wire (such as coaxial cable, fiber optic, digital subscriber line (DSL)) or wirelessly (such as infrared, wireless, microwave, etc.). The computer-readable storage medium may be any usable medium that can be accessed by a computer or a data storage device such as a server and a data center and the like that includes an integration of one or more available medium. The usable media may be magnetic media (such as a floppy disk, a hard disk, a magnetic tape), optical media (such as DVD), or semiconductor media (such as Solid State Disk (SSD)) and the like.

In the various embodiments of the present application, unless otherwise specified or provided in a logical conflict, terms and/or descriptions between the different embodiments are consistent and may be referenced to each other, and technical features in the different embodiments may be combined to form a new embodiment according to their inherent logical relationships.

It is can be understood that the various digital numbers involved in the embodiments of the present application are only for the convenience of description and are not intended to limit the scope of the embodiments of the present application. The value of the serial numbers of the above processes does not mean the order of execution, and the execution order of each process should be determined by its function and inherent logic. The above descriptions are only preferred embodiments of the present application, and are not intended to limit the present application. Any modifications, equivalent replacements, improvements and the like made within the spirit and principles of the present application shall be included within the scope of protection of the present application.

The invention claimed is:

1. An image decoding method, comprising:

parsing a code stream of a to-be-decoded block, to determine a target prediction mode for predicting pixels in the to-be-decoded block;

determining a target prediction order corresponding to the target prediction mode based on the target prediction mode;

predicting each pixel in the to-be-decoded block in the target prediction order according to the target prediction mode;

rebuilding each pixel based on a predicted value of each pixel to obtain a rebuilt block of the to-be-decoded block, comprising: performing inverse quantization on a first residual block of the to-be-decoded block obtained by parsing the code stream of the to-be-decoded block, based on an inverse quantization parameter of each pixel in the to-be-decoded block obtained by parsing the code stream of the to-be-decoded block and an inverse quantization preset array, to obtain a second residual block; and rebuilding each pixel based on the predicted value of each pixel and the second residual block to obtain the rebuilt block.

2. The method according to claim 1, wherein when predicting any pixel in the to-be-decoded block in the target prediction order, a pixel used to predict this pixel has been rebuilt.

3. The method according to claim 2, wherein if the target prediction mode indicates that each pixel in the to-be-decoded block is predicted point by point in the target prediction order, then predicting each pixel in the to-be-decoded block in the target prediction order according to the target prediction mode comprises:

predicting each pixel in the to-be-decoded block point by point in a direction indicated by the target prediction order according to the target prediction mode; wherein, when the target prediction mode is a first target prediction mode, the target prediction order is a first prediction order, and when the target prediction mode is a second target prediction mode, the target prediction order is a second prediction order, and the first prediction order and the second prediction order are different.

4. The method according to claim 3, wherein, for the to-be-decoded block with a size of a first size, predicting the to-be-decoded block by adopting a third prediction order in the target prediction mode; for the to-be-decoded block with the size of a second size, predicting the to-be-decoded block by adopting a fourth prediction order in the target prediction mode; wherein the third prediction order and the fourth prediction order are different.

5. The method according to claim 2, wherein if the target prediction mode indicates that pixels of each sub-block in the to-be-decoded block are predicted sequentially with a sub-block of a preset size in the to-be-decoded block as a unit, then predicting each pixel in the to-be-decoded block in the target prediction order according to the target prediction mode comprises:

predicting the pixels in each sub-block in the to-be-decoded block sequentially in a direction indicated by the target prediction order according to the target prediction mode.

6. The method according to claim 5, wherein the target prediction mode comprises a prediction mode for each sub-block in the to-be-decoded block, and for a first sub-block in the to-be-decoded block, the first sub-block comprises a first pixel and a second pixel, and a prediction mode for the first sub-block is used to predict the first pixel and the second pixel in parallel based on rebuilt pixels around the first sub-block.

7. The method according to claim 1, wherein parsing the code stream of the to-be-decoded block comprises:

parsing the code stream of the to-be-decoded block by using a variable code length decoding method to obtain the first residual block and a code length CL for coding each value in a residual block corresponding to the to-be-decoded block.

8. An image coding method, comprising:

determining a target prediction mode for a to-be-coded block, and determining a target prediction order corresponding to the target prediction mode;

predicting each pixel in the to-be-coded block in the target prediction order according to the target prediction mode;

determining a residual block of the to-be-coded block based on a predicted value of each pixel;

coding the residual block in the target prediction order to obtain a code stream of the to-be-coded block, comprising: performing quantization on a second residual block of the to-be-decoded block based on a quantization parameter of each pixel in the to-be-decoded block and a quantization preset array to obtain a first residual block; and coding the first residual block to obtain the code stream of the to-be-coded block.

9. An electronic device comprising a processor and a memory, wherein the memory is configured to store computer instructions, and the processor is configured to call and execute the computer instructions from the memory to implement an image decoding method comprising:

parsing a code stream of a to-be-decoded block, to determine a target prediction mode for predicting pixels in the to-be-decoded block;

determining a target prediction order corresponding to the target prediction mode based on the target prediction mode;

predicting each pixel in the to-be-decoded block in the target prediction order according to the target prediction mode;

rebuilding each pixel based on a predicted value of each pixel to obtain a rebuilt block of the to-be-decoded block, comprising: performing inverse quantization on a first residual block of the to-be-decoded block obtained by parsing the code stream of the to-be-decoded block, based on an inverse quantization parameter of each pixel in the to-be-decoded block obtained by parsing the code stream of the to-be-decoded block and an inverse quantization preset array, to obtain a second residual block; and rebuilding each pixel based on the predicted value of each pixel and the second residual block to obtain the rebuilt block.

10. A non-transitory computer-readable storage medium storing a computer program or instructions thereon which, when executed by an electronic device, causes the electronic device to implement the method according to claim 1.

11. The electronic device according to claim 9, wherein when predicting any pixel in the to-be-decoded block in the target prediction order, a pixel used to predict this pixel has been rebuilt.

12. The electronic device according to claim 11, wherein if the target prediction mode indicates that each pixel in the to-be-decoded block is predicted point by point in the target prediction order, then predicting each pixel in the to-be-decoded block in the target prediction order according to the target prediction mode comprises:

predicting each pixel in the to-be-decoded block point by point in a direction indicated by the target prediction order according to the target prediction mode; wherein, when the target prediction mode is a first target prediction mode, the target prediction order is a first prediction order, and when the target prediction mode is a second target prediction mode, the target prediction order is a second prediction order, and the first prediction order and the second prediction order are different.

13. The electronic device according to claim 12, wherein, for the to-be-decoded block with a size of a first size, predicting the to-be-decoded block by adopting a third prediction order in the target prediction mode; for the to-be-decoded block with the size of a second size, predicting the to-be-decoded block by adopting a fourth prediction order in the target prediction mode; wherein the third prediction order and the fourth prediction order are different.

14. The electronic device according to claim 11, wherein if the target prediction mode indicates that pixels of each sub-block in the to-be-decoded block are predicted sequentially with a sub-block of a preset size in the to-be-decoded block as a unit, then predicting each pixel in the to-be-decoded block in the target prediction order according to the target prediction mode comprises:

predicting the pixels in each sub-block in the to-be-decoded block sequentially in a direction indicated by the target prediction order according to the target prediction mode.

15. The electronic device according to claim 14, wherein the target prediction mode comprises a prediction mode for each sub-block in the to-be-decoded block, and for a first sub-block in the to-be-decoded block, the first sub-block comprises a first pixel and a second pixel, and a prediction mode for the first sub-block is used to predict the first pixel and the second pixel in parallel based on rebuilt pixels around the first sub-block.

16. The electronic device according to claim 9, wherein parsing the code stream of the to-be-decoded block comprises:

parsing the code stream of the to-be-decoded block by using a variable code length decoding method to obtain the first residual block and a code length CL for coding each value in a residual block corresponding to the to-be-decoded block.

17. An electronic device comprising a processor and a memory, wherein the memory is configured to store computer instructions, and the processor is configured to call and execute the computer instructions from the memory to implement an image decoding method comprising:

parsing a code stream of a to-be-decoded block to obtain an inverse quantization parameter of each pixel in the to-be-decoded block and a first residual block of the to-be-decoded block;

performing inverse quantization on the first residual block based on an inverse quantization preset array and a quantization parameter QP indicated by the inverse quantization parameter of each pixel, to obtain a second residual block;

rebuilding the to-be-decoded block based on the second residual block to obtain a rebuilt block.

18. The electronic device according to claim 17, wherein parsing the code stream of the to-be-decoded block to obtain the inverse quantization parameter of each pixel in the to-be-decoded block and the first residual block of the to-be-decoded block comprises:

determining a target prediction mode for predicting pixels in the to-be-decoded block and an inverse quantization parameter of each pixel in the to-be-decoded block based on the code stream of the to-be-decoded block;

determining a residual scanning order corresponding to the target prediction mode based on the target prediction mode; wherein when the target prediction mode is a first target prediction mode, the residual scanning order is a first scanning order, and when the target prediction mode is a second target prediction mode, the residual scanning order is a second scanning order, and the first scanning order and the second scanning order are different;

parsing the code stream of the to-be-decoded block based on the residual scanning order to obtain the first residual block.

* * * * *